US008650320B1

(12) United States Patent
Merrick et al.

(10) Patent No.: US 8,650,320 B1
(45) Date of Patent: Feb. 11, 2014

(54) INTEGRATION SERVER SUPPORTING MULTIPLE RECEIVING CHANNELS

(75) Inventors: Phillip Merrick, Burke, VA (US); Stewart Allen, Reston, VA (US); Joseph Lapp, Fairfax, VA (US); Jay Gauthier, South Riding, VA (US)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 09/560,892

(22) Filed: Apr. 28, 2000

Related U.S. Application Data

(63) Continuation-in-part of application No. 09/274,979, filed on Mar. 23, 1999, now Pat. No. 7,028,312.

(60) Provisional application No. 60/079,100, filed on Mar. 23, 1998, provisional application No. 60/096,909, filed on Aug. 17, 1998, provisional application No. 60/132,440, filed on May 4, 1999.

(51) Int. Cl.
*G06F 15/16* (2006.01)
*G06F 15/173* (2006.01)
*G06F 3/00* (2006.01)
*H04J 3/22* (2006.01)

(52) U.S. Cl.
USPC ........... 709/230; 709/238; 709/246; 370/465; 370/466; 370/467; 719/330

(58) Field of Classification Search
USPC .......................... 709/230, 246, 238; 719/330; 370/465–467
See application file for complete search history.

(56) References Cited

U.S. PATENT DOCUMENTS

| | | | | |
|---|---|---|---|---|
| 5,524,253 | A * | 6/1996 | Pham et al. | 709/202 |
| 5,822,521 | A * | 10/1998 | Gartner et al. | 709/230 |
| 5,828,842 | A * | 10/1998 | Sugauchi et al. | 709/223 |
| 5,867,650 | A * | 2/1999 | Osterman | 709/203 |
| 5,870,473 | A * | 2/1999 | Boesch et al. | 705/78 |
| 5,983,267 | A * | 11/1999 | Shklar et al. | 709/217 |
| 6,012,098 | A * | 1/2000 | Bayeh et al. | 709/246 |
| 6,032,147 | A * | 2/2000 | Williams et al. | 1/1 |
| 6,032,199 | A * | 2/2000 | Lim et al. | 719/316 |
| 6,041,365 | A * | 3/2000 | Kleinerman | 719/328 |
| 6,061,714 | A * | 5/2000 | Housel et al. | 709/203 |
| 6,064,666 | A * | 5/2000 | Willner et al. | 370/352 |
| 6,108,711 | A * | 8/2000 | Beck et al. | 709/242 |
| 6,124,880 | A * | 9/2000 | Shafiee | 348/14.08 |
| 6,144,988 | A * | 11/2000 | Kappel | 709/202 |
| 6,151,624 | A * | 11/2000 | Teare et al. | 709/217 |
| 6,185,197 | B1 * | 2/2001 | Cheung Yeung et al. | 370/328 |
| 6,199,081 | B1 * | 3/2001 | Meyerzon et al. | 715/210 |
| 6,278,097 | B2 * | 8/2001 | Inoue | 219/679 |

(Continued)

OTHER PUBLICATIONS

Merrick et al., "Web Interface Definition Language (WIDL)", Sep. 22, 1997, NOTE-widl-970922, http://www.w3.org/TR/NOTE-widl-970922, W3C, pp. 1-16.*

(Continued)

*Primary Examiner* — Gregory Todd
(74) *Attorney, Agent, or Firm* — Sughrue Mion, PLLC

(57) ABSTRACT

An integration server translates transmissions from clients and servers to a form that each can understand. The integration server accomplishes this through invocation of one or more services, and a flow language is disclosed for managing the flow of data through the services. In addition, service invocation results are cached for later use on reception by the integration server of the same or equivalent service invocation request.

14 Claims, 48 Drawing Sheets

(56) References Cited

U.S. PATENT DOCUMENTS

| | | | | |
|---|---|---|---|---|
| 6,278,697 | B1 * | 8/2001 | Brody et al. | 370/310 |
| 6,457,066 | B1 * | 9/2002 | Mein et al. | 709/230 |
| 6,704,785 | B1 * | 3/2004 | Koo et al. | 709/227 |
| 6,724,747 | B1 * | 4/2004 | Arango et al. | 370/352 |
| 6,732,175 | B1 * | 5/2004 | Abjanic | 709/227 |
| 6,763,353 | B2 * | 7/2004 | Li et al. | 719/320 |
| 6,801,911 | B1 * | 10/2004 | Berstis | 707/10 |
| 6,810,429 | B1 * | 10/2004 | Walsh et al. | 709/246 |
| 6,912,529 | B1 * | 6/2005 | Kolfman | 707/999.005 |
| 7,043,532 | B1 * | 5/2006 | Humpleman et al. | 709/208 |
| 7,117,227 | B2 * | 10/2006 | Call | 709/219 |
| 7,668,782 | B1 * | 2/2010 | Reistad et al. | 705/50 |
| 7,792,981 | B2 * | 9/2010 | Taylor | 709/230 |
| 2001/0042081 | A1 * | 11/2001 | MacFarlane et al. | 707/513 |

OTHER PUBLICATIONS (No author given), "Extensible Markup Language (XML)", Nov. 14, 1996, W3C, http://www.w3.org/TR/WD-xml-961114.html, pp. 1-28.*

Bosak, Jon, "XML, Java, and the future of the Web", Mar. 10, 1997, Sun Microsystems, http://www.ibiblio.org/pub/sun-info/standards/xml/why/xmlapps.htm, pp. 1-9.*

Golfarb et al., "The XML Handbook", Jun. 1998, Prentice Hall, 1st Ed., pp. 555-568.*

Microsoft Corporation, BizTalk "Enabling Software to Speak the Language of Business", Jan. 1, 2000, http://web.archive.org/web/20000925115612/http://206.132.62.135/BTF1_0.doc, p. 1-25.*

Microsoft News Center, "Microsoft Announces Finalized BizTalk Framework", Dec. 7, 1999, http://www.microsoft.com/en-us/news/press/1999/dec99/biztalk10pr.aspx, p. 1-3.*

Microsoft.com PressPass, "Microsoft Debuts BizTalk Server 2000", Apr. 11, 2000, http://www.microsoft.com/presspass/press/2000/Apr00/BizTalkPR.asp, p. 1-2.*

Merrick et al, "Web Interface Definition Language (WIDL)", NOTE-widl-970922, http//www.w3.org/TR/NOTE-widl-970922, Submitted to W3C Sep. 22, 1997, pp. 1-16.

(no author given), "Extensible Markup Language (XML)—W3C Working Draft Nov. 14, 1996", http://www.23org/TR/WD-xml-961114.html, Nov. 14, 1996, pp. 1-28.

Bosak, Jon, "XML, Java, and the future of the Web", Sun Microsystems, http://www.ibiblio.org/pub/sun-info/standards/xml/why/xmlapps.htm, Mar. 10, 1997, pp. 1-9.

Goldfarb et al, "The XML Handbook", Prentice Hall, pp. 555-568, 1998.

Tigue, "XML Enabled Mechanisms for Distributed Computing on the Web", Documentation East 1997, Oct. 20, 1997.

Winer, "RPC over HTTP via XML", http://davenet.userland.com/1998/02/27/rpcOverHttpViaXml, Feb. 27, 1998.

Tigue et al, "WebBroker: Distributed Object Communication on the Web", http://www.23.org/TR1998/NOTE-webbroker-19980511/, May 11, 1998.

Walsh, "Microsoft spearheads protocol push", http://www.infoworld.com/cgi-bin/displaystory.pl?980710.whsoap.htm, Jul. 10, 1998.

Winer, "XML-RPC for Newbies", http://davenet.userland.com/1998/07/14/xmlRpcForNewbies, Jul. 14, 1998.

Winer, XJL-RPC for Geeks, http://davenet.userland.com/1998/07/19/xmlRpcForGeeks, Jul. 19, 1998.

"Allaire Announces the Web Distributed Data Exchange (WDDX)", http://www2.allaire.com, Dec. 8, 1998.

Winer, "The Politics of Plumbing", http://davenet.userland.com/1999/02/04/politicsofplumbing, Feb. 4, 1999.

http://www.xmlrpc.com, Oct. 1, 1999.

Lapp, "WIDL", presentation slides from a speech delivered at XML '98 on Nov. 17, 1998.

Lapp, "XML IDL and XML RPC", posting to XML.org web site on Sep. 22, 1998.

"webMethods' Web Automation Toolkit Adds Visual Basic and Intelligent Document" Support, webMethods press release Dec. 10, 1997.

"webMethods Announces XML-Based Web Automation Toolkit to Be Available Free on the Internet", webMethods press release Mar. 4, 1998.

"What Is XML?", http://www.webmethods.com/xml/about_xml.html, Feb. 20, 1999.

"The Forthcoming Metadata Revolution", Nov. 1997 NC. Focus Monthly Bulletin, pp. 1-7.

* cited by examiner

The Integration Platform

The WIDL Way

FIG. 15

The Mapping Mechanisms

| | When Request is | Request Maps with | Reply Maps with |
|---|---|---|---|
| HTML / CGI | Sent | WIDL Input Binding | WIDL Output Binding |
| | Received | HTTP Server Agent | Template |
| XML | Sent | Template | WIDL Output Binding |
| | Received | WIDL Output Binding | Template |
| Program APIs | Sent | Call to WIDL-generated code | Return from generated code |
| | Received | Call to WIDL APIs | Return from WIDL APIs |

FIG. 16A

Supplier WIDL_SPEC

```
<WIDL-SPEC NAME="Supplier" VERSION="3.2">
   <METHOD NAME="order" INPUT="Purchase"
                           OUTPUT="Receipt"/>
   <RECORD NAME="Purchase">
     <VALUE NAME="partNumber"/>
     <VALUE NAME="quantity"/>
   </RECORD>
   <RECORD NAME="Receipt">
     <VALUE NAME="confirmationNumber"/>
   </RECORD>
</WIDL-SPEC>
```

FIG. 16B

Parcel WIDL-SPEC

```
<WIDL-SPEC NAME="Parcel" VERSION="3.2">
   <METHOD NAME="track" INPUT="Handle" OUPUT="Status"/>
   <RECORD NAME="Handle">
     <VALUE NAME="trackingID"/>
   </RECORD>
   <RECORD NAME="Status">
     <VALUE NAME="disposition"/>
     <RECORDREF NAME=" destination" RECORD="Address"/>
   <RECORD>
   <RECORD NAME="Address">
     <VALUE NAME="STREET" DIM="1"/>
     <VALUE NAME="ZIP"/>
   </RECORD>
</WIDL-SPEC>
```

FIG. 16C

SupplierQ WIDL-MAPPING

```
<WIDL-MAPPING NAME="SupplierQ" VERSION="3.2">

   <SERVICE NAME="order" URL="http://www.q.com/order"
         METHOD="GET" INPUT="Purcase" OUTPUT="Receipt"/>
   <INPUT-BINDING NAME= "Purchase">
     <VALUE NAME="partNumber" FORMNAME="pid"/>
     <VALUE NAME="quantity" FORMNAME="cnt"/>
   </INPUT-BINDING>
   <OUTPUT-BINDING NAME-"Receipt">
     <VALUE NAME="confirmationNumber">
           TABLE[1] .TR[2].TD[0].text</VALUE>
   <OUTPUT-BINDING>
<WIDL-MAPPING>
```

FIG. 17
Mapping to Program APIs
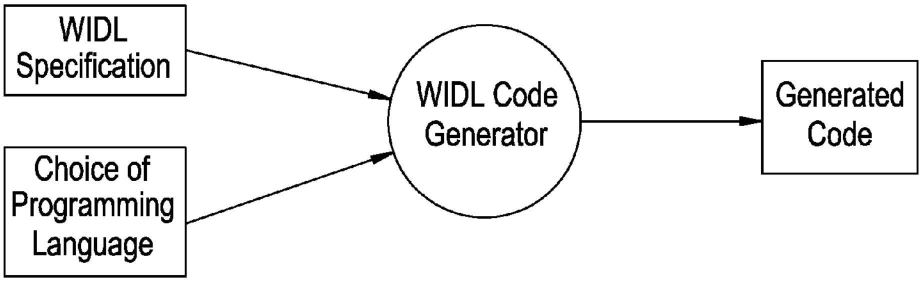
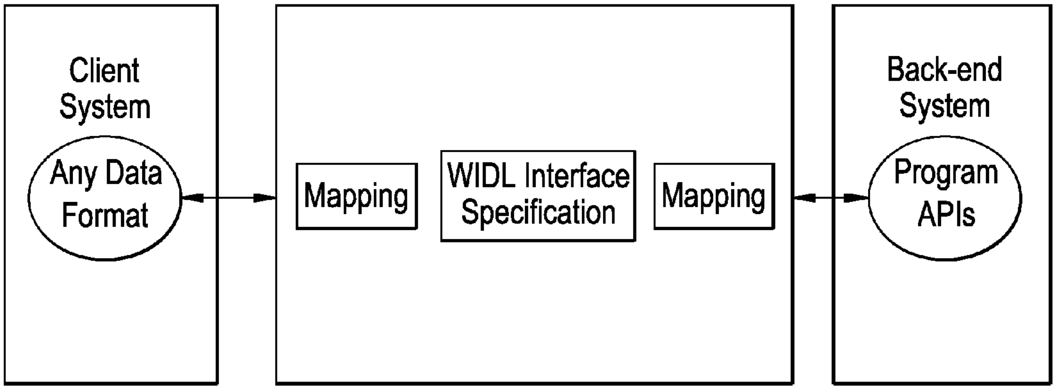

FIG. 18

Example Generated Code

```
public class SupplierQ extends Service
{
  public static Values order (Session session,
                        Values in)
  {
    Purchase p = new Purchase (in) ;
    String confirm = fulfillOrder (session.getUser( ),
                        p.partNumber,
                        p.quantity);
    Values out = new Values ( );
    out.put ("confirmationNumber", confirm);
    return out;
  }
}
```

FIG. 27

```
/*
 * Copyright (c) 1996-1999, webMethods Inc. All Rights Reserved.
 */
import java.util.*;
public class Values
{
   //Contructors

   public Values ( )
   public Values (Hashtable h)
   public Values (int size)

   //Core methods

   public Object put (String k, Object value)
   public Object get (String key)
   public Object get (int index)
   public Object remove (String key)
   public boolean contains (Object value)
   public Enumeration elements ( )
   public boolean containsKey (String key)
   public boolean isEmpty( )
   public int size ( )
   public Enumeration keys ( )
   public boolean equals (Object in)
   public Object clone ( )

   // Type-safe methods

   public Object put (String key, int value)
   public Object put (String key, long value)
   public Values getValues (String key)
   public Values[ ] getValuesArray (String key)
   public String getString (String key)
   public String[ ] getStringArray (String key)
   public int getInt (String key)
   public long getLong (String key)
   public boolean getBoolean (String key)
}
```

FIG. 28

```
/*
 * Copyright (c) 2000, webMethods Inc. All Rights Reserved.
 */
package com.wm.data;

// ---( imports )---
import java.util.Enumeration;
public interface IData
{
      public IDataCursor getCursor ( )
           ;
      public IDataIndexCursor getIndexCursor ( )
           ;
      public IDataTreeCursor getTreeCursor ( )
           ;
      public IDataHashCursor getHashCursor ( )
           ;
   public IData copy ( )
      ;
}
```

FIG. 29

```
/*
* Copyright (c) 2000, webMethods Inc. All Rights Reseerved.
*/
package com.Wm.data;
// ---( imports )---
public interface IDataCursor
{
     public String getKey ( )
            ;
     public Object getValue ( )
            ;
     public void setKey (String key)
            ;
     public void setValue (Object value)
            ;
     public boolean delete ( )
            ;
     public void insertBefore (String key, Object value)
            ;
     public void insertAfter (String key, Object value)
            ;
     public IData insertDataBefore (String key)
            ;
     public IData insertDataAfter (String key)
            ;
     public boolean next ( )
            ;
     public boolean previous ( )
            ;
     public boolean first ( )
            ;
     public boolean last ( )
            ;
     public boolean hasMoreData ( )
            ;
     public void destroy ( )
            ;
     public IDataCursor getCursorClone ( )
            ;
}
```

FIG. 30

```
/*
* Copyright (c) 2000, webMethods Inc. All Rights Reserved.
*/
package com.wm.data;

// ---( imports )---

public interface IDataIndexCursor extends IDataCursor
{
     // ---( interface methods )---
     public boolean seek (int index)
           ;
     public int count ( )
           ;
}
```

FIG. 31

```
/*
* Copyright (c) 2000, webMethods Inc. All Rights Reserved.
*/
package com.wm.data;

// ---( imports )---

public interface IDataTreeCursor extends IDataCursor
{
     public boolean up ( )
           ;
     public boolean down ( )
           ;
}
```

FIG. 32

```
/*
* Copyright (c) 2000, webMethods Inc. All Rights Reserved.
*/
package com.wm.data;

// ---( imports )---

public interface IDataHashCursor extends IDataCursor
{

     // --- (interface methods) ---
     public boolean first (String key)
          ;
     public boolean last (String key)
          ;
     public boolean next (Sting key)
          ;
     public boolean previous (String key)
          ;
}
```

FIG. 33A pub.web:loadDocument

Description Retrieves a specified XML or HTML document via HTTP or HTTPS and returns a parsed Document object that can be used as input to any service that accepts a *node*

Input

| Variable | Type | Description |
|---|---|---|
| *url* | String | Specifies the URL of the document you want to load. This string must begin with http: or https:<br>Example http://www.rubicon.com/orders/orders.html<br>https://localhost:5555/WmPublic/index.html |
| *method* | String | Specifies the HTTP method you want loadDocument to use.<br>You must set *method* to either get or post. |
| *auth* | IData | Optional. Specifies autthorization information that loadDocument will submit if the resource specified in *url* is protected |

| Element | Type | Description |
|---|---|---|
| *type* | String | Type of authentication you want loadDocument to use to submit this request.<br>Currently, only basic authentication is supported. If you are accessing a protected resource, set *auth* to Basic. |
| *user* | String | The user name that loadDocument will submit when it requested a protected resource. |
| *pass* | String | The password associated with *user.* |

| Variable | Type | Description |
|---|---|---|
| *headers* | IData | Optional. Specifies field that you want to explicitly override in the HTTP request header issued by loadDocument.<br>Specify one element in the *headers* IData object for each header field that you want to set, where:<br>— The element's name represents the name of the header field, and...<br>— The element's value represents the value of that header field.<br>If you do not set *headers*, loadDocument will use its default header values. |
| *encoding* | IData | The character set in which the returned document is encoded. The parser requires this value in order to interpret a document correctly |

| Set encoding to... | To... |
|---|---|
| autoDetect | Determine the document's character set based on document type, where:<br>— ISO-8859-1 is used for HTML<br>— UTF-8 is used XML |
| The name of a registered, IANA character set | Decode the document using that character set.<br>Example ISO-8859-1 |

FIG. 33B

If you do not specify an *encoding* value, loadDocument decodes the returned document using the following defaults:

| If the document is... | It is decoded using... |
|---|---|
| HTML | ISO-8859-1 |
| XML | UTF-8 |

*data* IData Optional. Specifies data that you want loadDocument to submit with the HTTP request.

Specify your data in one or more of the following elements.

(!) When you use more than one element to submit data with loadDocument, *args* is appended first, *table* is appended second, and *string* is appended last.

| Name | Type | Description |
|---|---|---|
| *args* | IData | Specifies name=value pairs that you want loadDocument to submit to the resource in *url*<br>You can use args to submit data via either the POST or GET method.<br>To specify data using *args*, create one element for each name=value pair that you want to submit, where:<br>— The element's name represents the name portion of the pair, and...<br>— The element's value represents the value portion of the pair.<br>Note that when you use *args*, LoadDocument will:<br>— automatically URL-encode name=value pair, so you do not need to url-encode the values you specify in *args*.<br>— automatically insert the "&" character between pairs, so you do not need to include it in *args*.<br>— automatically prefix the entire query string with the "?" character if it submits the data in *args* via a GET. You do not need to include this character in *args*.<br>When you submit data using the *args* variable, webMethods B2B automatically sets the value of the Content-Type header to application/x-www-form-urlencoded.<br>If you want to explicitly specify a different content type, you must submit your data using the *string* or *bytes* variable. |

FIG. 33C

| Name | Type | Description |
|---|---|---|
| *table* | String[ ] [ ] | Specifies data that loadDocument will use to construct a query string to submit to the resource specified in *url*.<br>*table* is similar to *args*, but it allows you to submit unnamed values in a query string, not just name=value pairs.<br>To specify data using table, create one row for each value that you want to submit, where:<br>— The contents of column 0 represents the name portion of the pair (leave this column null to submit an unnamed value, and...<br>— The contents of column 1 represents the value portion of the pair.<br>When you submit data using *table* variable, webMethods B2B automatically sets the value of the Content-Type header to application/x-www-form-urlencoded. If you want to explicity specify a different content type, you must submit your data using the *string* or *bytes* variable. |
| | | Note that when you use *table*, loadDocument will:<br>— Automatically URL-encode name=value pair, so you do not need to URL-encode the values you specify in *table*.<br>— Automatically insert the "&" character between the pairs (or unamed values) that it constructs, so you do not need to include it in *table*.<br>— Automatically prefix the entire query string with the "?" character if it submits the data in *table* via the GET method. You do not need to include this character in *table*. |
| string | String | Specifies a string of text that you want loadDocument to submit to the resource in url.<br>You can use string to submit data via either the POST or GET method. |

FIG. 33D

If you use *string* to specify data you want loadDocument to submit, make sure that you specify the string exactly as you want it presented in the HTTP request. (If you are using the GET method, make sure you URL-encode the contents of *string*). When performing a POST the string will be submitted to the resource defined by *url* as the body of the document.

| Name | Type | Description |
|---|---|---|
| *bytes* | bytes[ ] | Specifies an array of bytes that you want loadDocument to submit to the resource in *url*.<br>You can only use *bytes* to submit data via the POST method.<br>(!) When you use *bytes* and another element (*args, table,* or *string*) to submit data with loadDocument, the service appends the data from the *args, table,* or *string* element to *url* The service appends *args* to *url* first, *table* second, and *string* last. The service encodes the data from the *bytes* element in the body of the post. |

*expandDTD* String

Determines whether or not loadDocument processes references to parameter entities in the returned document's DTD.

| Set expandDTD to... | To... |
|---|---|
| true | Expand references to parameter entities to their full definition. |
| false | Ignore references to parameter entities in the document's DTD. |

The default value is false.

*isXML* String

Specifies whether the returned document is XML or HTML. loadDocument must know this order to parse a document correctly.

| Set isXML to... | To... |
|---|---|
| auto Detect | Parse the document based on its type. When you use this option, loadDocument senses the documents's type based on its <!DOCTYPE...>or<?XML...> tag. If it cannot determine a document's type, it parses it as HTML. |
| true | Parse the document as XTML. |
| false | Parse the document as HTML. |

The default value is autoDetect.

FIG. 33E

|  | loadAs | String | Specifies the form in which you want loadDocument to make the parsed document avalable to subsequent services. |  |
|---|---|---|---|---|
|  |  |  | Set loadAs to... | To... |
|  |  |  | bytes | Pass the parsed document as a byte array. Use this option if the document will be used as input to a service that operates on whole documents (for example, queryDocument). |
|  |  |  | Set loadAs to... | To... |
|  |  |  | stream | Pass the parsed document as an input stream. Use this option if the document will be used as input to a service that can process a document incrementally (for example, getNodeIterator). |
| Output | Variable | Type | Description | |
|  | node | Document | Document object containing the parsed HTML or XTML document. This object can be used as input to any service that accepts a node. | |

FIG. 34A pub.web:queryDocument

Description Executes queries on a document, region, or node to generate output variables. Each field specifies how data is extracted from the document to yield an output variable. This output variable.may be called a *binding,* because the field parameter binds a certain part of the document to an output variable. An invocation must include at least one *field* entry.

— The *fields* parameter can contain nested definition of fields, which will produce a nested binding as the result.

— If a *fields* parameter is to create an instance of each of the children for each result, it should have resultType Record [].

— If a *fields* parameter is to create only a set of children for the first result value, it should be defined with resultType Record.

— If a *fields* parameter has any children, its query must return a node object and be defined as resultType Record or return a node array and be defined as resultType Record.[].

— If a parent has no query, the children query the same node that the parent would have, allowing you to group child results into a Record or Record[].

— If the parent returns a node, each child queries that node (and only that node) once and fills the IData instance. In this case, the parent must be defined as returning a Record (not an Object).

— If the parent returns a node, each child queries that node (and only that node) once and fills the IData instance. In this case, the parent must be defined as returing as returning a record (not an Object).

If the parent returns a node array, each child queries each node once and fills the IData[ ] object. In this case, the parent must be defined as returning Record[ ] (not an Object[]). the result of each *root* field (top level parent) is put into the pipeline in a variable named for the field name. Child fields cannot reference a region unless the parent node has no query and the input node is set to a region.

| Input | Variable | Type | Description |
|---|---|---|---|
| | *node* | Node<br>Document<br>Region | The node that you want to query. (A *node* is produced by loadDocument, stringToDocument, createRegions,or one that the webMethods B2B Server content handlers.) |
| | *nsDecls*<br>optional | IData<br>IData[ ]<br>Vector<br>String[ ][2] | XML namespace declarations to use with the XQL queries specified with the *fields* input. When *nsDecls* is a IData[ ], each IData object provides a namespace declaration and is defined as follows: |

| Element | Type | Description |
|---|---|---|
| *Prefix* | String | Prefix that represents the URI in queries. |
| *Uri* | String | URL identifying the XML namespace. |

— When *nsDcls* is a single IData instance, the key identifies the prefix, and the value identifies the URL.

— When it is a Vector, *nsDecls* contains a collection of IData instance as defined above.

— When it is a String[][ [2] , the first column is the prefix and the second is the URI.

| Input | Variable | Type | Description |
|---|---|---|---|
| | *fields* | IData[ ][ ] | Each field defines how a value is extracted from a document. This parameter defines fields for the values that are to be extracted. Each field is defined as follows: |

| Element | Type | Description |
|---|---|---|
| *Name* | String | Name to assign to resulting value. |

FIG. 34B

| | | |
|---|---|---|
| *resultType* | String | Primitive type of the value or values that the query is to yield. Valid values are Object,Object[], Object[] [], String, String[], String[] []. |
| *queryType* | String | Query language in which the query for the value is expressed. Valid values are WQL and XQL. |
| *query* | String | Query identifying the value to return. |
| *onnull* | String | Specifies what you want queryDocument to do when the result is null:<br>continue - All result values are legal.<br>fail – If the result of the query is null, the service fails. If the result of the query is is not null, the service continues.<br>succeed - If the result of the query is null, the service continues. If the result of the query is not null, the service fails. |

| Element | Type | Description |
|---|---|---|
| *Fields* | IData | A nested set of fields parameters that support recursive execution of bindings. Each array of fields records define bindings for one level of the output with the top level being the pipline and the first level down being the contents of a IData or IData[] object that is in the pipeline. |

Output IData instance defined by the *fields* input specifications. There will be one output variable for each *field* specified with nested IData instances for the results of the child fields.

Architecture of a Sequence

Composition of Flow Operations

The Flow Service

The Sequence Operation

The Branch Operation

The Retry Operation

The Loop Operation

The Invoke Operation

INTEGRATION SERVER SUPPORTING MULTIPLE RECEIVING CHANNELS

This application is a continuation-in-part of application Ser. No. 09/274,979 filed Mar. 23, 1999, now U.S. Pat. No. 7,028,312 incorporating by reference the disclosures of Application No. 60/079,100 filed Mar. 23, 1998 and Application No. 60/096,909 filed Aug. 17, 1998, and also claims benefit of and incorporates by reference Application No. 60/132,440 filed May 4, 1999.

BACKGROUND OF THE INVENTION

1. Field of the Invention

The present invention is directed to an integration server which provides access to one or more services executed by either the integration server or one or more additional servers in communication with the integration server. The invention is further directed to a method of operating the integration server. Finally, the invention is directed to a flow control language and program and to an integration server executing a flow control program to control the flow of data amongst plural services and to control the sequence of operation of those services.

2. Overview of Background

Nearly every corporation now maintains a Web site, and the conducting of transactions and transfer of information over the Internet has become an essential business tool. Customers, suppliers, distributors, and other partners now use the Web to browse catalogs, place orders, execute electronic transactions, monitor inventory levels, check the status of shipments, review account information, and conduct other operations. Web-based storefronts have been integrated with backend order entry systems, and Web-based customer care systems are being directly linked with the backend customer information and accounting systems.

While the Web has achieved the extraordinary feat of providing ubiquitous accessibility to end-users, it has in many cases reinforced manual inefficiencies in business processes as repetitive tasks are required to transcribe or copy and paste data from browser windows into desktop and corporate applications.

Business units that have previously been unable to agree on middleware and data interchange standards were (by default) agreeing on HTTP and HTML as data communication and presentation standards. Because of the overwhelming focus on the browser, almost all Web applications required interaction with a human user. The problem of direct access to Web data from within business applications had until recent years been largely ignored, as had the possibility of using the Web as a platform for automated information exchange between organizations.

One problem with prior art Web information transfer technology is that there are many different message encoding techniques used by various applications on the Web. When one application wishes to message another it must generate a message in an encoding that it knows, and the message must be delivered to the recipient application in an encoding that the recipient knows. The sender might use any of a number of encodings, and the recipient may require a different encoding.

The problem of communication between systems using different native data formats can be addressed in a number of ways. E.g., the system at one end can take responsibility for converting back and forth between its own native format and that of the other system, with communications always handled in the native language/encoding format of the other system. Or each system could communicate in a common data format, e.g., conventional EDI, or using a common wire protocol, e.g., (e.g., CORBA ORBs). The most common technique for addressing the problem has been to hardcode the translation from one particular encoding to another particular encoding. However, the limitations of hardcoded translation solutions are clear, particularly the inability to translate between other than two encodings.

There is a need, then, for an improved translation mechanism, particularly one capable of translating between multiple message encodings.

This problem of interoperability can be better understood from the following more detailed explanation.

DETAILED BACKGROUND

When information is conveyed from one system to another system, a channel connects the two systems together and the information passes between the systems via the channel. Systems include computers, operating systems, virtual machines, programs, processes, software modules or classes, and collections of systems. Channels include remote communication mechanisms, inter-process communication mechanisms, and the procedure calling conventions of programming languages. Remote communication mechanisms are generally protocols that allow a system to send information to a remotely located system, such as when sending information between programs resident on different computers that reside on the same network. The present application uses the term transport channel to refer to a remote communication mechanism. Transport channels include HTTP, FTP, SMTP, CORBA RPC, DCE RPC, and Java RMI.

A message is a unit of information that passes between systems via a channel. The process of passing a message from one system to another is called transmission, and one system is said to transmit the message to the other. A message transmits through a channel in a representation known as an encoding. Message encodings may vary by channel. Encodings include specific XML-RPC, generic XML-RPC, HTTP CGI, HTML, binary object serializations, OMG IIOP CDR, DCE, EDI, and the stack and register representations of parameters passed during procedure calls within programming languages.

The present application defines a number of terms that are useful in the discussion of message transmission. A protocol is a channel/encoding. The content of a transmission, or the transmission content, is the information conveyed by one system to the other system. This information includes the transmitted message, but it may also include information that found in traditional protocol headers, such as originator identification and message type. Finally, a system that sends a message via a transmission is said to send the transmission, and a system that receives a message via a transmission is said to receive the transmission.

FIG. 1A depicts two systems communicating via a protocol. In this figure, a message transmits from system 100 to system 101 through a channel. FIGS. 1B and 1C provide the notations subsequent figures use to represent this process. In FIG. 1B the arrow indicates the direction in which the message travels. In a figure that illustrates multiple transmissions, sometimes it is important to distinguish among the protocols used by the transmissions. In FIG. C the symbol on the arrow uniquely identifies the protocol, whereas in FIG. B the protocol is not considered significant and is not designated. Different protocols will use different symbols. Often in subsequent diagrams, an arrow between two systems indicates that one system is capable of transmitting a message to the other system, rather than indicating that a transmission actually occurs. The context in which the figure is discussed should indicate the intended meaning.

A service is a unit of functionality that a system exposes for use by one or more other systems. A system that provides services is known as a server. A system that is capable of using the services of a server is known as a client. A system may be both a client and a server, and a server may even be a client of itself. When a server provides multiple services, the server must provide a way for clients to identify each service. Each service is conventionally only available through a single channel, and each channel provides a different mechanism for identifying a service through the channel.

A request message is a message that transmits from a client to a server and that causes the server to perform the functionality of one of its services. If the channel through which the message is transmitted supports more than one service, the client must identify the service to use either through a facility of the channel or within the request message itself. In other words, the content of a transmission must identify the service. The request message may contain information that affects the function that the service performs. A reply message is a message that-transmits from a server to a client in response to a request message. Reply messages may transmit to the client before, during, or after the server performs the functionality of the service. A server may send zero or more reply messages in response to a single request message. The timing of the reply message is normally a function of the channel used, but it is possible to emulate asynchronous replies on top of synchronous channels.

Not all channels support reply messages. Those that do may transmit request and reply messages using slightly different mechanisms. They may even send request and reply messages in different encodings. Because a protocol includes a channel, one may refer to request messages and reply messages being transmitted over a given protocol. However, request and reply messages are sent via separate transmissions. When a protocol includes a channel that uses different encodings for request and reply messages, the protocol is still said to include a single encoding. This single encoding may be abstractly considered to be the union of the request and reply encodings, where the mode of usage—within a request message or a reply message—further constrains the form the encoding may take in a given transmission. The present application uses this abstraction to simplify discussions.

FIG. 2A illustrates the process of transmitting messages between a client 102 and a server 103. In step 1, the client 102 sends a request message to the server 103. The server identifies the service to perform and performs this service. Performing a service is also called invoking or executing the service. In this case, the server 103 identifies and invokes service 104. When the service completes, it may return a reply message. The server may then transmit the reply message to the client. Neither the service nor the server need produce a reply message. Whether a reply message is required depends on the protocol. In some protocols, the reply message is sent to inform the client either that the request message was received or that the destination service completed its execution. FIG. 2B illustrates the notation subsequent diagrams use to represent the pair of request and reply message transmissions depicted in FIG. 2A. Again, whether a reply actually occurs varies by protocol. When it is necessary to distinguish the protocols used by the transmissions, a symbol uniquely identifying the protocol will overlay the arrow, as shown in FIG. 2C.

A given system may only be able to accept or provide messages using certain protocols. A client may require the use of a server's service but may not be able to use the service because the two systems do not support the same protocol. The client may already be capable of sending a message that contains all the information required by the server's service, but because of the protocol mismatch, no communication occurs between the systems.

A translator is a system that sits between two or more systems and transmits messages between the systems by using protocols known to the systems. The systems that communicate with a translator are known as end-points. A translator transmits messages by receiving messages from one channel, comprising a first transmission, converting the messages into messages having encodings accepted by the second channel, and then transmitting the converted messages to the second end-point using the second channel, comprising a second transmission. This process is referred to as translating the first transmission into the second transmission. More generally, the transmission content of the second transmission derives from the transmission content of the first transmission. That is, information not occurring in the message of the first transmission may not occur in the message of the second transmission, and information occurring in the message of the first transmission may be conveyed in the content but not the message of the second transmission. It is possible that a message received from one end-point may be sent as multiple separate messages to the other end-point. It is also possible that unnecessary information may be dropped in the process of conversion or that additional information must be added during the conversion, possibly by retrieving this information from other end-points. A translator may also transmit a message between channels without converting the message.

FIGS. 3A through 3D depict examples of behaviors that a translator may have in response to receiving a request message from one end-point. In FIG. 3A, a translator 106 receives a message from end-point 105 via one protocol and responds by transmitting a message to end-point 107 via a different protocol. In FIG. 3B, the translator 106 responds by transmitting two messages, transmitting one message to each of two different end-points 107 and 108 via a second and third protocol. In FIG. 3C, the translator 106 responds by transmitting two messages, transmitting each to the same end-point 107, transmitting both via the same protocol. In FIG. 3D, the translator 106 responds by transmitting three messages, each via a different protocol, transmitting two of the messages to the same end-point 107 and transmitting the third message to end-point 108. Many other behaviors are possible.

A translator is both a server and a client. Let the term front-end system refer to an end-point that transmits a request message to a translator, and let the term back-end system refer to an end-point to which a translator transmits a request message. Note that these terms refer to the roles that systems assume during a transmission and that a system may serve as a front-end system in some transmissions and as a back-end system in other transmissions. A translator is a server for a front-end system and provides services to the front-end system. Let the term translation service refer to a service of a translator. A translation service may be a proxy for a service of a back-end system, but not all translation services need be proxies. Since a request message from a front-end system need not correspond directly to a request message that a back-end system accepts, a given translation service may engage multiple services on a single back-end system or even the services of multiple back-end systems. Translation services may therefore be unique services not provided by any single back-end system.

FIGS. 4A and 4B convey two examples of the sequence of events that may occur when a front-end system communicates with a back-end system using a translator. These and subsequent diagrams use the term 'fE' to refer to a front-end system and the term 'bE' to refer to a back-end system. With reference to FIG. 4A, in step 1, fE 105 transmits a request message to translator 106. In step 2, translator 106 responds to receipt of the message from fE 105 by transmitting a request message to bE 107. In step 3, bE 107 responds to receipt of the message from translator 106 by transmitting a reply message back to translator 106. In step 4, translator 106 responds to receipt of the message from bE 107 by transmitting a reply message to fE 105. In this sequence, the reply message transmitted from translator 106 to fE 105 indicates that bE 107 received the translated request message. This reply message may also contain information provided by bE 107.

In FIG. 4B, in step 1, fE 105 transmits a request message to translator 106. Translator 106 responds to receipt of the message from fE 105 by transmitting two messages. These transmissions are represented as concurrent steps 2*a* and 2*b*. In step 2*a*, translator 106 transmits a request message to bE 107, and in step 2*b*, translator 106 transmits a reply message to fE 105. This reply message informs fE 105 that translator 106 received the request message that fE 105 transmitted. In step 3, bE 107 responds to receipt of the message from translator 106 by transmitting a reply message to back to translator 106. In step 4, translator 106 responds to receipt of the message from bE 107 by transmitting a reply message to fE 105. In this sequence, the reply message transmitted from translator 106 to fE 105 indicates that bE 107 received the translated request message. This reply message may also contain information provided by bE 107. In this sequence, a front-end system received two reply messages in response to transmitting one request message.

FIGS. 5A and 5B illustrate the relationships translator services may have with back-end systems and exemplify the role of translation services in FIGS. 3A through 3D. FIG. 5A embellishes on FIG. 3A by illustrating the translation services that the translator 106 could provide. Three translation services are depicted for illustrative purposes only: a translator can have one or more translation services. In FIG. 5A, fE 105 invokes translation service 109, which communicates with bE 107. Likewise, FIG. 5B embellishes on FIG. 3B. FIG. 5B illustrates fE 105 invoking translation service 110, which communicates with both bE 107 and bE 108.

A translator may support channels, encodings, and translation services independently of one another. For example, a translator may support a service that accepts a purchase order, processes the purchase order by forwarding the order information to a back-end system, and then returns a receipt. The purchase order might be transmitted to the translator encoded as a binary DCE CDR message or as an XML message. If the encoding is XML, the XML=document might be any of a variety of different document types for purchase orders, including purchase orders defined for Common Business Language (CBL) or RosettaNet. To transmit the message to the translator, a client might use HTTP or FTP or Java RMI. In this example, channel, encoding, and service were independent of each other. Sometimes dependencies are inherent between the channel and encoding, such as the Common Gateway Interface (CGI) encoding, which is only designed for use with HTTP. Likewise, sometimes dependencies are inherent between the encoding and the translation service, such as when only one encoding is capable of expressing a service's inputs.

As described herein, a translator is extensible if it is possible to add to an already-installed translator support for one or more channels, encodings, or translation services that the translator did not previously support. One extends an already-installed translator by installing additional hardware or software components known as adapters. Adapters are often translators too, suggesting that extensible translators are often composites of simpler translators. For example, an adapter might convert between the particulars of a single network transfer protocol, such as HTTP, and translator-internal programming language APIs, such as a C library. An adapter may even be a complex component that provides support for multiple channels, encodings, or translation services. Such an adapter might even itself be a composite translator.

FIGS. 6A through 6C illustrate an extensible translator. In these figures, no two end-points use the same protocol, and hence a translator is needed to transmit a message between any two of them. FIG. 6A depicts a translator 112 deployed with only a single adapter 117. This adapter allows fE 113 to communicate with bE 115 by bridging the differences in their corresponding protocols. In FIG. 6B, we have extended the translator 112 by adding adapter 118, which allows fE 113 to communicate with bE 116. fE 113 is now able to communicate with both back-end systems. In FIG. 6C, we have extended the translator 112 by adding adapter 119, which allows fE 114 to communicate with bE 116. Using this architecture, a fourth adapter would be required to allow fE 114 to communicate with bE 115. Extensible translators can be implemented using other architectures as well.

Translation software is generally specific to the direction in which it translates messages. For example, code that translates HTTP CGI into Java classes is normally distinct from code that translates Java classes into HTTP CGI. Hence, it is possible for an adapter to translate data in only one direction between the protocols that the adapter supports. The present application refers to this kind of adapter as a one-way adapter. It is also possible for a single adapter to translate data in both directions, but such adapters usually contain at least some code that is distinct for each direction. For this reason, one may think of such an adapter as consisting of two one-way adapters, and the discussion may refer to all adapters as one-way adapters.

The function of an adapter depends on the kind of translator it extends. There are at least two general kinds of translators: direct translators and common protocol translators. In a direct translator, each adapter assumes responsibility for converting front-end system messages directly into back-end system messages and for providing the required translation services. These adapters are normally designed to communicate only over specific channels, even if they don't directly implement the channels. When a front-end system uses a service of a direct translator, the system is restricted to invoking the service using only the particular channel and the particular encoding that the associated adapter supports. FIGS. 6A through 6C depict direct translators.

In a common-protocol translator, each adapter converts between a protocol required by an end-point and a protocol that is internal to the translator. The internal protocol is called the common protocol, and its encoding is called the common encoding. A front-end adapter translates the protocol of a front-end system into the common protocol, and a back-end adapter translates the common protocol into the protocol of a back-end system. A front-end adapter receives a request message from a front-end system and then uses the common protocol to transmit this message to a component that implements a translation service. This component is known as an integration service. The integration service implements the translation service by using the common protocol to transmit messages to one or more back-to end adapters. The back-end adapters in turn message the back-end systems. It is possible to design a common-protocol translator that allows front-end systems to independently select the integration service and the protocol.

FIG. 7A illustrates the overall architecture of a common protocol translator. According to this figure, when fE 120 communicates with translator 125 using a first protocol, it actually ends up communicating with front-end adapter 121, since this adapter is responsible for receiving requests on the first protocol. Front-end adapter 121 communicates with integration service 122 using the common protocol. In response to receiving a message from the front-end adapter 121, the integration service 122 may perform some business logic and it may use the common protocol to communicate with back-end adapter 123. An integration service need not perform business logic, since it may do nothing more than communicate with back-end adapter 123, and it need not communicate with back-end adapter 123, since it could provide a service that does not require the use of a back-end system. On the other hand, an integration service may both perform business logic and communicate with one or more back-end adapters. Back-end adapter 123 communicates with bE 124. FIG. 7B is equivalent to FIG. 7A and illustrates a shorthand notation. The term ‘fA’ identifies a front-end adapter, the term ‘bA’ identifies a back-end adapter, and the term ‘S’ identifies an integration service. FIG. 7C introduces the term ‘S/bA’, which identifies a system consisting of an integration service and a back-end adapter. This system may be thought of as an integration service that is also a back-end adapter.

FIGS. 8A and 8B depict more complex architectures of common protocol translators. In FIG. 8A, the only services are those that translate messages directly into the protocols of back-end systems. Here, it is possible for any front-end system to successfully transmit a message to any back-end system, since the arrows indicate allowable paths of communication. However, a deployed system of this architecture will generally only utilize a subset of these paths, since not all paths may be meaningful to the application. This figure and subsequent figures generally depict two systems of a kind to indicate that an actual deployment may have any number of such systems. For example, FIG. 8A depicts two fE systems to indicate that an actual deployment may include any number of front-end systems. This figure also illustrates a notation for identifying the set of communication links that share a protocol: a circle or oval encompasses the links and a symbol is attached to the circle or oval to uniquely identify the relevant protocol. FIG. 8B illustrates an architecture in which the services are distinct from the back-end adapters and may use multiple back-end adapters. Such services are capable of presenting multiple back-end systems so that they appear to a front-end system as if they together comprised a single back-end system. Architectures that combine those depicted in FIGS. 8A and 8B are also possible.

Common-protocol translators are much more economical than direct translators. To see this, compare extensible translators that support N different protocols and translate between any two of them. A direct translator must contain order $N^2$ adapters, since it requires a one-way adapter for each pair of protocols. Adding support for an additional protocol requires adding order N new adapters. On the other hand, a common protocol translator can support N different protocols using only order N adapters. To support a new protocol one adds only two adapters to the translator: a one-way adapter to translate from the new protocol to the common protocol and another one-way adapter to translate from the common protocol to the new protocol.

Application servers, Electronic Data Interchange (EDI) gateways, and Enterprise Application Integration (EAI) servers are all examples of translators. Application servers are generally programming platforms for translating between application protocols on one side and HTTP using CGI and HTML on the other. The front-end systems are generally human-operated browsers, and the translation services generally provide user interface logic that allows humans to easily interact with the back-end systems. Applications servers also often provide CORBA Remote Procedure Call (RPC) or Java RMI access into back-end systems.

There are almost as many application server architectures as there are application servers. However, the inventors are not aware of any application server architecture that provides a common-protocol infrastructure that would allow translation services to be interoperable across various channels. Instead, application servers seem to universally partition translation services among channels. FIG. 9 exemplifies this phenomenon. In this figure, the services that are available to one protocol, such as HTTP/CGI, are not generally accessible to the other protocols. Particularly lacking is the ability to support CGI, specific XML-RPC, and generic XML-RPC interchangeably. While it may be possible to implement and deploy an application server so that the functionality of a service may be shared across channels, this is only possible because the programmer deploying the application server may design his or her code for reuse. Traditional application server architectures do not provide facilities for inviting and maximizing the reuse of services. FIG. 10 is a generalization that attempts to capture the architecture that is common to most application servers.

EDI gateways are servers that interface application protocols on one side and a value-added network (VAN) on the other, as exemplified in FIG. 11. The protocol on the VAN side is dictated by EDI channel and encoding requirements, while a variety of protocols may be supported on the application side. Although EDI gateways tend to be direct translators between EDI and application protocols, one may consider an EDI VAN to be a common protocol translator whose gateways implement the integration services. However, a VAN is not a single server, and all entities wishing to communicate over a VAN are forced to subscribe to the VAN and to locally implement a gateway that bridges their application protocols with the EDI protocol. Moreover, integration services that are invoked on receipt of an EDI message are restricted to communicating with only the applications of a single entity, while integration services that are invoked on receipt of an application message are not accessible to entities owning other gateways. One may create shareable integration services that can reach all gateways using servers that consume and produce only EDI messages, but the VAN still forces all end-points to implement EDI gateways.

EAI solutions are typically deployed using one of two architectures. In both architectures EAI servers communicate with adapters over a network, and the adapters interface the applications. One architecture uses CORBA RPC or DCE RPC for messaging between the adapters and the servers, while the other architecture uses proprietary message-oriented middleware (MOM) protocols. In both cases an EAI server produces and consumes only one protocol—either the RPC protocol or the MOM protocol. FIG. 12 captures the common aspects of both architectures. Notice that EAI uses common protocol translation. As with EDI, EAI solutions dictate the protocols that the end-points are to use to communicate with the servers. Also, EAI integration services do not exhibit the programmable, flexible infrastructure that application servers tend to provide. EAI servers tend to be either strictly configured (non-programmable) deployments or middleware deployments that are written from scratch instead of being built on a generic infrastructure.

Automated business-to-business integration (B2Bi) over the Internet requires properties that no one of these traditional solutions provides. First, B2Bi requires a sophisticated translation infrastructure. The primary purpose of B2Bi is to bridge differences in application protocols, connecting applications so that they can engage in the exchange of business messages. Application servers do not provide the necessary flexible translation infrastructure, while EDI and EAI solutions do. Second, B2Bi requires connecting applications that are not all owned by a single entity, which limits the ability that any solution has to dictate protocols to end-points. EDI and EAI solutions both dictate protocols to end-points and hence are not ideal B2Bi solutions. EDI has traditionally been used to perform B2Bi, but EDI deployments have proven expensive, lengthy, and political, largely because EDI end-points dictate extensive requirements on each other. Third, B2Bi solutions must be able to readily leverage the Internet. Application servers satisfy this requirement. Conventional EDI does not because it runs over private VANs. Both EDI and EAI solutions fail to satisfy this requirement because they do not leverage the pervasiveness of HTTP. It is often necessary to use HTTP to get through the Internet firewalls that most organizations have. Finally, B2Bi solutions must be flexible enough to implement the business logic that organizations will want to provide to protect the security and integrity of their applications when exposing those applications to other organizations. Application servers provide a sufficiently rich development platform, but EDI and EAI servers do not.

SUMMARY OF THE INVENTION

It is therefore an object of the present invention to provide for improvements in the extraction and handling of data and information via the Internet.

It is a still further object of the invention to provide for translation between the multitude of protocols currently in use throughout the Web, and to do so in an efficient manner.

These and other objects are achieved according to the present invention by an integration server which sits between two systems and provides transparent interoperability between the systems by translating communications to/from the protocol of each system from/to the protocol native to the other system. An integration server exposes its translation facilities by means of named services. Clients of the server name the service to invoke via either the channel or the encoding. For example, a client using HTTP may identify a service via URL. Since all services are named, and since HTTP may be used to invoke any service, all services may be identified by URL and accessed via HTTP.

In a preferred embodiment, the integration server conveys information between systems by receiving data from a first system using the first system's native transport, by translating this data into a common data format, by manipulating the data in its common data format, by translating the data from the common data format into the format native to the other system, and then by conveying this data to the other system via the other system's native channel. The common data format is a hierarchical data structure of name/value pairs. In the preferred embodiment, objects implementing the common data format expose an Data interface. The Data interface presents an object as an ordered set of name/value pairs, where a given name may occur multiple times, and where a value is any object, possibly even a nested Data object.

Once data is expressed in a common data format the integration server may manipulate the data, possibly by consulting other integration server services, which may in turn consult other systems. The name/value pairs that may occur in the common data format, the relationships that these pairs may have, and the types of values allowed in the pairs are together known as a language. Application encodings are most favorably expressed in the common data format in a language that closely models the application's native data format. Generic tools and integration server services are then applied to the data to convert it to a language that closely models the encoding of an application that is to receive the data. Integration server facilities that convert between application native data formats and the common data format can therefore focus on converting only the data representation and need not necessarily be concerned with converting data to or from a common language.

Service definitions are the preferred embodiment for expressing the signatures of integration server services. Type definitions within the service definitions describe the languages expressed in the common data format. Service definitions are used to describe the request/response interfaces into a integration server. Conventional interface specifications, e.g. Object Management Group (OMG) IDL specifications, are comprised of service definitions. In particular, an interface specification is comprised of a set of named services, specifying input and output parameters for each service and a data type for each input and output parameter. The service definitions of conventional interface specifications focus on describing method or function invocations for programming languages, whereas in an integration a service definition is abstracted from programming language details so that it may describe Data languages. One may use service definitions to configure or generate software that translates between an application encoding and a common language. One may also use service definitions to manage integration server data, such as to verify that IData objects conform to the requirements stated in the input or output parameters of a service definition.

According to a still further aspect of the invention, service invocation output parameters are cached in a hash table in association with the corresponding service, and the output parameters can be later supplied on receiving a service invocation for the same service using the same input parameters. Input and output parameters are expressed in the common data format, where input parameters together comprise the services request message, and where output parameters together comprise a services reply message. Since the request and reply messages are expressed in the common data format, an invocation cached for a given transport and encoding may be recalled for use with a different transport and encoding. This is accomplished by storing the service invocation output parameters in association with the invoked service and the provided input parameters. In accordance with the present invention, an integration server disposed between client and server stores a set of input parameters passed to the server as part of a service invocation, and also stores the corresponding output parameters that were passed back to the client. The next time the same service and set of input parameters is encountered, the integration server is then able return the previous output parameters without asking the remote application to re-compute the output parameters from the input parameters.

Another improvement of the present invention is the caching of service invocation reply messages in association with the name of a service being invoked and the request message transmitted to this service. Cached reply messages may be retrieved and provided to a system that subsequently invokes the same service using an equivalent request message. An additional improvement occurs when the cached messages are expressed in a self-describing encoding, since two messages may be deemed logically equivalent even when they are not byte-for-byte equivalent, as when two messages contain identical information but order the information differently.

A further improvement of the present invention is the use of a data processing language, known as the B2B Flow Language, for controlling the flow of data among services and the sequences of execution of those services. This data processing language is characterized by at least some of the following features and advantages:

The data processing language may be used to implement services so that a service may be expressed in the data processing language;

the language is independent of the protocols required to invoke the software that implements the services, including independence from both the programming languages and the component architectures in which the services are written;

within the context of the language, the services on which the language operates each input and output data expressed in a self-describing encoding;

the language provides facilities for conditionally behaving according to the data expressed in the self-describing encoding, whether the data is provided upon executing the service that the data processing language implements or upon receiving the data as part of the output of a service;

the language provides facilities for manipulating the data expressed in the self-describing encoding, whether the data is provided upon executing the service that the data processing language implements or upon receiving the data as part of the output of a service;

the language invokes a set of services in sequence, passing the output of a previously invoked service as input to the subsequently invoked service;

the language allows a sequence of services to consecutively operate on the same instance of data expressed in the self-describing encoding;

within the context of the language, functionality may be associated with the invocation of a service in a manner similar to how one may associate functionality with the internal protocol of an integration server, including functionality for validation, access control, monitoring, caching, and execution control;

in the context of an integration server, one may execute a flow service one constituent operation at a time, advancing to the next operation only on demand by an external entity such as a user, and providing the contents of the flow pipeline between operations, thus allowing users to step-wise trace through and debug flow services as they execute;

the language provides facilities for performing name transformations, structure transformations, and value transformations on data expressed in the self-describing encoding;

the language is expressed in XML;

a running service implemented in the language may be terminated and have state information associated with the service invocation put in storage;

one may retrieve from storage state information associated with a previously terminated service invocation and resume execution of the service from the point at which it was previously terminated;

the language may use data expressed in a co-resident integration server's internal encoding;

models of the flow of data through a co-resident integration server may be generated by examining implementation details of services that are implemented in the language;

graphical representations may be generated depicting these models or portions of these models;

these models may be used to perform an analysis of the consequences of the presence, absence, or incorrectness of data that enters the integration server, and tools may help perform this analysis; and these models may be used to perform an analysis of the consequences of changing the implementation of services appearing on an integration server.

Further objects, features and advantages will be apparent from the detailed description below.

BRIEF DESCRIPTION OF THE DRAWINGS

The invention will be more clearly understood from the following description in conjunction with the accompanying drawing, in which:

FIG. 15 illustrates the role played by mappings during sending and receiving in various encodings;

FIGS. 16(*a*)-6(*c*) illustrate WIDL specifications and mappings used to interface between a BuyerZ and SupplierQ;

FIG. 17 illustrates the integration server acting as in interface between program APIs;

FIG. 18 illustrates an example of the code generated in FIG. 17;

FIG. 27 illustrates important methods of a Values object;

FIGS. 28 through 32 portray the preferred embodiments of IData interfaces which can be used in the present invention;

FIGS. 33A-E and 34A-B portray service definitions for two example integration services, FIGS. 33A-E defining a service named loadDocument and FIGS. 34A-B defining a service named queryDocument;

DETAILED DESCRIPTION OF THE INVENTION

Business-to-business integration enables business applications to automatically exchange data over the Web with other business applications, and to do so without the use of a browser. The present assignee has developed an integration server, known by the name "B2B Integration Server" which facilitates integrating applications ("end-points") over networks so that various combinations of applications may message one another. The technologies that the server employs hide each end-point from the specifics of what messages the other end-points send and receive and from the specifics of how the other end-points send and receive them.

Figure 13:
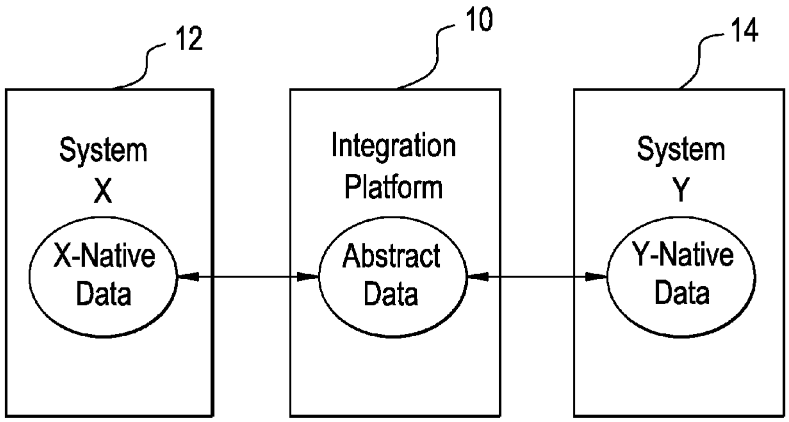
FIG. 13 illustrates the concept of an integration server according to the invention.

This is generally shown in FIG. 13 where the integration server is illustrated at 10 situated between the systems 12 and 14 communication with one another. The integration server 10 communicates with system 12 in the encoding native to system 12, communicates with system 14 in the encoding native to system 14, and translates between the two native encodings by translating each to an abstract data format first and thence to the other encoding.

The description of the invention begins with an explanation of an early form of business-to-business integration that is based on a technology called WIDL. The inventors used WIDL on a server to provide interoperability between systems. A more generalized approach to architecting the invention is described subsequently. This second approach replaces WIDL mapping technology with a flow language and with an unlimited variety of mapping services. Both approaches describe implementations of an integration server.

WIDL Architecture

Figure 14:
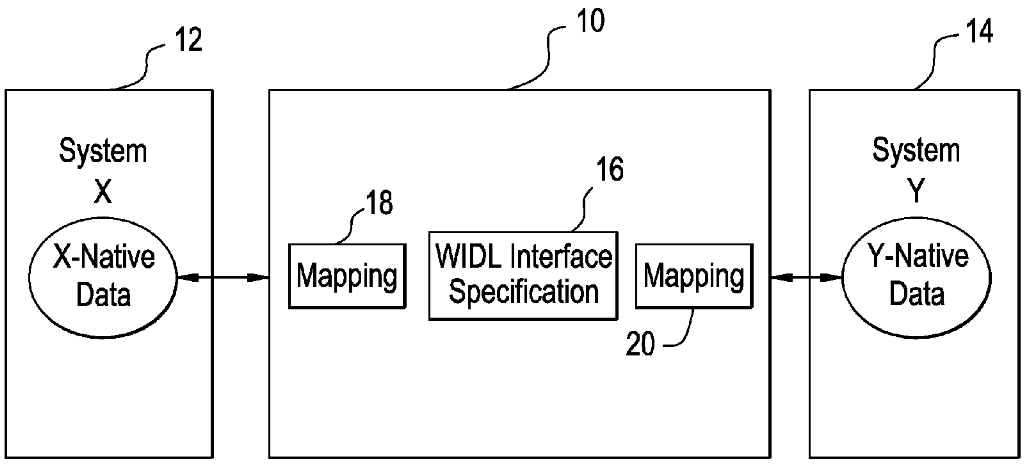
FIG. 14 illustrates the integration server implemented as a combination of a WIDL Specification and mappings.

Copending application Ser. No. 274,979 illustrates and describes a number of architectures for implementing an integration server in accordance with the present invention. The integration server integrates end-points through a variety of mechanisms, and in a preferred embodiment disclosed therein one of the core technologies employed in the integration server is the Web Interface Definition Language (WIDL). Thus, as shown in FIG. 14, the integration server 10 could include a WIDL interface specification 16, and mappings 18 and 20 between the WIDL interface specification and each of the native encodings.

An interface specification is a common notion in component architectures such as OMG's CORBA. It's an abstract description of an application interface, a description of the services that an application offers. A WIDL specification consists of an interface name, a set of named services, a set of the input and output parameters that are associated with each of the services, and a set of data types defining each of the input and output parameters. In the context of an interface specification, a service has no functionality and instead serves as a definition for corresponding services that do have functionality. For this reason, we refer to a service expressed in WIDL as a service definition.

In WIDL, the data types assigned to the input and output parameters may be simple values representing strings and numbers, types may be lists of arbitrarily typed objects, types may be arrays of objects of a specific type, and types may be records that consist of named children, each of which itself is a data item having a type. The invention expresses the interface specification using the XML document type called WIDL-SPEC, but the notion applies regardless of the language used. The interface specification in the embodiment disclosed in the copending application serves as the common language by which the integration server translates one message encoding into another. When the server receives either a request message or a reply message expressed in some encoding, it translates the message into a Values object. Internally within the server, all requests and replies are represented in the form of a structure called a Values object, which is a hash table of named objects, where the contained objects may be additional Values objects. The objects may represent lexical types such as integers, floats, and strings. They may also represent structured objects such as arrays, lists of arbitrary objects, and records. Records are represented within a Values object as another Values object. Values objects are well-suited for representing records, since records uniquely name their constituent fields, and since hash tables index objects by name.

The interface specification provides the language that allows encodings to be translated into Values objects and that allows Values objects to be translated into encodings. An interface specification does not itself define how different encodings are translated to and from Values objects, but it does define the structure that those Values objects are allowed to assume once translated. When a client issues a request to the integration server, a mapping resident on the server uses the information found in the interface specification to translate the request into an intermediate Values object. More specifically, the client request invokes a particular service on the integration server, and this service conforms to a service definition found in a WIDL interface specification. A mapping based on this service definition converts the request message into a Values object. To forward this message to the recipient application, the server determines the encoding that the recipient requires and uses a mapping that is based on the same service definition to translate the Values object into that encoding. When the message recipient responds to the forwarded message, the server again applies a mapping to yield a Values object, to which it applies another mapping, yielding the reply that it returns to the client. Hence, an interface specification, and in particular a service definition, governs the shape that the data may take when conveyed between systems.

WIDL specifications differ from conventional specifications in that conventional specifications focus on defining programming language classes and functions. A WIDL specification is more abstract because it use an XML document type, WIDL-SPEC, to define the interface to any kind of end-point, such as HTML-based Web-sites, EDI protocols, databases, and XML-based protocols—in addition to conventional class- or function-based application interfaces (APIs). WIDL-SPEC accomplishes this feat merely by defining only the least-common-denominator interfaces across this variety of systems.

WIDL is also a technology for defining certain kinds of mappings. To do this, WIDL defines a WIDL-MAPPING document type in addition to the WIDL-SPEC document type. An instance of WIDL-MAPPING contains one or more mappings, and may contain a WIDL-MAPPING name, a set of services, and input and output bindings. The services of a WIDL-MAPPING are fully functional, as they implement mapping behavior. A WIDL-MAPPING contains enough information to be an interface specification itself, but it elaborates on this information by defining how the specification maps onto a document or a Web-site. When a client asks an integration server to invoke a service, it hands the server input parameters and waits for output parameters. A WIDL-MAPPING service tells the integration server how to submit the input parameters to the Web site, which is usually via the GET or the POST method of HTTP. A service accomplishes this by using a mapping known as an input binding. The Web-site responds by returning an HTML or XML document, and "output bindings" defined in the WIDL-MAPPING tell the server how to extract information from this document so that the information may be returned to the client as output parameters.

An "input-binding" is a binding that describes the relationships between HTTP CGI query parameters and a particular WIDL service definition. Input bindings are also used to generate client code that is capable of messaging the integration server, although many translation mechanisms do not make use of this particular facility. An input binding names a parameter of a service that the client might invoke and associates that name with the name of the HTTP CGI query parameter. This provides a mapping between the parameter names in the service definition and the parameter names used by the CGI query.

An "output-binding" associates each parameter of a service with a query expression. The query expression identifies the portion of a document that represents the value of the parameter. An output-binding consists of multiple parameter-query pairs. Together these pairs either define a particular record parameter that the service returns, or they define the entire set of parameters that the service returns. Nesting a binding within a binding is equivalent to nesting a record within a record where the nested record is constructed from the nested binding. When a binding is applied to a document, the result is a Values object that contains all of the parameters that the binding prescribes. Nested bindings become nested Values objects. The integration server applies output-bindings to XML documents and to HTML documents to translate the documents into the intermediate Values objects. One defines a binding in a WIDL-MAPPING, and the server reads the WIDL-MAPPING to apply the binding.

FIG. 15 illustrates the roles mappings may play during sending and receiving in various encodings (this is by way of illustration only, and is not an exhaustive list of all encodings contemplated). This table illustrates a variety of the mechanisms available using the WIDL architecture approach. Mappings may also perform sophisticated functions such as conditionally passing or failing the service in order to ensure that bindings only bind the proper data. Another such sophisticated function is chaining one service to another so that the outputs of one service are passed to the inputs of the next. See the WIDL specification for a further explanation of the chaining mechanisms. See the co-pending XML-RPC application for an explanation of the template mechanism for generating XML and HTML messages.

The WIDL architecture obviates the need to translate directly between the encoding that a sending application uses to send a message and the encoding in which a receiving application expects to receive the message. Instead, a WIDL-MAPPING defines how to map between an interface specification—the abstract description of a set of services—and an XML-based or HTML/CGI-based web-site. Clients wishing to interact with this web-site need only interact with an integration server in a way that conforms to the interface specification. The intervening integration protects the client from the details of how one interacts with the back-end web-site, freeing the client to use a number of different mechanisms to message the server. The client may issue the GET and POST methods of HTTP as if the integration server were a conventional web server. In this case the client would issue standard CGI query parameters. However, since POST allows the client to hand the server any stream of data, the server accepts a variety of data streams. The client may post XML documents or binary data streams. The server has a document parser that accepts a variety of markup languages that are based on angle-bracket tags, including XML and HTML. The server also accepts a specialized binary format of recursively nested hash tables. Another way into the server is through conventional program APIs. Clients may call these locally, but Remote Procedure Call (RPC) mechanisms allow clients to use this as a remote mechanism as well.

An example of the embodiment using WIDL interface specifications in the manner described above and in the above-cited prior applications can be understood with reference to FIGS. 16(*a*)-16(*c*). These figures portray two WIDL interface specifications and a WIDL-MAPPING. FIG. 16(*a*) illustrates a WIDL specification that a buyer might use to communicate with a supplier. This interface has name "Supplier" and contains a service definition for a service named "order". The order service includes a set of input parameters "Purchase" and a set of output parameters "Receipt". The Supplier WIDL specification further includes definitions of the Purchase input parameter set and the "Receipt" output parameter set.

For purposes of comparison, consider also an interface that a business might use to track the disposition of the parcels it ships. FIG. 16(*b*) illustrates a WIDL specification for an interface named "Parcel", with this WIDL specification including a service having name "track" and having a set of input parameters Handle and a set of output parameters Status. The input parameter set Handle is defined as having a value of name "trackingID", and the output parameter set is defined as having a value of name "disposition" and a record reference of name "destination" and content "Address". The record having name Address is then defined as including a street and zip. The DIM attribute represents the number of dimensions in an array, thus defining street to be an array of strings, one string for each line of the street address.

FIG. 16(*c*) illustrates a WIDL-MAPPING for SupplierQ. An integration server uses this mapping to translate between a client request issued to the integration server and a web-site that serves as a parts supplier for the client. The SupplierQ WIDL-MAPPING conforms to the Supplier interface specification described above. This WIDL-MAPPING tells the integration server that when a service named "order" is invoked via the SupplierQ interface, the server maps the invocation to a particular URL ("http://www.q.com/order"). The invocation uses the data item "Purchase" as the input parameter and accepts the output as a data item "Receipt". It further includes an input binding indicating that the "part Number" and "quantity" input parameters are to be mapped to the "pid" and "cnt" CGI form names used by SupplierQ. Finally, it provides an output binding including a query indicating where the "confirmationNumber" data value is found in the document that SupplierQ returns in response. The integration server executes the query to extract information from response so that it may return this information to the client in the encoding that the client expects.

As discussed above, it is also the case that the integration server may be used to interface between program APIs. The mechanism of interfacing program APIs is analogous to the mechanism employed with conventional IDLs to implement interface stubs and skeletons, such as is done in CORBA. As illustrated in FIG. 17, one may select a WIDL specification and a desired programming language and feed this to a WIDL code generator. The code generator produces code, which can then be used in the integration server as a mapping between the WIDL specification and the API. FIG. 18 illustrates an example of generated code. Here, a call to the method fulfillOrder( ) has been inserted into the generated code. One may also use the code generator to create client-side code that invokes integration server services using HTTP in a way that hides from the client the details of HTTP and Values objects.

As we've seen, WIDL interface specifications describe the inputs and outputs of a service without describing the implementation of the service. One may create mappings from interface specifications for translating different encodings to and from a common data format (the Values object). The approach of using a common data format internally within the server provides the server with the flexibility to accept and produce messages using a variety of encodings and to do so over a variety of transport protocols. This flexibility limits the requirements that an integration solution imposes on the applications that need to be integrated. For example, an application need only have an HTTP stack and an XML parser to communicate with other applications. This flexibility provides a level of interoperability not achieved by CORBA ORBs, web servers, and application servers.

While implementation using WIDL interface specifications and WIDL mappings is effective, the preferred embodiment has migrated to a more effective implementation which will now be described in more detail.

Integration Server

An integration server is essentially a translator that provides a development platform for implementing adapters and integration services, and one may deploy an integration server as a common protocol translator, defined above. The server provides the translation facilities of EDI and EAI while also providing a solutions platform akin to that of an application server. Unlike EDI and EAI, which require that the network wire protocol be the common protocol, the common protocol of a integration server is internal to the server. For this reason, in the context of integration servers, the present application refers to the common protocol as the internal protocol, and uses the terms internal channel and internal encoding to refer to the internal protocol's channel and encoding. However, because an integration server might internally be implemented as a system of a servers, the internal channel may be a transport channel, though each end-point still externally perceives only a single server that supports multiple integration services. An adapter resident on the server converts between an end-point protocol and the internal protocol. Front-end adapters use the internal protocol to transmit messages to integration services, which may reside on the server. Integration services may then perform business logic and use the internal protocol to transmit messages to the appropriate back-end adapters. An integration service may even itself be a back-end adapter.

Figure 1A:
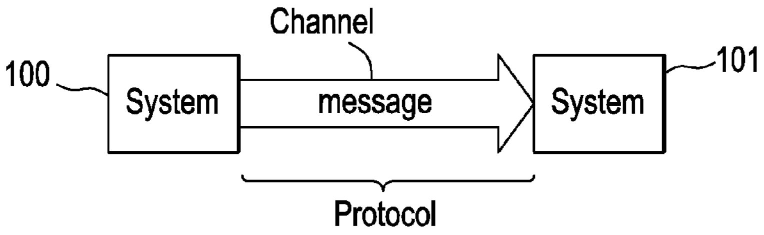
FIG. 1A depicts two systems communicating via a protocol.
Figure 1B:
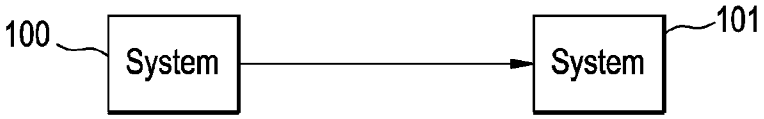
FIGS. 1B and 1C illustrate notations used in subsequent figures to represent system communication.
Figure 1C:
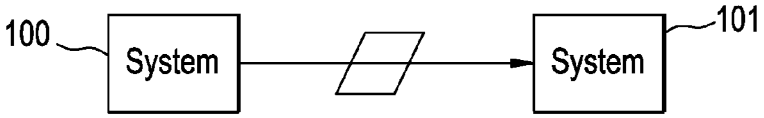
Figure 2A:
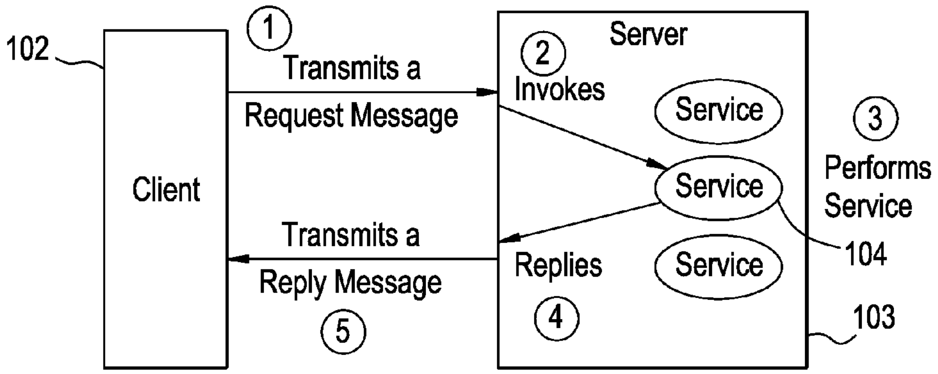
FIG. 2A illustrates a process of transmitting messages between a client and a server.
Figure 2B:
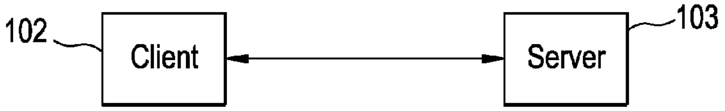
FIGS. 2B and 2C illustrate notations used in subsequent figures to represent the pair of request and reply message transmissions depicted in FIG. 2A.
Figure 2C:
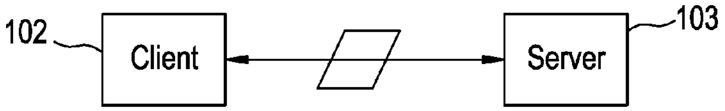
Figure 3A:
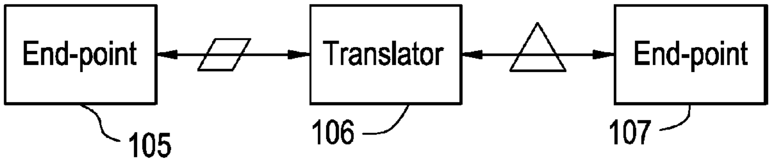
FIGS. 3A through 3D depict examples of behaviors that a translator may have in response to receiving a request message from one end-point.
Figure 3B:
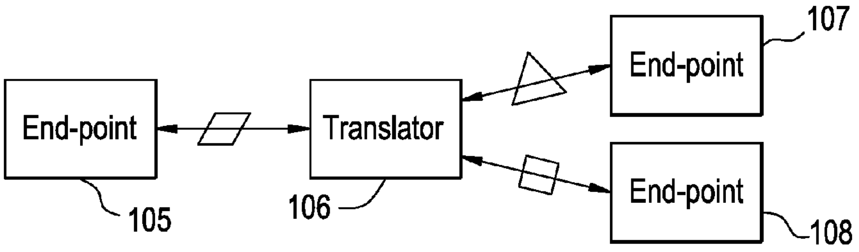
Figure 3C:
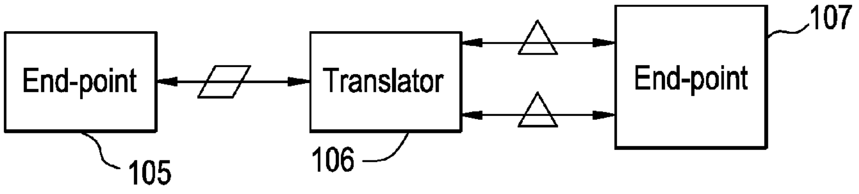
Figure 3D:
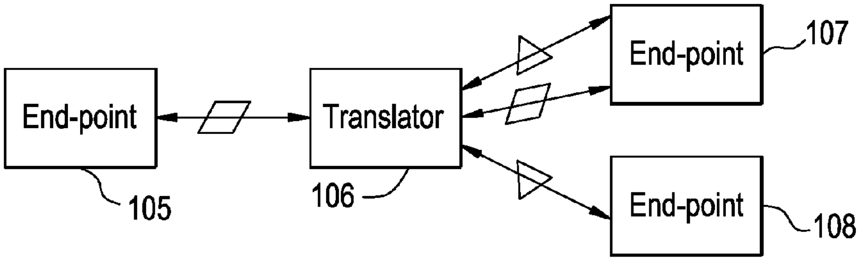
Figure 4A:
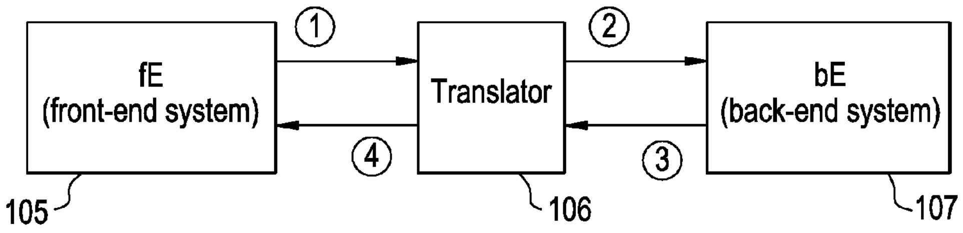
FIGS. 4A and 4B convey two examples of the sequence of events that may occur when a front-end system communicates with a back-end system using a translator.
Figure 4B:
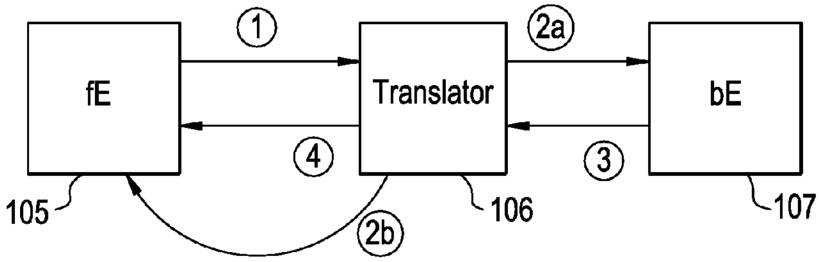
Figure 5A:
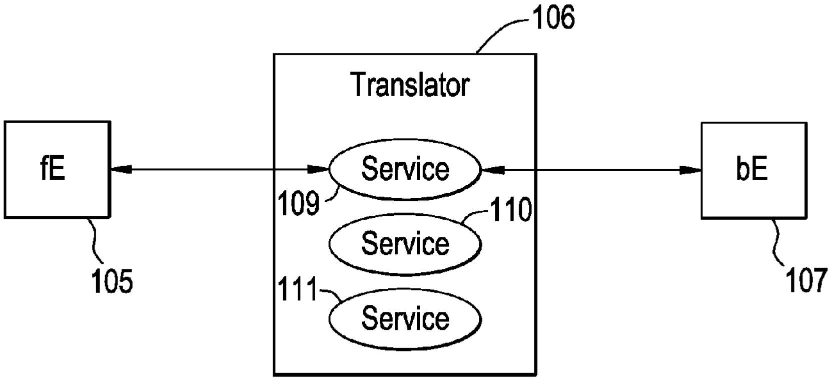
FIGS. 5A and 5B illustrate the relationships translator services may have with back-end systems and exemplify the role of translation services in FIGS. 3A through 3D.
Figure 5B:
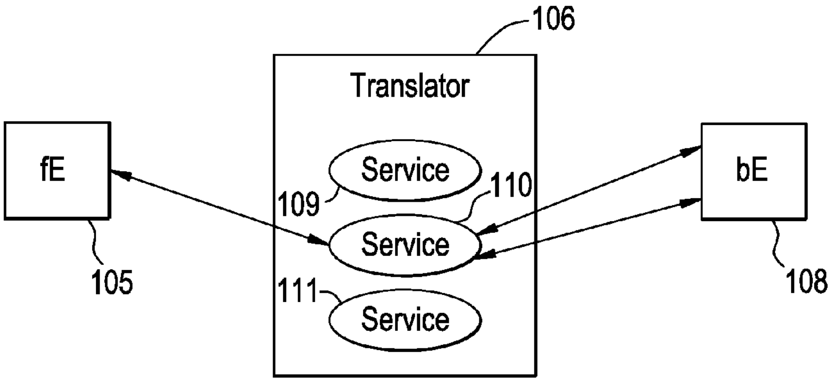
Figure 6A:
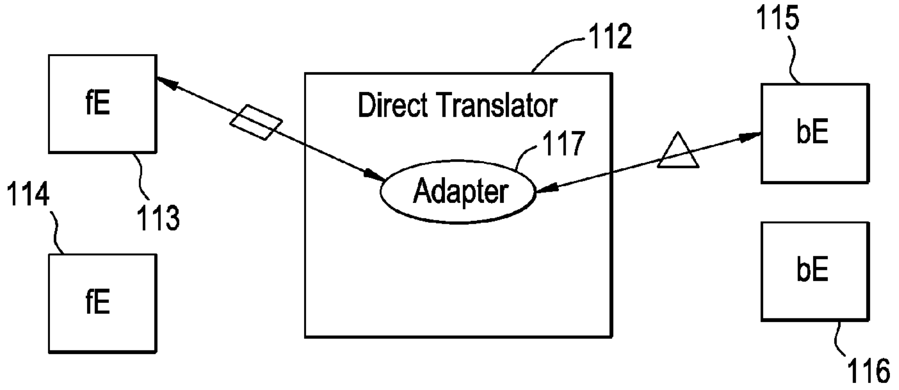
FIGS. 6A through 6C illustrate an extensible translator.
Figure 6B:
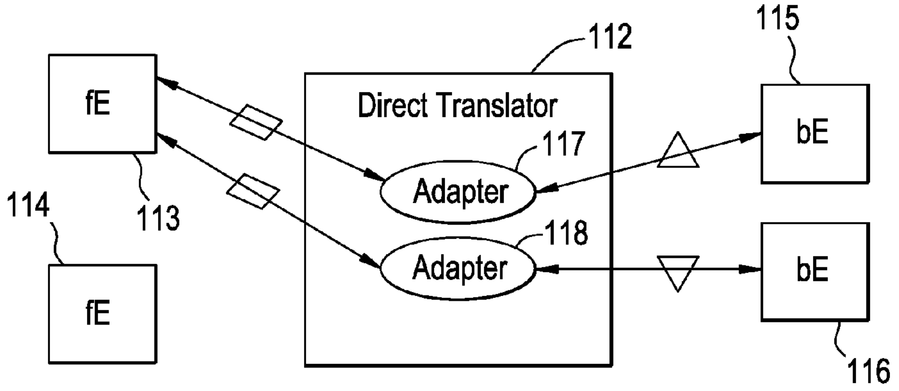
Figure 6C:
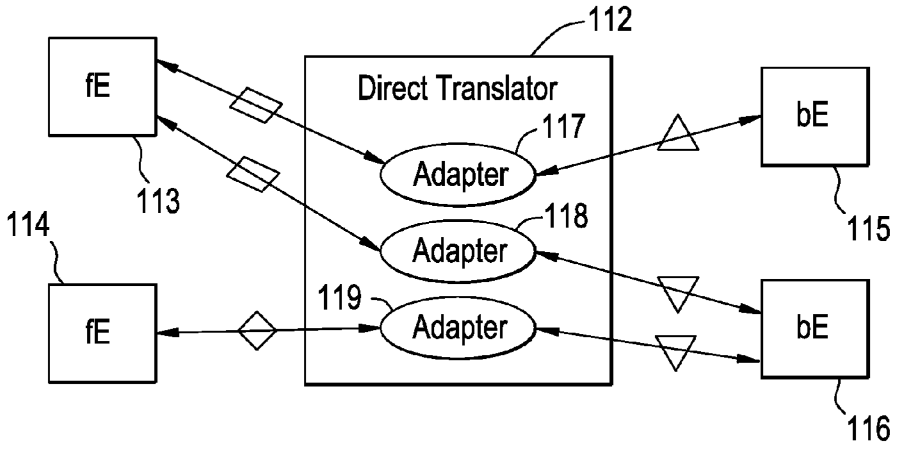
Figures 7A, 7B, 7C:
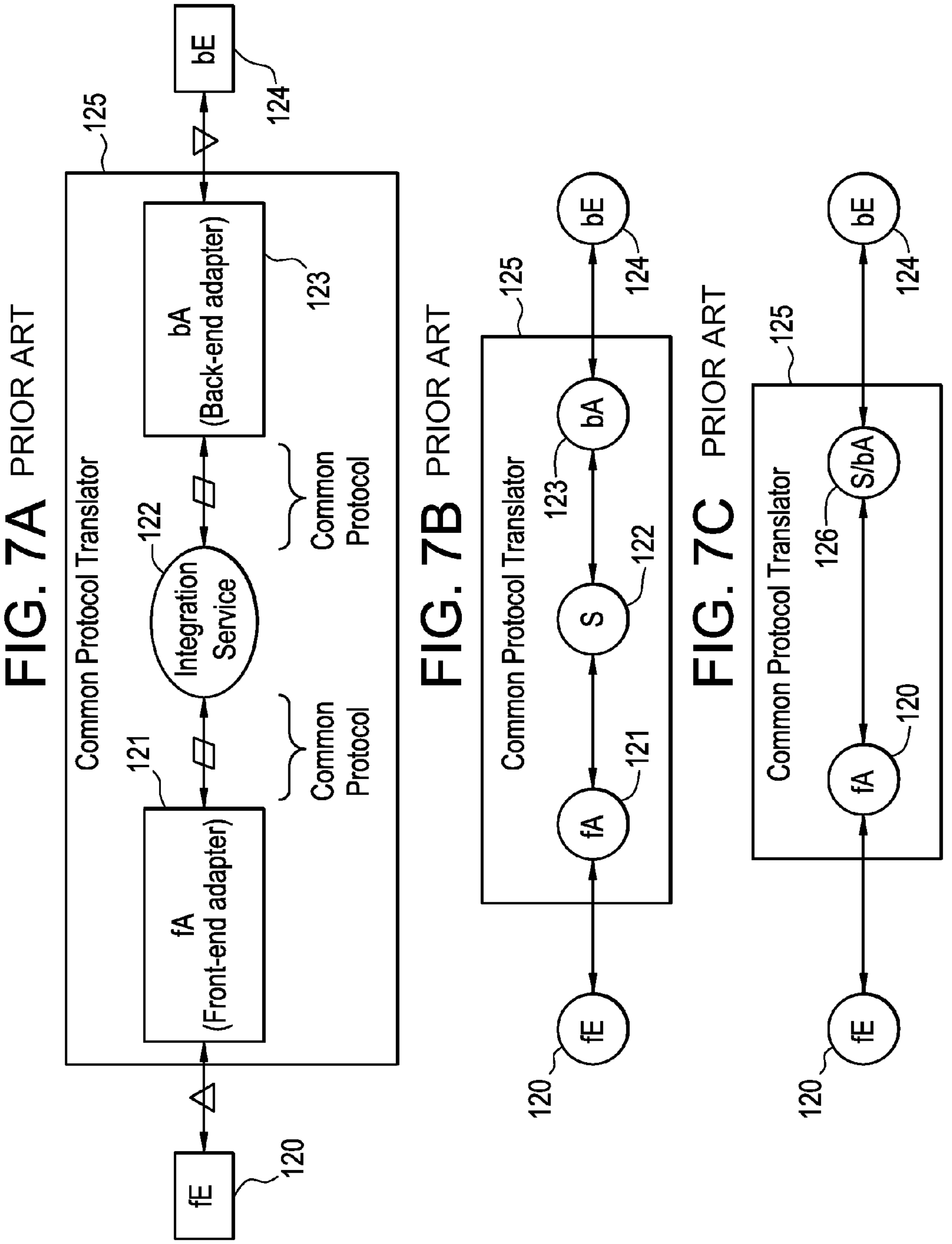
FIGS. 7A-7C illustrate the overall architecture of a common protocol translator.
Figure 8A:
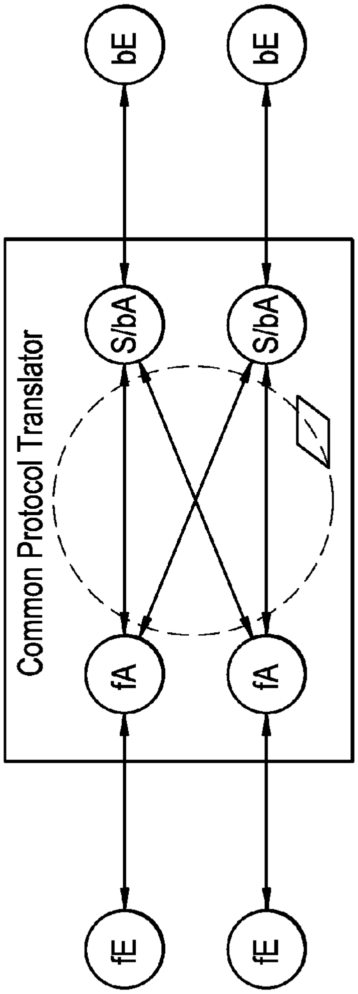
FIGS. 8A and 8B depict more complex architectures of common protocol translators.
Figure 8B:
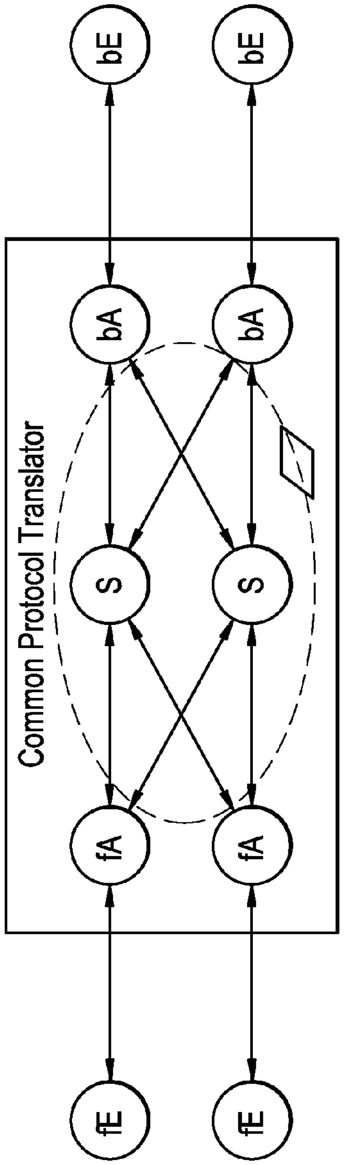
Figure 9:
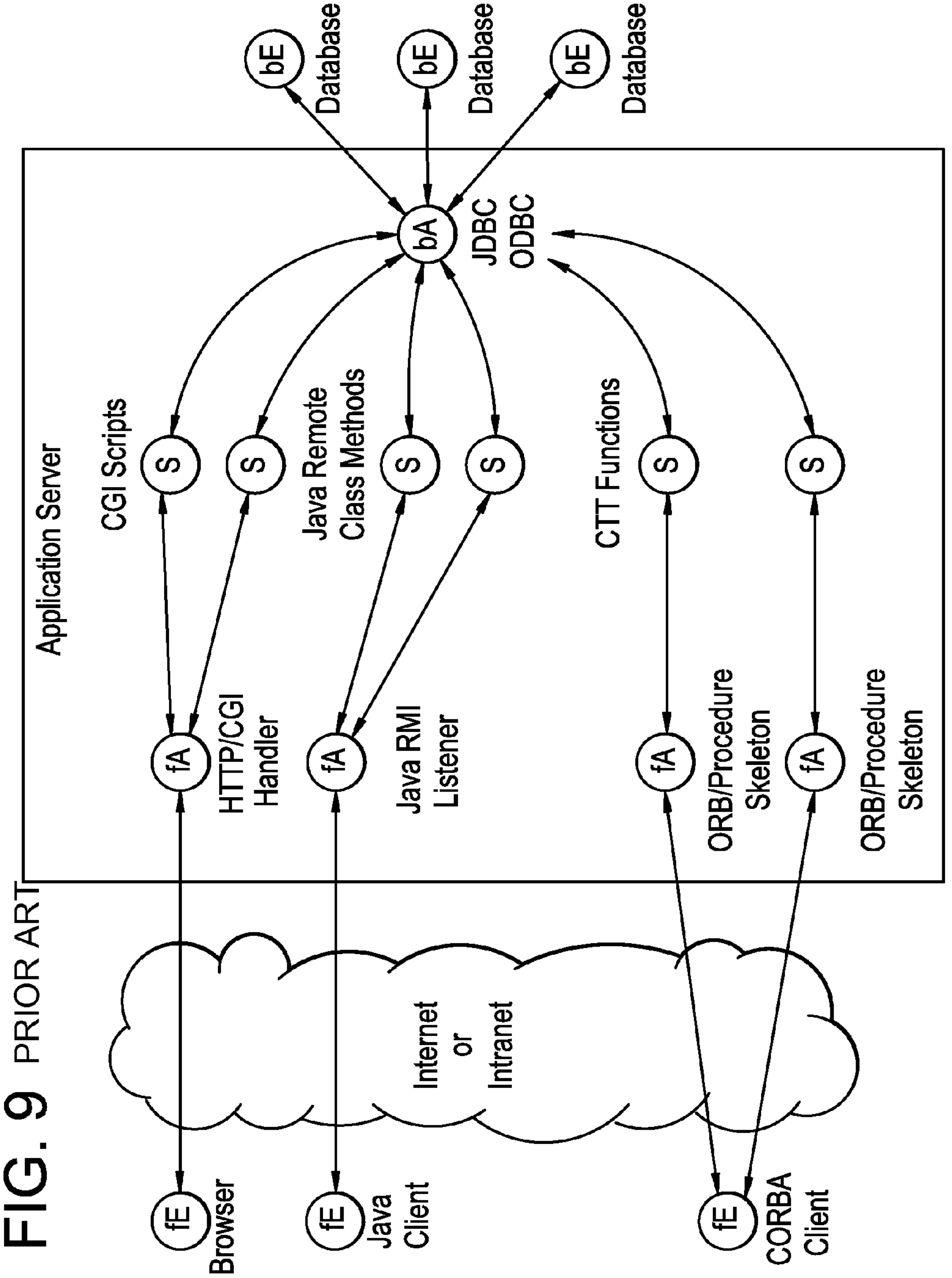
FIG. 9 illustrates an application server partitioning translation services among channels.
Figure 10:
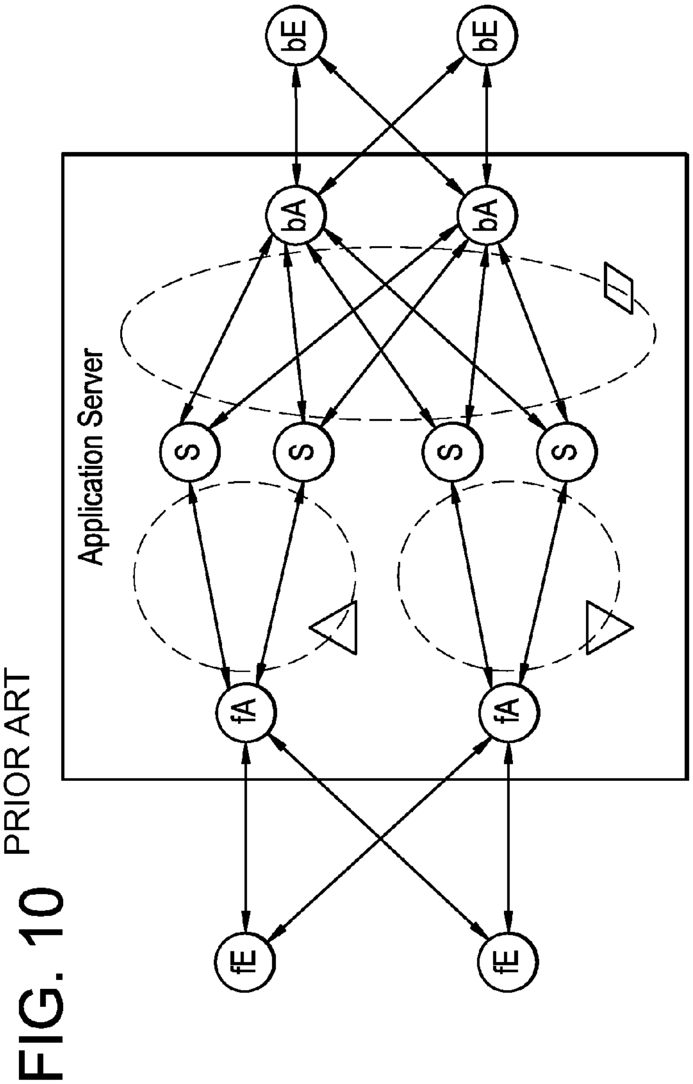
FIG. 10 is a generalized application server architecture.
Figure 11:
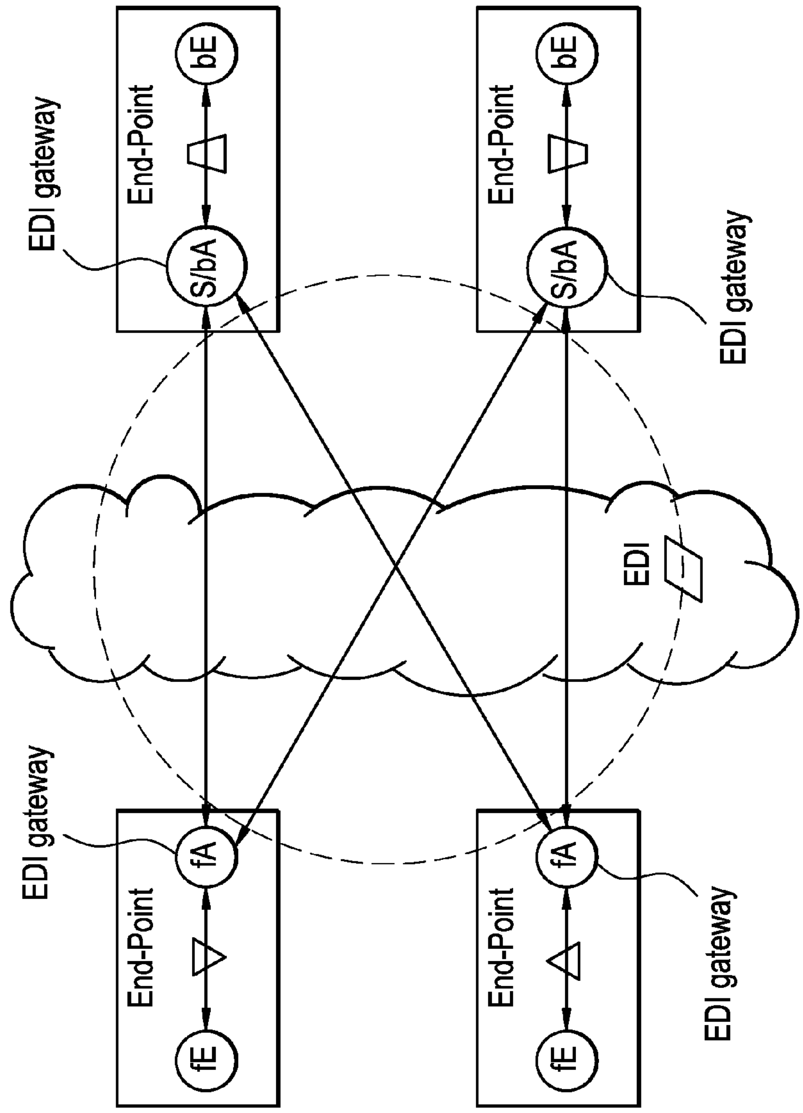
FIG. 11 illustrates EDI gateways as servers that interface application protocols on one side and a value-added network (VAN) on the other.
Figure 12:
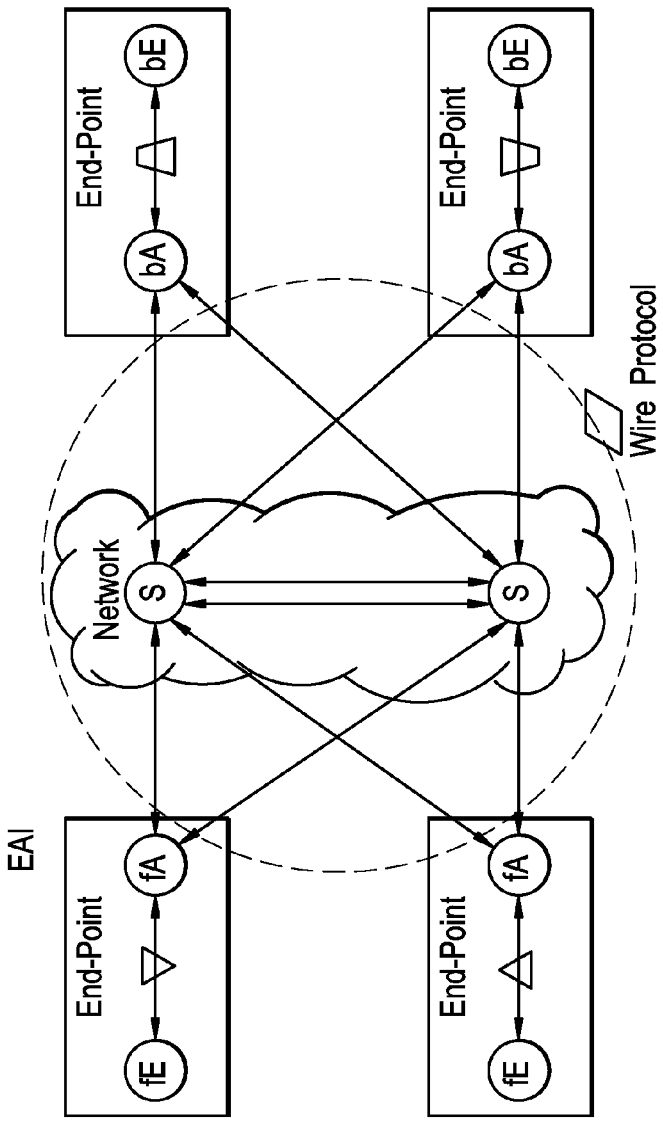
FIG. 12 illustrates common aspects of two common EAI architectures.
Figure 19:
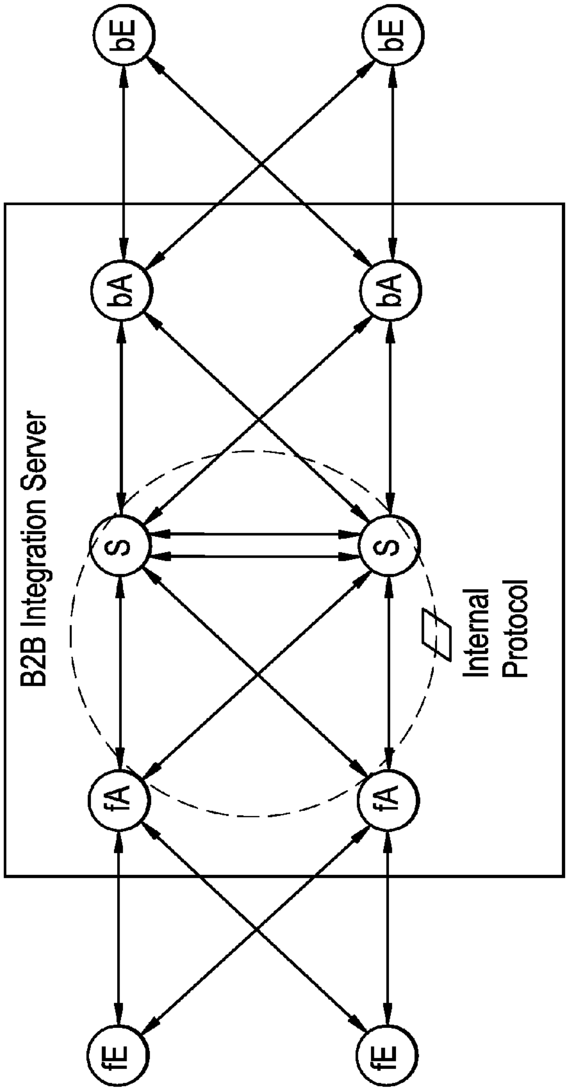
FIG. 19 depicts the architecture of an integration server, emphasizing paths of communication.

FIG. 19 depicts the architecture of an integration server, emphasizing paths of communication. All services can be invoked using a shared internal protocol. The figure depicts multiple services that are accessible through multiple front-end adapters. Services may even invoke other services using the internal protocol. Back-end adapters do not typically partake of the internal protocol, except through services implementing back-end adapters. This architecture resembles the EAI architecture depicted in FIG. 12, but there are some significant differences. The adapters are resident on a single server (ignoring redundancies for clustering and failover). This allows end-points to communicate with the server using protocols that are native to the end-points. End-points that do not support protocols that communicate remotely with a integration server must be fitted with an adapter, similar to EAI. Unlike EAI, these end-points are able to choose from a variety of protocols—namely, the set of protocols that the integration server supports. Another distinction from EAI is that the common protocol is entirely hidden within the server. Finally, there is no requirement that any protocol be a wire protocol. Integration services can reside co-resident with any end-point as well as reside between end-points (not co-resident with any end-point).

Figure 20:
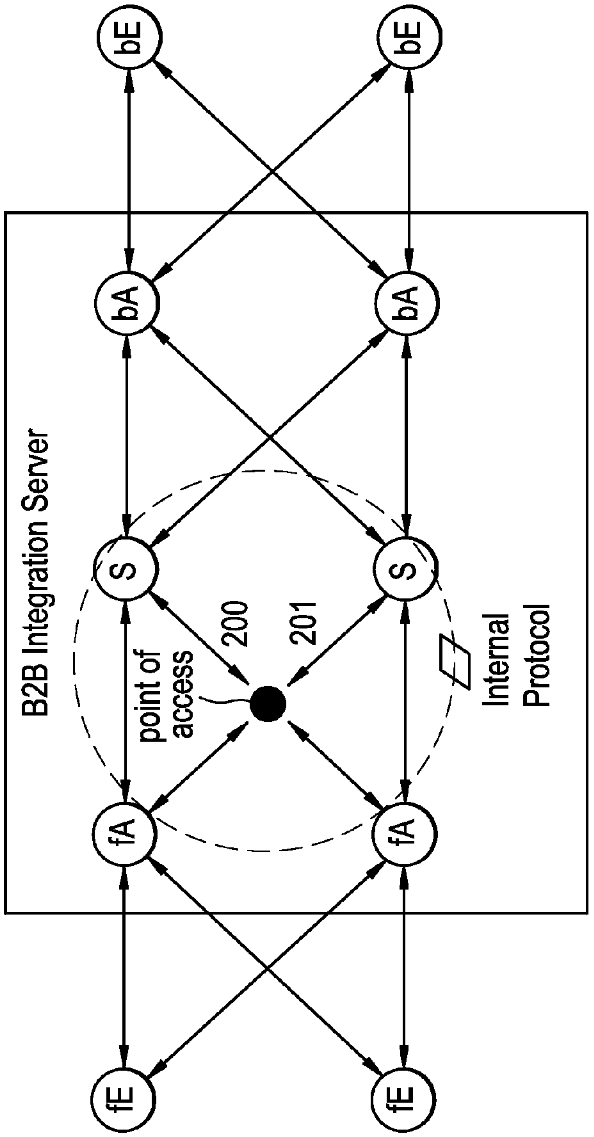
FIGS. 20, 21, and 22 depict preferred embodiments of an integration server according to the invention, with FIG. 20 illustrating the existence of a point-of-access to all integration services, FIG. 21 illustrating a variation of the point-of-access theme, and using a data bus notation of circuit boards to depict a central access mechanism, and FIG. 22 illustrating a deployment of an integration server that strictly implements common protocol translation.
Figure 21:
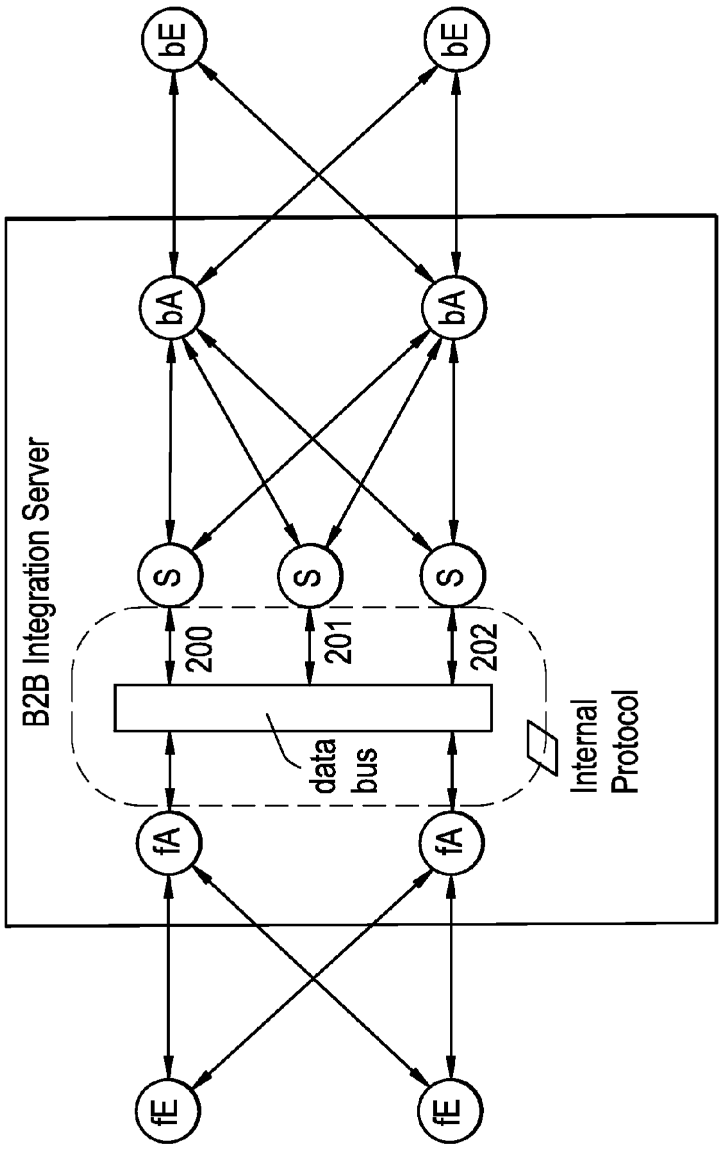
Figure 22:
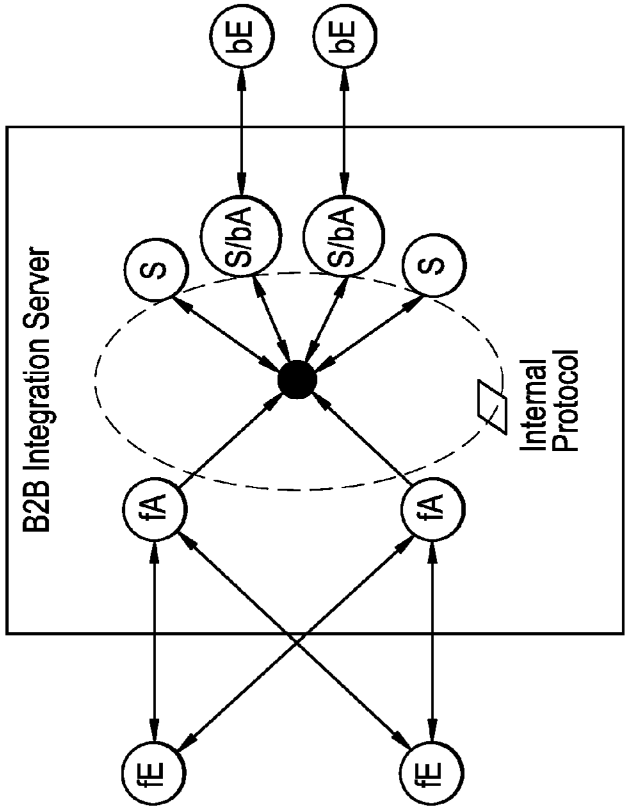

FIGS. 20, 21, and 22 depict preferred embodiments of an integration server. FIG. 20 illustrates the existence of a point-of-access to all integration services. As depicted, this point would take a service name and a request message expressed in the internal protocol, and it would return a reply message also expressed in the internal protocol. This point may also take session information, but means of accessing session information can vary dramatically among implementations. The point-of-access could be implemented as a programming language procedure that embodies the internal protocol. For example, a point-of-access might be a procedure that inputs a service name and a request message expressed in the internal protocol. This procedure would invoke the named service with the provided request message and then return the output of the service as a reply message expressed in the internal encoding. One may even implement the internal protocol using a point-of-access that translates between the internal protocol and the protocols required by the individual services, thus implementing equivalent services in the internal protocol. Multiple points-of-access could also exist, such as might be needed to vary security controls, but the significance of FIG. 20 is that the architecture of an integration server allows for such a point to exist, regardless of whether it does, and regardless of how many such points there are. Services may even communicate with other services via the point-of-access, as depicted by the arrows 200 and 201 having two solid heads.

FIG. 21 provides a variation of the point-of-access theme and uses the data bus notation of circuit boards to depict a central access mechanism. This figure introduces a notational convenience that will be used later. The vertical bar represents a data bus. Front-end adapters are able to deposit requests into the data bus and to receive replies from the data bus. Services are able to receive requests from the bus and to deposit replies into the bus. However, services are also able to deposit requests into the bus and to receive replies from the bus. Any service that participates in this latter activity is actually invoking another service, as depicted by the arrows having two solid heads. The bus could be implemented identically to a point-of-access, but it could also be implemented as a queue of messages destined for multiple targets or even as two queues—one for request messages and one for reply messages.

FIG. 22 illustrates a deployment of an integration server that strictly implements common protocol translation. Under this deployment, every generally useful back-end adapter is implemented as an integration service. Front-end systems and integration services that wish to engage a particular protocol instead invoke the appropriate back-end adapter integration service. The B2B Integration Server of the present assignee is provided with a number of integration services that implement back-end adapters. Since the integration service is the primary unit of functionality and the primary unit of reuse, the integration server architecture promotes the development and deployment of solutions that use common protocol translation.

Adapters on the server implement a number of different channels, and end-points are free to choose the channel by which they communicate with the server. End-points may even use multiple channels at once or vary the channels over time. The server supports a number of channels, such as HTTP, FTP, SMTP, DCOM, and function invocation for a variety of programming languages. Let the term channel handler refer to a software component that implements a particular channel. Supporting a channel is a straightforward matter of extracting request messages and sending reply messages. Some channels, such as FTP and SMTP, do not support transmitting reply messages in direct response to request messages. The webMethods B2B Integration Server does not provide reply messages in these cases, so these channels are normally useful when replies are absent or may be safely disregarded. For such channels, when replies are important, conventional asynchronous communications becomes necessary. The integration service receiving the request could use a back-end adapter to transmit a reply message back to the originator.

Support for encodings is a bit more complicated and a variety of techniques are employed. Upon extracting a message from a channel, a front-end adapter must determine the message's encoding. If the channel provides a mechanism for identifying the encoding, the adapter may rely on that. For example, HTTP provides a content-type header variable. If the channel does not provide such a mechanism, or if the message is found not to be in this encoding, the message itself may be examined and heuristics applied to identify the encoding. For example, if the syntax of the message is XML, it is possible to parse the XML to identify its document type or root element type name. The server may also provide a default encoding for messages sent over specific channels or to specific integration services. The server may even require a specific encoding for a given channel or service. Once the encoding has been identified, it is handed off to a codec (coder/decoder) to convert the encoding into the internal encoding. The techniques for implementing codecs include generic RPC, bindings, templates, delegation to integration services, and writing specialized code. Some of these techniques are discussed later. Back-end adapters are much more straightforward to implement, as the integration service may identify the encoding or even provide the adapter with a message that is already encoded as required by the back-end system.

Figure 23:
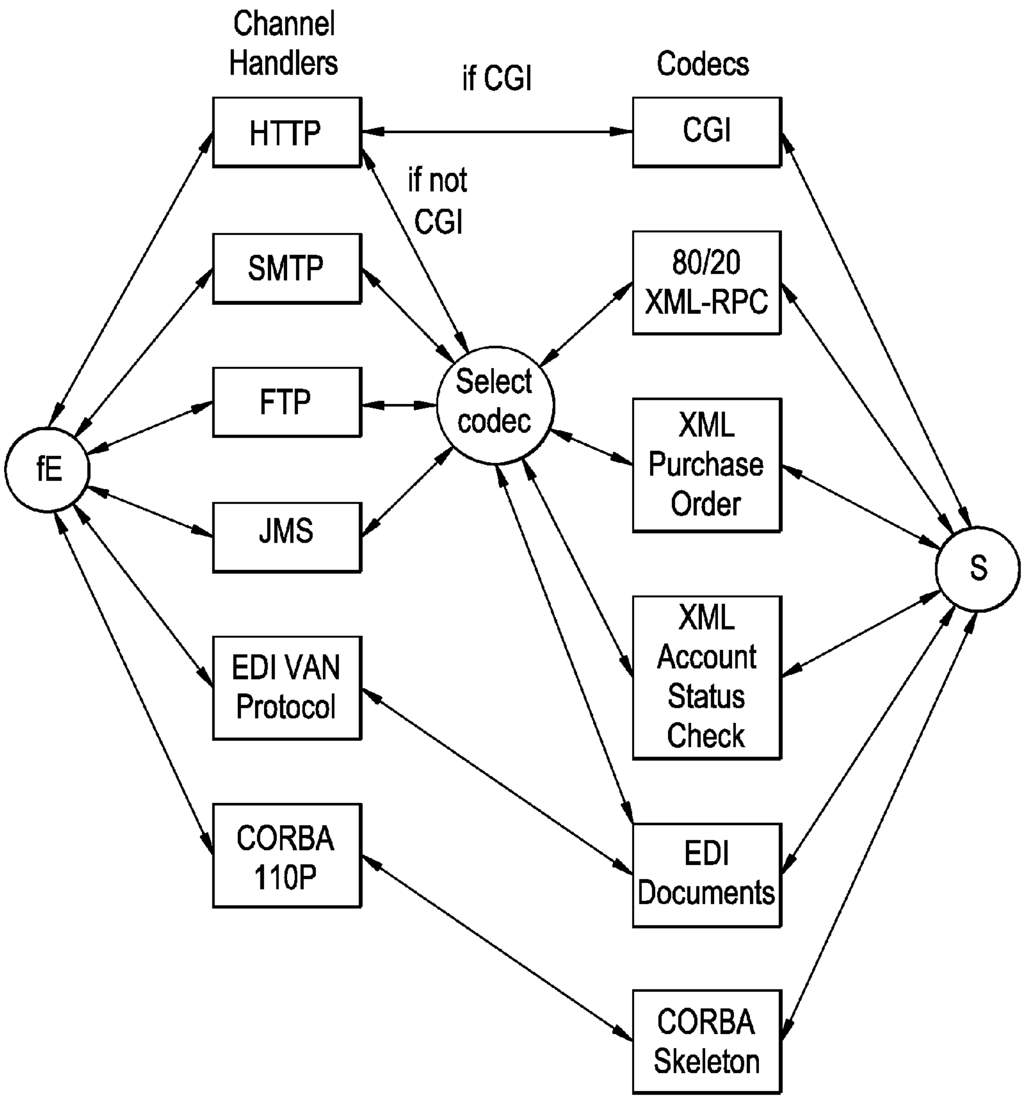
FIG. 23 illustrates an implementation of front-end adapters as dynamically constructed channel handler/codec pairs.

An adapter is most flexibly architected as a channel handler/codec pair. A single channel handler may be shared across all adapters that support a given channel. Likewise, a single codec may be shared across all adapters that support a given encoding. Under this architecture adapters may be thought of as virtual software components that are dynamically summoned to service a particular protocol as required. Sometimes, however, encodings are only defined for specific channels—such as CGI, which is only defined for HTTP—so, even in this architecture, some adapters will have hard-coded knowledge of both a channel and an encoding. The presence or absence of the dynamic property is an implementation detail of adapters, so the present application refers to adapters as concrete software entities. FIG. 23 illustrates an implementation of front-end adapters as dynamically constructed channel handler/codec pairs. This application uses the term integration component to refer to any software entity of a B2B integration server that is capable of communicating in the internal protocol. Adapters and integration services are both integration components.

In the B2B Integration Server according to this invention, all integration services have names. An integration service also typically belongs to a named interface, which is a collection of related integration services. Interfaces may also contain other interfaces, thus allowing integration services to be organized hierarchically. All of these names are collected into a hierarchical namespace. When a front-end system transmits a request message to the server it usually also specifies the fully-qualified name of an integration service. The fully-qualified name identifies the service within the namespace by also naming all of the interfaces that contain the service. After receiving and decoding a request message, the server uses the internal protocol to transmit the message to the named integration service. In addition to selecting the channel and the encoding for a message, a front-end system is also able to select the service that is to receive the message. It is also possible to provide a default service name, should the front-end system not specify a name. Another option is to route all messages received on a given channel or in a given encoding to a particular service.

Integration services consume messages transmitted in the internal protocol, but they may produce messages expressed in any protocol, not just the internal protocol. Hence, in addition to communicating with back-end adapters, integration services may also invoke other integration services. In fact, an integration service may itself be a back-end adapter; that is, back-end adapters may be implemented as integration services.

Because integration services have names, and because front-end systems may send messages to integration services by name, front-end systems may transmit messages through front-end adapters directly to back-end adapters that have been implemented as integration services. This allows one to design front-end systems that have all the sophistication of integration services, since the front-end systems have accessibility to the back-end systems, subject to security controls. This also allows one to build business logic directly into a back-end adapter, should that business logic not be useful with multiple adapters. Generally, an integration service that interacts with more than one back end system makes the collection of back-end systems appear as a single virtual system to front-end systems. Such an integration service may therefore be thought of as an adapter to a collection of systems that together operate as a single system.

Figure 24:
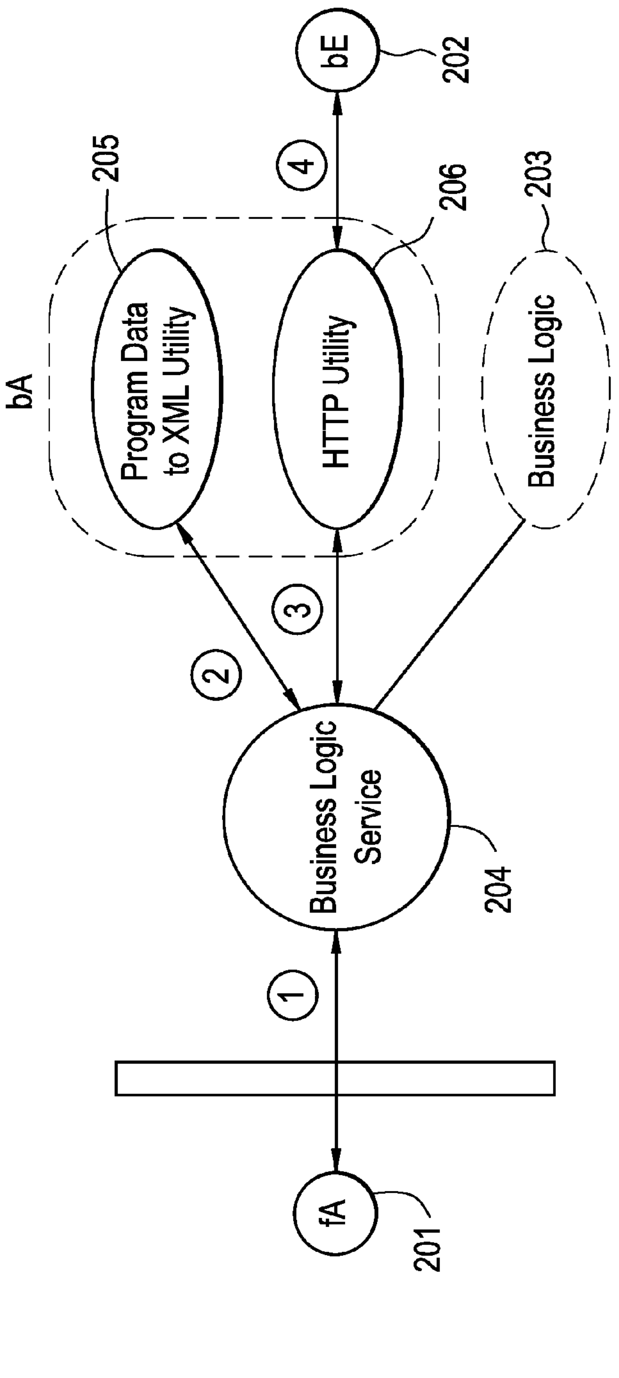
FIGS. 24, 25, and 26 illustrate three ways to implement back-end adapters in an integration server.
Figure 25:
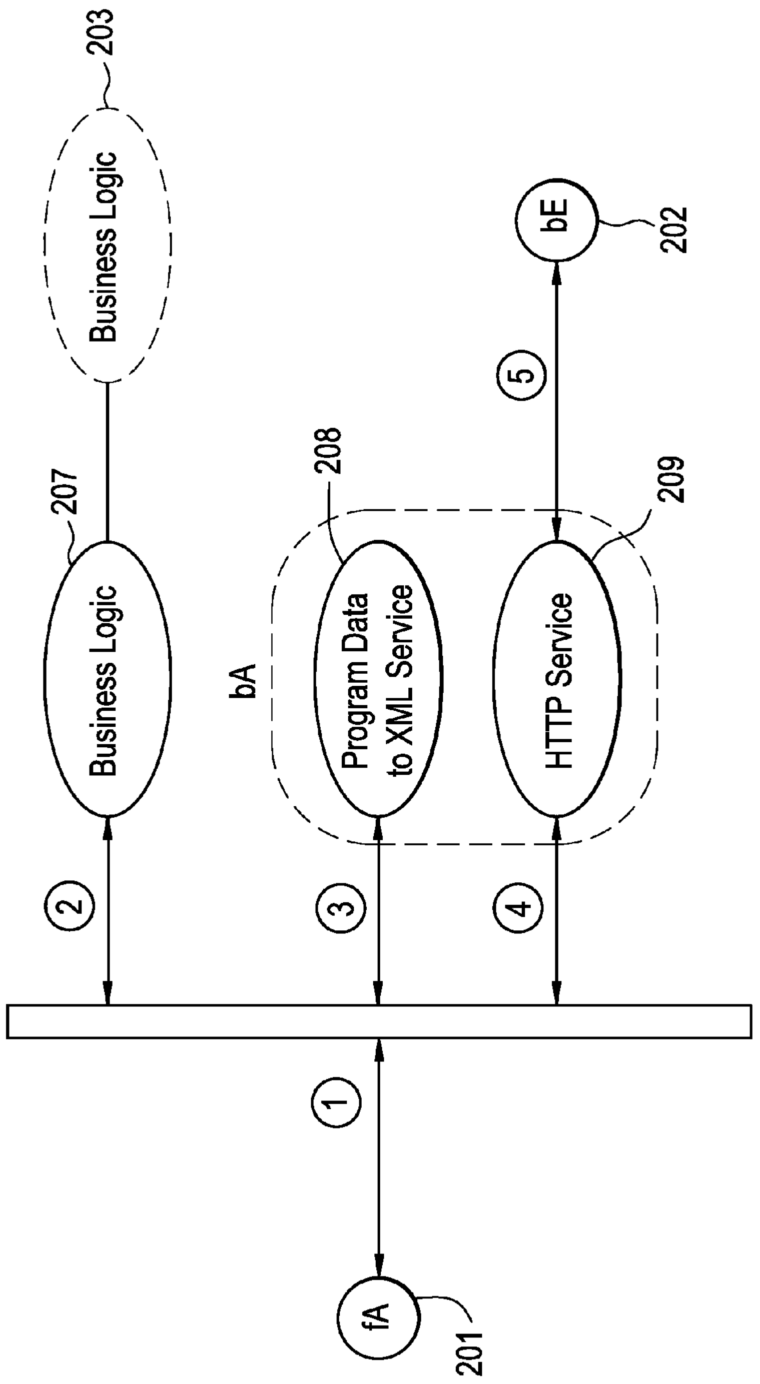
Figure 26:
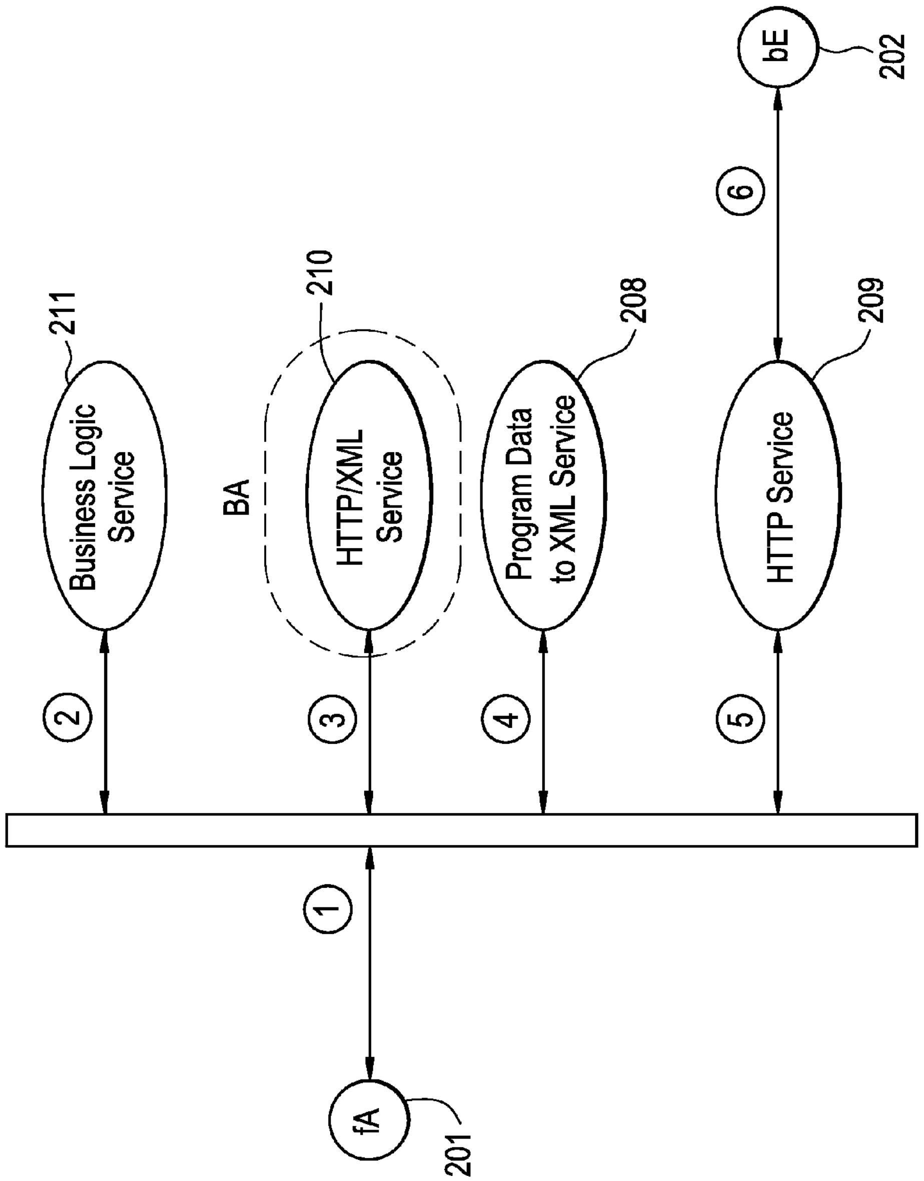

FIGS. 24, 25, and 26 illustrate three ways to implement back-end adapters in an integration server. These figures use data bus notation for convenience. All three figures depict adapters that transmit XML documents over HTTP. In FIG. 24, a single service 204 applies business logic 203 in the process of communicating with bE 202. To communicate with bE 202, service 204 calls upon two non-service utilities.

The first utility creates an XML document from program data, and the second utility transmits a message via HTTP. Step numbers depict the order of occurrence of actions. According to FIG. 24, neither the program-data-to-XML converter nor the HTTP transmitter is available universally to all services and all front-end systems, since they both have proprietary interfaces that are only accessible from within the server. Moreover, because the server cannot intercept the data flowing through these proprietary interfaces, debugging, validation, auditing, and security controls cannot be applied to these communications facilities.

FIG. 25 addresses these problems by implementing the program-data-to-XML, converter and the HTTP transmitter utilities as integration services. Integration service 207 is functionally equivalent to integration service 204 in FIG. 24. However, upon being invoked, service 207 subsequently invokes utility services 208 and 209, along with performing its normal business logic. This solution achieves some measure of reuse and an ability to monitor and control access to the utility services, but still no single service implements the protocol of XML over HTTP without also performing deployment-specific business logic. FIG. 26 depicts a preferred embodiment, in which separate services implement the utilities 208 and 209, the back-end adapter 210, and the business logic in service 211. The back-end adapter 210 is now available to front-end systems and to other end-points, and access to it may be controlled and monitored.

The Internal Protocol

Within a single integration server, the internal protocol is the mechanism by which integration components transmit messages to each other. Because the internal protocol is hidden internally within a integration server, some flexibility is gained in choosing its channel and encoding. In particular, the internal protocol is not subject to the constraints imposed by end-points or the network. Maximum efficiency is gained by using an internal channel that is the calling convention of the programming language in which the integration server is written. For example, a preferred programming language may be Java. A variety of internal encodings are possible, including the encodings that end-points might support. When the internal channel is a programming language calling convention, the internal encoding could be any programming language data structure.

A preferred embodiment of the internal protocol uses a self-describing encoding. A self-describing encoding is an encoding that associates a descriptive label with each data-item constituent of a message, where a message may be thought of as a collection of individual data-items. A particular association of a descriptive label with a data-item is known as a name/value pair. For example, in a message that is encoded as a tab-delimited file, each row is a data-item, as is each field in each row. In a C data structure, each field is a data-item, as is each nested data structure and each field in each nested data structure. Notice that any collection of data-items may itself be a single data-item. A descriptive label allows the application to identify a data-item without requiring the application to know in advance the position and extent of the data-item within the message. One example of a message that uses descriptive labels is a tab-delimited file that begins with a row consisting of the names of each field in a row.

There are a wide variety of self-describing encodings, including a wide variety of self-describing programming language data structures. XML (eXtensible Markup Language) is a self-describing encoding that is achieving popularity among software developers. XML is suitable for a message that consists of a string of characters. This string of characters is known as a document. XML imposes a syntax on the document so that the document simultaneously contains data-items (element content and attribute values) and descriptive labels for the data-items (element type names and attribute names). Since a document must be parsed with respect to the XML syntax to extract the data-items and descriptive labels, XML is an inefficient representation for an internal protocol. Were integration components to transmit XML documents between them, each component would be responsible for parsing each received document and for generating each transmitted document.

DOM (Document Object Model) is a more efficient representation for XML in the context of a programming language, since it models an XML document as a tree data structure. Each constituent of a DOM tree is called a node, including the root-most constituent, which represents an XML document. Because one may encode different semantic information among the many different syntactic constructs of XML, and because DOM was designed to expose all information in an XML document that might have semantic value, the DOM APIs have a complexity approaching the complexity of the XML syntax. Were integration components to transmit DOM nodes between them, the programming logic in each component would assume the additional complexity needed to recognize and produce the DOM analogues of the diverse XML syntactic constructs. DOM is therefore a less-than-ideal internal encoding.

The preferred embodiment of the integration server according to this invention uses a self-describing encoding defined by the inventors. This encoding is known as a Values object. A Values object is a hash table, of named software objects where the object names serve as the hash table keys. An object name serves as the key by which an object is hashed and serves as a label for the object. The object names may actually be the descriptive labels found in a message that is expressed in a self-describing encoding, but they need not be so. The objects of the hash table may represent lexical types such as integers, floats, and strings. They may also represent structured objects such as arrays, lists of arbitrary objects, and records. Records may be represented within a Values object as another Values object. Values objects are well-suited for representing conventional programming language records, since records uniquely name their constituent fields, making them good hash keys.

FIG. 27 illustrates the most important methods of a Values object. This figure depicts a Java class with the implementation details removed so that the methods may be clearly seen. The constructors build the Values object using an underlying Java Hashtable. The core methods are the methods needed to work with and manage a Values object. Notice that certain methods present the values and their associated keys in order. The order is just the order in which the values were added to the Values object, since a Hashtable is capable of preserving this order. The type-safe methods exist to delegate type-casting to the Values object so that the application need not concern itself with performing the correct type-casting on each access.

Over time, the present assignee has found that the Values object encoding is too simplistic for certain use cases that occur infrequently in business-to-business integration, but which nevertheless do occur. Most of these use cases involve using the internal encoding to model XML documents containing at least one element E having all three of the following properties: multiple child elements of E may have the same element type name, child elements of E may have different element type names, and the relative order of child elements of E has semantic significance. To accommodate such use cases webMethods has defined a new self-describing encoding known as Data. Data is now considered to be the preferred embodiment of the internal encoding. Logically, an Data instance is a Values object with the additional property that object names may occur in duplicate while still preserving the property that name/object pairs are ordered relative to one-another. The name/object pairs of Values objects are ordered because in any concrete instance of a hash table, the hash table entries are ordered relative to one-another. A hash table does not permit more than one object to reside at a given key, unless the objects are collected into an array at that key. Hence, allowing object names to occur in duplicate while still allowing object names to occur in arbitrary order relative to one another requires moving away from conventional hash table representations. Moreover, a hash table is neither the most efficient nor the most compact representation for all use cases. webMethods defines Data in the form of a Java interface, which frees the implementation of Data from conforming to a hash table. Objects may conform to the Data interface and yet have differing implementations. Example implementations include linked lists, hash tables extended to support order, and even an XML document.

FIGS. 28 through 32 portray the preferred embodiments of the IData interfaces. An object implementing Data is a message expressed in a self-describing encoding. Data itself only has factory methods for various kinds of cursor objects. Each cursor object is specialized for a particular kind of access to the object. By specializing the cursor to the nature of the access required, the efficiency of the access can be maximized. IDataCursor is the interface for the most generic kind of cursor, and it is the only cursor that is able to write to and manipulate the Data instance. Software may use the 'destroy' method of the IDataCursor to return the cursor to a pool of cursors, allowing an IData implementation to draw IDataCursor instances from this pull and hence minimizing the expenses associated with creating Java objects. All other cursors are specialized for read-only access. Data itself has no methods for accessing message data, since attaching access methods to an object necessarily biases the implementation of the object to some degree. The approach taken here allows different instances to have different implementations optimized for different uses.

Self-describing encodings such as Values objects and Data are capable of expressing data in labeled type languages. A labeled type language is a set of descriptive labels along with rules for the types of data-items that may be associated with each label and rules for the types of relationships that may exist among the labeled data-items. Relationships may include such notions as containment, adjacency, and order dependency. As used herein, the term language refers to a labeled type language when its usage is not ambiguous with other kinds of languages. When a message of a self-describing encoding satisfies the rules of a language, the message is said to conform to the language. A given self-describing encoding is capable of expressing messages conforming to many different languages. Likewise, if a message is expressed in a self-describing encoding, there is at least one language to which the message conforms.

Since the internal encoding of the integration server of the present invention is self-describing, every message transmitted between the server's integration components conforms to some language. A component that receives a message must either be able to understand the language to which the message conforms or it must be sufficiently generic that it can process the message in a language-independent way. A component must understand the language whenever it must apply business logic to the message and whenever it must convert between the message and an encoding that does not support the same language. Consequently, most deployments of the integration server of this invention contain multiple components that share a common language. Deployments that communicate with a variety of end-points frequently support a variety of languages and internally use integration services to bridge between the languages as needed.

An integration server realizes a number of benefits when its internal encoding is self-describing, such as the simplicity with which it becomes possible to create new integration components. One can write generic tools that operate on messages expressed in the internal encoding, and one may build integration components from these tools. The integration server of this invention implements many of these tools as integration services in order to maximize their accessibility. Let the term utility service refer to a generic tool that has been implemented as an integration service. Utility services are particularly beneficial in the inventive integration server, since this server allows solutions developers to debug integration services by tracing the flow of control and the flow of data through them, even if the server is already deployed and running. Generic tools are particularly valuable for capturing transformations and business logic that need to be applied identically to the data-items of a variety of different languages.

A variety of generic tools are possible. Generic tools include those that transform the language in which a message is expressed, those that sum a collection of numeric values, and those that store data-items in a data store. A tool might also transform data to or from the internal encoding, thus facilitating the development of adapters. The operation that a generic tool performs depends on how the tool is configured in a particular instance of usage. A tool is configured in part by identifying the descriptive labels to which it is to be applied or the descriptive labels it is to produce. Examples of tools that perform language transformations on the internal encoding include tools for renaming descriptive labels, tools for deleting data-items having specific labels, tools for moving data-items according to their labels, and tools for changing the data types of data-items having particular labels. The WIDL input binding is an example of a tool that converts from the internal encoding to HTTP/CGI, mapping between the descriptive labels of the internal encoding and the form names required by the back-end CGI system.

FIGS. 33A-E and 34A-B portray service definitions for two example integration services. Each of these service definitions names the service, provides a brief description of the service, and lists the input and output parameters for each service. Each parameter has a descriptive label (name) and a type. FIGS. 33A-E defines a service named loadDocument. loadDocument is a back-end adapter service that submits arbitrary documents or CGI messages to a back-end system via HTTP and receives an XML or an HTML document in response. The service automatically parses the document and returns a node representing the parsed document. This service corresponds to a WIDL input binding; it provides input binding functionality in the context of an integration server that employs the flow language.

FIGS. 34A-B define a service named queryDocument. queryDocument performs a function. analogous to a WIDL output binding. It is a utility service that inputs a document and a set of queries and outputs the data retrieved from that document by those queries. One may emulate a WIDL service by putting a loadDocument and a queryDocument in series. However, because this functionality is available via integration services instead of just via WIDL, the functionality is available to a broader variety of applications and subject to richer flow control.

A self-describing internal protocol provides other benefits upon associating additional functionality with the protocol. Functionality is said to be associated with the internal protocol if the functionality is potentially available whenever a transmission occurs via the protocol. For example, access control functionality might allow or deny a transmission according to whether the sender of the transmission has the right to send a message to the targeted recipient of the message. By associating access control functionality with the internal protocol, this access control check could be applied to any transmission occurring via the internal protocol, including transmissions between integration services. The functionality need not actually be applied on any given transmission, since other factors may influence whether the functionality pertains to the transmission.

A preferred embodiment of associating functionality with the internal protocol is to implement services in the internal protocol by wrapping services of varying protocols within a point-of-access. The point-of-access would assume responsibility for implementing the associated functionality. This centralizes the implementation of the functionality and ensures it is available to any service to which it could be applied. Another approach to implementing associated functionality is to repeat the functionality among multiple implementations of the internal encoding. Approaches combining these two are also possible, such as one with multiple points-of-access.

It is useful to associate validation functionality with the internal protocol. In the context of this application, validation is the process of comparing the structure and content of a message to a specification defining the structure and content that the message is allowed to have. In the context of an integration server, a service definition provides this information for both request messages and reply messages. One may associate validation functionality with the internal protocol to validate a request message prior to forwarding the message to an integration service or to validate a reply message prior to returning the message via the internal protocol. Validation is especially useful on a self-describing encoding, since the presence of descriptive labels in the data allow for some validation of the semantics of the message instead of just the lengths and types of the data-items found in the message.

Validation normally requires that a service definition be associated with the integration service. Since these messages are expressed in an internal encoding on which the integration server has standardized, it is possible to generically compare a message expressed in the encoding to the requirements that a service definition imposes. The process is similar to validating an XML document against an XML document type definition (DTD), except that the present validation functionality applies to data expressed in an internal encoding. This data may derive from an XML document, but it may also derive from a variety of other data sources.

Should a request message fail to validate, as when it does not conform to the service definition, the integration server may choose not to invoke the identified service and instead generate an error condition. On either successful validation or failed validation, validation functionality may generate an event or write information about the failure to storage. Likewise, validation functionality may choose to generate an error condition, generate an event, or write information to storage after validating a request message, according to the results of this validation.

A functionality related to validation is monitoring. Like validation, monitoring examines the information found in messages, but unlike validation, monitoring simply reports on that information. When monitoring is associated with an internal protocol, the monitoring may simply indicate that a request or reply message was transmitted, or it may provide details about the request or reply message. The association assists with debugging deployments of an integration server, with tracking the health of the integration server, and with auditing or logging events that occur within the integration server. Monitoring functionality may also be designed to trigger events when messages contain pre-specified information or when messages meet pre-specified conditions. Monitoring on the internal protocol is especially useful because it may provide information that is being communicated by a service that invokes another service. A self-describing internal encoding simplifies monitoring by allowing the monitoring functionality to identify data-items by name without having to consult service definitions. Moreover, should a message contain data-items not specified by a corresponding service definition, if the message is in a self-describing encoding, the names of these additional data-items may be reported.

Caching is another functionality that one may associate with an internal protocol. Caching functionality only applies to protocols that support the transmission of reply messages. When caching functionality is associated with an internal protocol, the integration server may store the reply message of a service in association with a pair consisting of the fully qualified name of the service and the request message that induced the transmission of this particular reply message. The place where the server stores the reply message is called a cache. In other words, when a service receives a request message and transmits a reply message, caching may store this reply message in a cache, associating the reply message with both this request message and the service's name. When a subsequent request message is targeted for transmission to a service, the integration server may inspect the cache for a reply message that has been stored in associated with both the targeted service and a request message that is equivalent to the particular request message intended for the service. Two messages are equivalent when they contain the same information. If a reply message is found to occur in the sought-after association, the server may emulate a transmission to the service by transmitting the retrieved reply message to the sender of the transmission that was targeted for the service. In this case, the service is not invoked, but it appears to the sender is if it had been invoked. If no reply message is found to occur in this association, the service is invoked and its reply message is transmitted back to the sender as usual.

Caching functionality is of particular significance in light of the bandwidth, clock cycle, and latency problems of the Internet. Bandwidth and server clock-cycle concerns are sufficiently serious on the Net and Net applications are sufficiently tolerant of latency that the caching of service invocations is now a useful mechanism to employ. When caching is done in association with an internal protocol, it can be applied in a uniform fashion across the different channels and the different encoding that front-end systems might use in communication with the integration server. This is because front-end adapters translate between the protocols that these front-end systems use and an internal protocol, thus leveraging functionality that is in association with an internal protocol, including caching. A well-designed integration server will provide facilities for enabling and disabling caching either globally or on a per-service basis, since caching is usually not desirable for highly volatile information or highly significant information. A well-design integration server will also implement, staleness windows so that reply messages that age too much may be removed from storage, thus ensuring the timeliness of reply messages to within constraints that are suitable for the service.

Caching benefits when the internal encoding is self-describing because a self-describing encoding allows for a rich variety of equivalence tests. There are many circumstances when two messages contain identical information but are not byte-for-byte identical. For example, one message may contain a product name followed by a quantity, while another contains a quantity followed by a product name. If the product name and the quantity are the same, the order of occurrence shouldn't matter. Caching functionality may examine a service definition that corresponds to the service in order to ascertain what information is relevant for purposes of equivalence. A final benefit not related to a self-describing encoding is that by virtue of its association with an internal protocol, caching may occur when one service directly invokes another, which for example allows an integration server to manage the bandwidth and time consumed by requests it originates.

Execution control is another functionality that is beneficially associated with an internal protocol. Execution control is primarily valuable for debugging and troubleshooting a deployment of an integration server, including the integration services employed in the deployment. Execution control consists of stopping and starting transmissions in various ways. Via execution control, when a request transmission is targeted for a service, an integration server may suspend the transmission prior to passing the request message to the service. This is normally accomplished by suspending the running operating system thread. Execution may resume after a pre-determined interval or upon receiving a notification that the transmission is to be resumed. Execution control may even terminate the transmission in a way that doesn't allow for the transmission to resume in the future, thus terminating the invocation of the targeted service. The abilities to suspend, resume, and terminate a reply transmission may also be facilities of execution control.

The features of access control, validation, monitoring, caching, and execution control are important features of an integration server deployed in a critical business-to-business communications environment. These features are not only valuable at the boundaries between an integration server and end-points; they are also valuable internally within the server, applied to transmissions between services. The internal monitoring facilities and redundancy facilities (such as validation and caching) allow the server to provide greater control over its health and the health of its end-points.

Service Definitions

An integration server involves many communicating systems. End-points communicate with adapters, adapters communicate with integration services, and integration services communicate with other integration services. Because a B2B integration server is a generic platform, being configurable and programmable for deployment in a variety of circumstances, challenges arise with identifying the systems that are able to communicate with other systems and with enabling communication between systems that are not otherwise able to communicate. The present invention addresses these challenges by associating a service definition with each integration service deployed on an integration server.

Two systems may only communicate with one another if they agree on the information that is to transmit between them. In other words, it is only possible to bridge differences in encodings when the encodings express the same information. One may represent this agreement in the form of a contract. Contracts of this sort have conventionally been expressed in terms of a particular class of encodings or a particular class of channels. For example, EDI transactions are expressed by defining the formats of the individual EDI documents. Many XML protocols are being defined by providing document type definitions (DTDs) for their XML documents. CORBA remote procedures are defined via OMG Interface Definition Language (OMG IDL). An IDL is used to define an interface specification. Like traditional IDLs, OMG IDL has notions that are specific to invoking procedures within programming languages.

A contract may also be expressed in the form of an IDL that is abstracted from the traditional focus of describing procedure invocation for programming languages. The interface specification subset of WIDL is an example of such an IDL. An interface specification defines the signatures of one or more integration services. Each specification has a name and a set of one or more service definitions. Each service definition provides the service's name and the input data items and output data items of the service. Each data item has a name and a type. The input data items are those data items that are transmitted to the service in the request message, and the output data items are the those that the are returned from the service in the reply message. See FIG. 16(*a*) for an example of a WIDL interface specification. This figure is briefly described above.

An interface specification collects a set of related service definitions together, but only the service definitions are significant for establishing connectivity between systems. Early versions of the B2B Integration Server of the present assignee used interface specifications exclusively to define interface contracts, as described above, but a preferred embodiment is now to allow each integration service to be defined in isolation using just a service definition. Moreover, a preferred embodiment of a service definition describes the inputs of a service using the full richness of a labeled type language, treating a collection of inputs as a message for this purpose. A preferred embodiment also describes the outputs of a service in a like manner.

Service definitions have a broad variety of uses in an integration server. In addition to providing the information needed to identify the systems that have compatible interfaces, service definitions may be used, for example, to guide the development of integration components, to configure generic tools with information about the descriptive labels that the tools are to consume and produce, and to validate data input to or output from services to ensure that the runtime inputs and outputs actually conform to the service definition. The B2B Integration Server of this invention enables all of these uses. Many of the facilities that the server provides for building integration components require service definitions.

One particularly compelling use of service definitions is to make multiple back-end systems interchangeable in a way that is transparent to integration services and front-end systems. A solutions developer may choose a service definition and then write multiple integration services that conform to this definition. These integration services would be interchangeable and yet have different implementations. Front-end systems and other integration services would use these integration services as adapters to the back-end systems. An integration service might be written to serve as a switch that dynamically selects among these adapters. Front-end systems and other integration services could use this switch integration service to communicate with any of the back-end systems.

Figure 35:
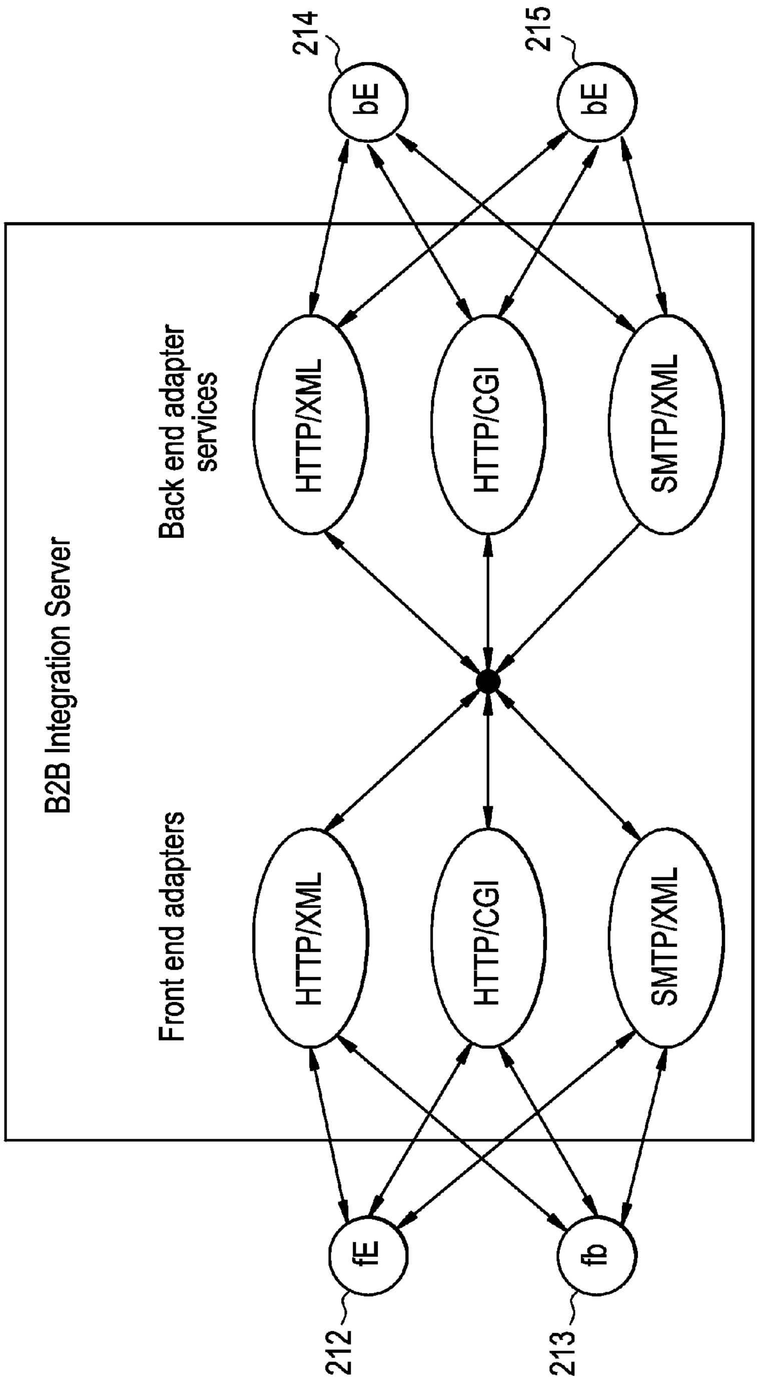
FIG. 35 illustrates the general ability on an integration server to translate between protocols, and illustrates an arrangement where the fE is responsible for naming the S/bA to use.

FIG. 35 illustrates the general ability that an integration server has to translate between protocols. Dynamically constructed front-end adapters translate between the protocol used by a front-end system (such as fE 212 and fE 213) and the internal protocol, delivering messages to integration services. The integration services implement back-end adapters that translate between the internal protocol and the protocol used by a back-end system (such as bE 214 and bE 215). This architecture applies whenever specialized business logic is not needed to access back-end systems. Intervening business logic may be required when a single transmission by a front-end system must result in transmissions to multiple back-end systems. The integration server dynamically accepts whatever protocol a front-end system uses to transmit a message, but additional information is needed to identify the S/bA that is to receive the message via the internal protocol and to identify the bE that is to ultimately receive the message. A deployment of the integration service may provide front-end systems with a single service that routes messages to the appropriate fE via the appropriate S/bE, but FIG. 35 illustrates a configuration in which the fE is responsible for naming the S/bA to use. If the S/bA is capable of transmitting messages to multiple bEs, the fE must also identify the destination fE. An fE could provide supply this information in the request messages that it sends, but the S/bA services must recognize the information.

Figure 36:
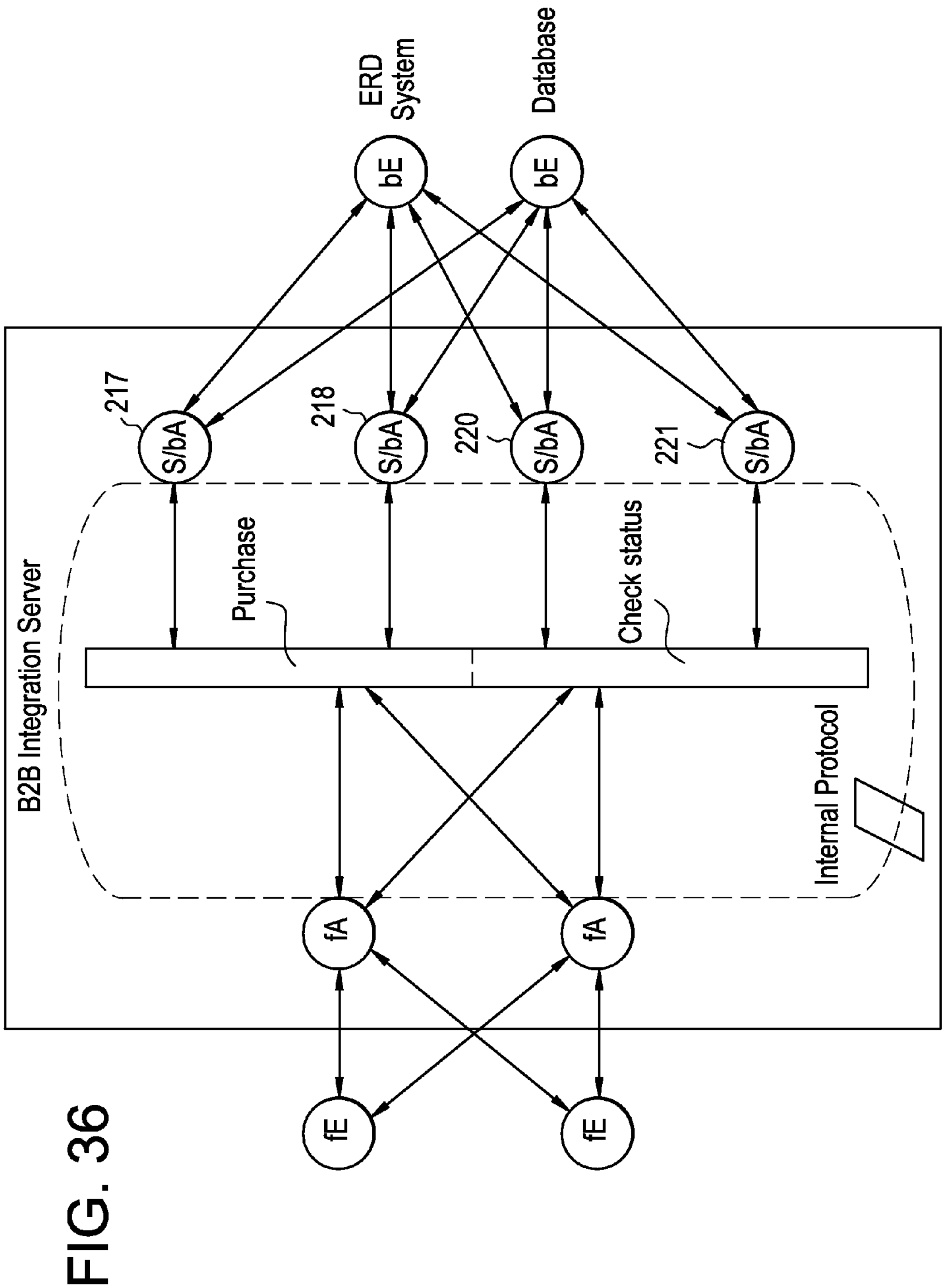
FIG. 36 illustrates a deployment of the integration server that supports two service definitions.

Business logic is often needed between the front-end and back-end systems. Services that utilize some or all of the information found in a message expect the message or certain aspects of the message to have a specific form. In other words, these services consume and produce messages conforming to certain languages. The service definition of a service identifies the languages to which the request and reply messages must conform. FIG. 36 illustrates a deployment of the integration server that supports two service definitions. One definition is named 'purchase' and the other is named 'check status'. Each of these service definitions is implemented by two integration services. Services conforming to the same service definition are functionally identical, except that that communicating with different back-end systems. A front-end system may issue a 'purchase' request to a back-end system of its choosing by naming the 'purchase'-conforming service that the integration server is to invoke when transmitting the message. Likewise, a front-end system may issue a 'check status' request to a particular back-end system by naming the 'check status'-conforming service that communicates with that back-end system. In this figure, the area designated as the internal protocol depicts a logical rather than a physical structure. The integration services are partitioned according to the service definitions to which they conform.

Figure 37:
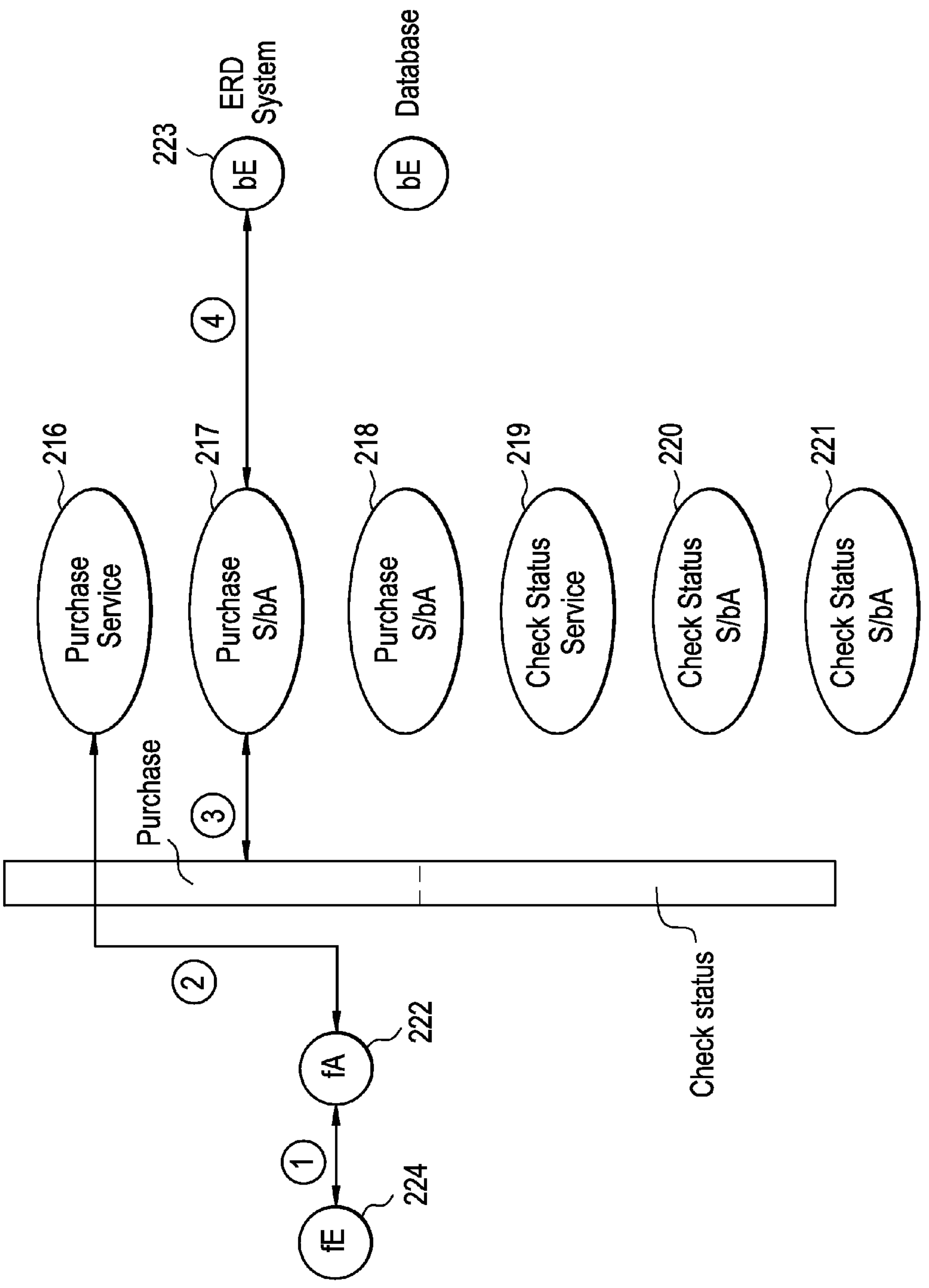
FIG. 37 depicts an alternate deployment for providing access to multiple back-end systems through services conforming to the same service definition.

FIG. 37 depicts an alternate deployment for providing access to multiple back-end systems through services conforming to the same service definition. Under this configuration, a front-end system always uses service 216 to invoke a 'purchase'-conforming service, regardless of the target back-end system. Separate S/bA services 217 and 218 convert between the messages conforming to the 'purchase' definition and those of the back-end systems that are associated with the service. The steps in FIG. 37 illustrate the process. In step 1, fE 224 transmits a request message to fA 222, and in step 2 fA 222 transmits the request message to service 216 using the internal protocol. Service 216 identifies the bE to which the message is destined. The information may be available in the request message, as dictated by the 'purchase' service definition, but it may also be provided from another source, which may alleviate the service definition from having to support this information and the fE from having to provide it. Based on the identified bE, service 216 identifies the S/bA that communicates with this fE. These S/bA services are services 217 and 218 in the figure. In step 3, service 216 transmits a message to the identified S/bA, which occurs as S/bA 217 in the figure. In step 4, S/bA 217 responds by transmitting a message to the destination bE 223. A similar process may occur for other service definitions, such as the depicted 'check status' definition. It is also possible to implement the point-of-access service and the S/bA services using distinct definitions, as might occur when the fE identifies the destination fE in the request message.

The B2B Integration Server of this invention provides a variety of facilities for creating service definitions, adapters, and integration services. These facilities include WIDL specifications, WIDL input bindings, WIDL output bindings, templates, and XML-RPC codecs that take advantage of service definitions. It also provides implementations for a variety of channels, such as HTTP, FTP, SMTP, DCOM, and procedure invocations for several programming languages. As with most implementations of HTTP, this implementation includes support for the CGI encoding. The preferred embodiment originally used WIDL technologies, but later embodiments use technologies that are largely functionally identical. The only significant difference between the WIDL technologies and their successor technologies is that the successor technologies have been implemented as utility services. These technologies have been re-implemented as utility services to facilitate their use within a specialized programming language webMethods developed for implementing integration services. This specialized language is called the "B2B Flow Language," can be more succinctly referred to as the flow language.

Flow Language

The B2B flow language is a language for configuring the flow of data among services on an integration server. The flow language connects services together by identifying which outputs go to which inputs, manages the execution of services through conditional processing and error handling, and provides the infrastructure necessary for arbitrary data transformation. An expression of the language defines a single service that integrates the behavior of other services; it is an integration language. Just as the relatively simple logic of a printed circuit board integrates a collection of sophisticated chips, the flow language provides the simple logic necessary to integrate a collection of sophisticated business services. The language is suitable for expression in a variety of representations, including graphical representations. This specification defines the processing model for the flow language along with the simple XML representation that B2B uses for the language.

The flow language is a language for creating integration services on an integration server. Flow services integrate multiple services—e.g., Integration Module (IM) services and other flow services—into a single service. A flow service accomplishes this by defining how data flows among the services and by managing this flow of data. An IM service is a service that is implemented in any of a variety of programming languages and that is resident on the webMethods B2B Integration Server.

A typical use of the flow language is to create a service chain. In a service chain, the flow service invokes an initial service with the inputs that were provided to the service. The outputs of this initial service are then passed as inputs to another service. This cascade of passing outputs to inputs proceeds until the last service in the chain has been executed. The outputs of this last service become the outputs of the flow service itself. One might use a service chain to drive a purchase. The first service might login to a site and establish an account ID. The next service might ask the site to return the product ID for a product having a particular name. The final service might order a product of the found ID and return an order number.

Another use of the flow language is to retry services that fail. One might create a flow service that attempts to execute another service. If the service fails with an error, the flow service might wait a few seconds and then try the service again. The flow service can specify the number of attempts it should make before giving up and failing itself. The retry service is especially useful with services that access web sites that may get too busy to handle a request.

Still another use of the flow language is to define a set of alternative services such that if any one service fails, another should be attempted. The flow service specifies the order in which to attempt the services. The flow service succeeds if any one of the service it contains succeeds, and it fails if all of the contained services fail. This kind of flow service is useful when each of the services is keyed to a specific condition, so that only the service that is appropriate for the condition executes. For example, services that bind an XML or an HTML document are keyed to a particular type of document and will fail to bind to a document of the wrong type. The flow language allows a service to attempt multiple bindings.

The flow language has many other uses too. One may use it to place timeouts on the durations of operations, to select a service to execute based on data values, and to perform a sequence of operations once for each value in a set of values. Of particular significance is the use of the flow language to transform data from one representation into another. Bridging between the data representations required by different applications is one of the more challenging hurdles of application-to-application integration. The flow language significantly eases this challenge by supporting name transformations, structural transformations, and value transformations.

Name transformations are the simplest type of transformations. Services may name the data values that transfer between them, and they may choose different names for the same data values. For example, one service might use the term "PurchaseDate" while another uses the term "DatePurchased". Name transformations rename data values as they pass between services so that the data values have the appropriate names when they arrive at a target service.

Services may also represent the same data values in different data structures. For example, one service might list associated data values (such as name, date, and address) in three separate unstructured arrays while another service represents the same information in a single array of structures. In the case of the array of structures, each structure would contain one tuple of the associated values (name, date, and address). A structural transformation could be applied to this example to translate the three arrays into the single array of structures or to translate the single array of structures into the three arrays. Structural transformations convert data between different but equivalent data structures.

Value transformations are the most open-ended kind of transformations. They are needed to convert between the different lexical formats in which services represent data. For example, one service may use the value "1" to represent the month of January while another uses the value "JAN" and still another uses the value "January". A flow service accomplishes value transformations by delegating responsibility to perform the transformation to integration module (IM) services. An IM service may in turn contain program code that performs the transformation or it may leverage from existing transformation services by itself delegating to a third party resource, such as an Internet web site. In this manner a flow service may use IM services to provide any kind of value transformation. Value transformations are useful for converting service input and output data into a common format so that multiple services or Internet sites may communicate.

Previous versions of applicants' integration server provided some of the flow language functionality through WIDL mappings. However, WIDL mapping services only made this functionality available to other WIDL mapping services. WIDL mappings were also unable to perform data transformations. The flow language replaces WIDL mappings. All of the functionality that WIDL mapping services were able to provide other WIDL mapping services are now available to all services, including IM services. Previous functionality is made available either through flow language facilities, such as the facility for chaining services, or through IM services that the integration server provides for flow services to call, such as an IM services that binds HTML or XML documents.

The following is a brief illustration of certain terminology used in the following description.

| Term | Definition |
| --- | --- |
| Flow Engine | The flow engine is the software component that is responsible for executing flow language expressions. |
| Service | A service is an operation that resides in the integration server namespace. Every service has a name, a set of input parameters, and a set of output parameters. A service may simply yield output parameters that are a function of its input parameters, or it may apply the input parameters to perform an action that affects the state of a system, or it may do both. The webMethods B2B Integration Server supports three kinds of services: WIDL services, IM services and flow services. |
| Flow Service | A flow service is a service that is implemented in the flow language. The flow language is a language for implementing flow services, so every complete expression of the language is a flow service. In the XML representation, the FLOW element is the unit that implements a flow service. |
| Flow | 'Flow' is a shorter and more hip name for flow service. |
| Integration Module (IM) Service | An Integration Module (IM) service is a service that a webMethods B2B Integration Server IM implements. An IM is a software module that implements a set of services in any of a variety of programming languages. Frequently, an IM service is written to implement either business logic or integration logic, where integration logic involves delegating functionality to one or more services of one or more back-end applications. |
| Service Definition | A service definition is an abstract definition of the input and output parameters of a service. Service definitions each have a name that uniquely identifies the service within the B2B namespace. Each also lists the names and types of each input and output parameter. For any service, it is possible to define a service definition that describes the service, in which case the service is said to 'have' that service definition. |
| Field | A field is a name/value pair; it is a name that has been paired with a value. The name is a string of characters, and the value is any kind of programming language object. Every field also has an associated type that indicates what kinds of values are valid for the field. |
| Pipeline | A pipeline is an ordered set of fields. A flow service receives its inputs via a pipeline, stores transient state information in the pipeline while executing the service, and returns its outputs via the same pipeline. |
| Flow Operation | A flow operation is an operation that the flow language defines. Every flow operation operates on a pipeline. The operation may modify the pipeline and it may perform an action based on the values in the pipeline. |
| Container Operation | A container operation is a flow operation that contains other flow operations. These other operations are known as the child operations of the container. The |

-continued

| Term | Definition |
|---|---|
| | conditions under which the container executes its child operations vary with the type of container. |
| Flow Element | A flow element is an XML element type that represents a particular type of flow operation. |
| Sequence | A sequence is a type of container operation. The child operations of a sequence are ordered. When a sequence is invoked, the sequence sequentially executes its children against the pipeline. Sequence operations may be configured to terminate prematurely when a child operation fails or when a child operation succeeds, and it may be configured to attempt all operations regardless of failures. |
| Map | A map is a flow operation that applies simple transformations to the fields of a pipeline. A map may rename fields, move fields, remove fields, add fields, or assign the values of fields that are already present. Maps are typically used to prepare the pipeline for use by a subsequent operation, such as to rename fields to names required by the operation, or to clean up the pipeline after a preceding operation, such as to remove fields that the operation added but which are not needed. |

The Flow Language Structure

The flow language is a language for building flow services. Its fundamental unit is the flow operation. A flow operation is an operation that acts on a pipeline, where a pipeline is a collection of name/value pairs known as fields. The operation may change the pipeline or it may perform an action as a function of the names and values in the pipeline. The operation may also invoke other flow operations, controlling the order of execution of the other operations or the conditions under which they execute. The flow language provides only a few types of flow operations and relegates all other functionality to integration module (IM) services. The few that it provides are those that are necessary for integrating services together.

Figure 38:
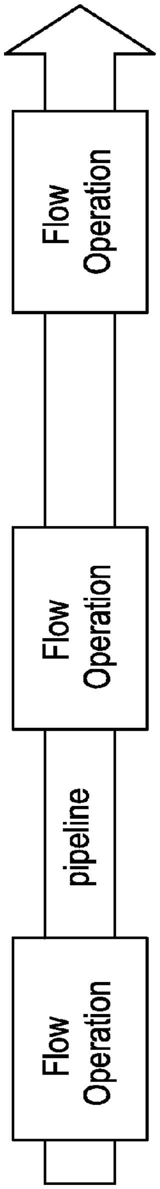
FIG. 38 depicts the basic architecture of a sequence.

The flow language typically groups flow operations into sequences. A sequence is a set of flow operations that sequentially operate on a pipeline. Each operation may modify the pipeline or perform an action based on the fields in the pipeline. Together the operations of the sequence accomplish a task. For example, the first operation might load an XML document into the pipeline. The second operation might extract data from the document and add the data to the pipeline. The last operation might transform the data into the required format. FIG. 38 depicts the basic architecture of a sequence.

Figure 39:
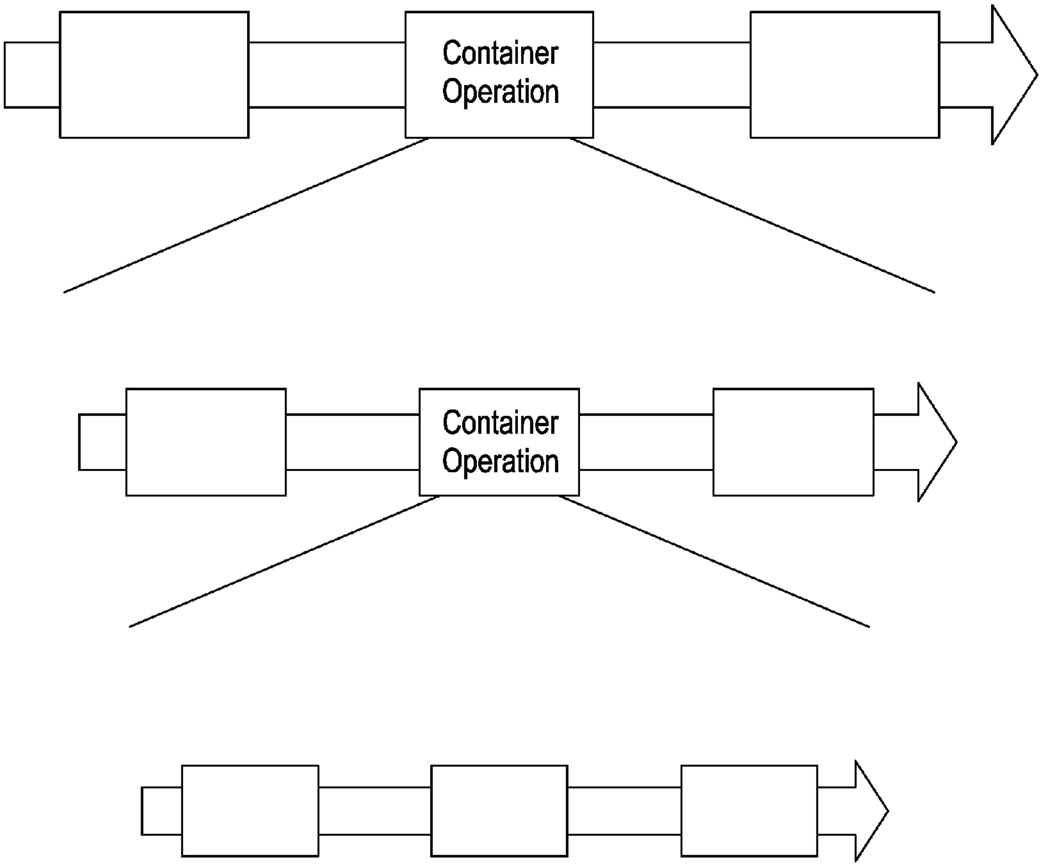
FIG. 39 illustrates the compositional property of flow operations

Every flow service is a sequence of flow operations. A flow operation may itself be a sequence, and hence may contain other flow operations. Not all operations that contain other operations are sequences. For example, the branch operation is not a sequence. The class of flow operations that may contain other flow operations are known as container operations. Since flow operations may contain other flow operations, one may represent a flow service as a tree of flow operations. This architecture allows the flow designer to put any flow operation under the influence of any other flow operation, thus maximizing the diversity of solutions available. FIG. 39 illustrates this compositional property of flow operations.

The flow service is the most granular structure that the flow language defines. A flow service is accessible via the B2B namespace. Except as constrained by access controls, one may invoke a flow service by issuing an HTTP request to B2B, by invoking the service from within an IM service, or by invoking the service from within another flow service. When a flow service invokes another flow service, the calling service hands its pipeline to the other service and trusts the other service not to overwrite any intermediate values that the caller has in the pipeline. To prevent such conflicts, each flow service creates its own pipeline from the input pipeline by copying the input pipeline.

A flow service is expressed in XML as a single XML document. The document uses the hierarchical relationships available to XML elements to model the hierarchy of flow operations. The different flow operations are each assigned an element type name, and the properties of a flow operation are specified via attributes place on its representing XML element. Elements that represent flow operations are known as flow elements. Additional element types may be defined to provide the details of a flow operation.

This specification uses a common tabular format to define each of the flow language element types. Each table takes the following form:

| | | |
|---|---|---|
| Element Type Name | | <ELEMENT> |
| Element Attributes | attribute-name-1 | Description of the attribute, including whether it is optional or mandatory on any given instance of the element. |
| | . . . | |
| Valid Child Elements | element-type name-1 | Description of the element type, including the number of instances of the element that are allowed |
| | . . . | |

In this table, the title "<ELEMENT>" is a placeholder for the element type name of the element that the table defines. An element may have zero or more attributes defined for it, and each will appear in the "Element Attributes" row. The "Valid Child Elements" row lists the different types of elements that may occur in the content of the element, if any are allowed. Most flow elements may contain other flow elements, and most of these specify that the child elements are implicitly contained within an operation referred to as the "default sequence operation." The behavior of such an element is equivalent to the behavior that results from further nesting all of the children in a SEQUENCE element that uses only its default attribute values.

Any flow element may contain a COMMENT element, but it may not contain more than one COMMENT element. One may use the content of this element to annotate a flow service. The annotation is intended to describe the flow element to which it belongs. In this manner, every flow element of a flow service may have an attendant annotation. The COMMENT element is defined simply as described in the following table:

| | |
|---|---|
| Element Type Name | <COMMENT> |
| Element Attributes | None |
| Valid Child Elements | None; a comment may only contain text. |

The following table provides a brief description of all of the different element types that the flow language defines:

| | |
|---|---|
| FLOW | Element that represents the entire flow service. Root element of the entire XML document. |
| SEQUENCE | Flow operation that sequentially executes a set of child flow operations. |

-continued

| | |
|---|---|
| MAP | Flow operation containing map rules that perform name and structure transformations on the pipeline. |
| BRANCH | Flow operation that selects a child flow operation to perform based on a value in the pipeline. |
| RETRY | Flow operation that retries a sequence of child operations until a retry condition is met. |
| LOOP | Flow operation that iterates over a set of values and that may optionally produce another set of values. |
| INVOKE | Flow operation that invokes another service. |
| COPY | Map rule that copies a pipeline field to another field. |
| MOVE | Map rule that moves a pipeline field from one place to another. |
| DELETE | Map rule that deletes a pipeline field. |
| SET | Map rule that sets the value of a pipeline field. |
| COMMENT | Element that annotates its containing element. |

The Flow Language Pipeline

A pipeline is an ordered set of name/value pairs and may be implemented as an object implementing the IData interface—an IData instance. Each name/value pair is called a field. The name of a field is a character string. A name should not contain the forward slash ('/'), since this character is used to delimit field names in the path expressions that map rules use. The value of a field is any type of programming language object. A value may even itself be an IData instance. A pipeline contains all the application-specific state of a flow service; it is the sole repository for information that the flow service must maintain to accomplish the service's unique function. Consequently, the pipeline serves as both a scratchpad for the service and as the means by which parameters are passed to and received from other services that the flow service invokes.

In an early embodiment of the flow language, the pipeline was implemented as a Values object. Indeed, anywhere the presently described embodiment uses an IData instance, this early embodiment used a Values object. Although an IData instance may contain multiple values having the same name, the flow language as implemented in the webMethods B2B Integration Server and as described in the present application does not yet take advantage of this facility. Instead, anywhere the flow language accesses the field of an Data instance by name, the language accesses only the value of the first field having that name. Even with this limitation, the use of Data instances in the flow language confers a significant benefit on services written in the flow language. Because IM services may take advantage of the properties of an Data instance, flow services that invoke IM services may also benefit from these properties.

To execute a flow service the flow engine hands the service a pipeline that contains all of the service's input parameters. This pipeline is known as the input pipeline. If the flow service is being called by another flow service, the input pipeline will be the pipeline of the other service. The pipeline will contain all of the state information of the other service. For example, the input pipeline might contain output values from several of the caller's preceding flow operations. The caller trusts that the service it is calling will not modify this state information.

A flow service helps guarantee the integrity of the input pipeline by creating a shallow copy of the input pipeline and using the copy as the service's pipeline. The term "shallow copy" indicates that the values within the copied pipeline are not themselves copies; instead values are shared between the two pipelines. For example, if the original pipeline contains a field named "doc" whose value is a particular instance of a document, then the copied pipeline will contain a field named "doc" whose value is the same document instance. Modifying the document instance from one pipeline results in modifications to the document instance available through the other pipeline. However, the pipelines themselves remain different instances, so fields may be added to or removed from one pipeline without affecting the other pipeline. Likewise, the value of a field in one pipeline may be replaced with a different value without affecting the value of the namesake field in the other pipeline. The shallow copy therefore scopes the pipeline to a particular service or operation.

After creating a copy of the input pipeline, the flow service is prepared to execute operations against the new pipeline. All of the flow operations within a flow service share this one pipeline. Many flow operations, including calls to other services, require input parameters. Map operations are able to add fields to the pipeline and to set the values of fields that are already in the pipeline. Data may also be put in the pipeline by invoking other services. After invoking a service, the flow adds the outputs of the service to the pipeline.

When a flow service invokes another service it passes its pipeline to the other service. Let's refer to this pipeline as the caller's pipeline. The called service may return an output pipeline when it completes, though it may also return nothing. The following table describes how the caller updates its pipeline as a function of what the invoked service returns:

| What the Invoked Service Returns | How the Caller Updates Its Pipeline |
|---|---|
| Caller's Pipeline | The caller does nothing. If the invoked service provides outputs, it did so by placing them in the caller's pipeline. |
| New Pipeline | For each field in the output pipeline, the caller adds the field to the caller's pipeline. Whenever the output pipeline and the caller's pipeline have a commonly named field, the field in the output pipeline replaces the field in the caller's pipeline. |
| Nothing or Null | The caller does nothing. Technically the caller should have no outputs, but it may have put outputs in the caller's pipeline. |

A flow operation that invokes another service trusts the other service to assign only fields that are officially outputs of the service. If the service has a service definition, the service definition defines the official outputs. Otherwise the official outputs are defined in whatever public documentation is available for the service. This approach maximizes the flexibility and the efficiency of flow services. Flow services are only capable of returning new pipelines, but IM services are capable of returning any of the above. Hence, it is possible to write IM services that introspect the state of a flow service, and it is possible to write IM services that are very fast because they do not copy the input pipeline. IM services in general do not need to copy the input pipeline, since they can maintain internal state by other means.

Consider what happens when one flow service adds a field to the pipeline and then calls another flow service. Suppose the first service needs the value of this field sometime after calling the second service. If the second service overwrites this value and returns the same field, then according to the above rules the value is put in the first flow service's pipeline, thus overwriting the first service's value for this field. When the first service proceeds and uses the field's value, the service uses the wrong value: it uses the value supplied by the second flow service rather than the value originally assigned by the first flow service. Were the second service to return only fields that are publicly documented outputs of the service, the designer of the first service could take precautions to ensure that name collisions do not arise, perhaps by using map operations.

The easiest way to ensure that a flow service preserves the integrity of the input pipeline is to assign a service definition to the service and to set the CLEAN-UP attribute of the service to "True" value. Services are created this way by default from within the Developer. This configures the service to automatically remove all fields from the pipeline that are not explicitly identified as output parameters in the service definition. Otherwise, one may design a flow service that preserves pipeline integrity naturally or one may add a map operation to the end of the flow service to remove unwanted output parameters.

Flow Language Error Handling

A flow service fails when a flow operation it contains fails. A flow operation fails when the operation encounters an error condition. For example, the INVOKE operation fails when the flow service or IM service it is calling fails. A SEQUENCE operation fails if the last operation it attempts to execute fails. A SEQUENCE operation with an EXIT-ON value of "Failure" will fail upon executing a child operation that fails, and a SEQUENCE operation with an EXIT-ON of "Success" will only fail if the last operation of the sequence fails. A RETRY operation will fail if it exceeds the maximum number of retry attempts. Other conditions exist as well that will cause a flow operation to fail.

Normally, when a child flow operation fails, the flow operation that contains the child also fails. In this way, an error may bubble up the hierarchy of flow operations and cause the entire flow service to fail. As the error bubbles up, the pipeline remains in the state it had at the time the error occurred. Because complex flow operations may be built from simpler flow operations, when an error occurs in an operation, there may be little certainty about the contents of the pipeline. Hence, unless the service is simple and carefully designed, no statement can be made about outputs of a failed flow service.

However, certain flow operations may catch an error reported by a child flow operation. The operation may simply ignore the error or it may perform some action in response to the error. For example, when the child of a RETRY operation fails, the RETRY operation may ignore the error and then attempt to perform all of its child operations again. A SEQUENCE operation with an EXIT-ON value of "Success" ignores failed child operations before returning upon successfully executing a child operation. When such operations proceed despite a failure, they first restore the pipeline to a known state. The RETRY operation restores the pipeline to the state it had when the RETRY operation was initially executed. In the case of a SEQUENCE operation having an EXIT-ON attribute value of "Done", failed child operations are ignored, and after each failed operation the pipeline is restored to the state it had prior to executing the most recently failed child operation.

The restoration process guarantees that the Data instance representing the pipeline has exactly the same fields it had in the prior state, and it guarantees that these fields contain the same value instances. However, it does not restore the state of the value instances themselves. For example, suppose a pipeline originally contains a field 'X' that holds an Data instance, and suppose a field 'Y' in the 'X' Data instance is subsequently given a new value. When the pipeline is restored to its original state, the field 'X' is guaranteed to be there and is guaranteed to contain the same Data instance, but the IData instance will still reflect all subsequent changes, and 'Y' will still have the new value rather than its original value.

The process of restoring a pipeline to a previous state may be described as follows:

- Each field that was removed from the IData instance representing the pipeline is put back in the pipeline.
- Each field that was added to the Data instance representing the pipeline is removed from the pipeline.
- Each field originally in the IData instance representing the pipeline whose value was completely replaced with a different value is restored to its original value.

In particular, when the internal values of a pipeline field are changed, pipeline restoration will not undo the changes.

On some occasions a flow operation that fails may want to communicate information to a containing flow operation without having pipeline restoration remove the information. For example, an operation may attempt to access a web page and find that the web page actually received is not the desired web page. However, the actual web page received contains a message that the nested operation would like to preserve. The nested operation may accomplish this task by storing the message internally within the value of a pipeline field that pipeline restoration will not delete or replace. Since pipeline restoration does not restore field internals to their previous state, the message remains available after restoration occurs. The nested operation might store the message away, if it is present, prior to executing the operation that may fail.

The Flow Service

A flow service is a service that is implemented in the flow language. It is the container for all flow operations of the service. Every flow service has a name that other software entities use to identify the service within the B2B namespace. A flow service may also have a service definition that explicitly defines the inputs and outputs of the service. When a flow service has a signature, it is the B2B server that associates the service with its signature.

Figure 40:
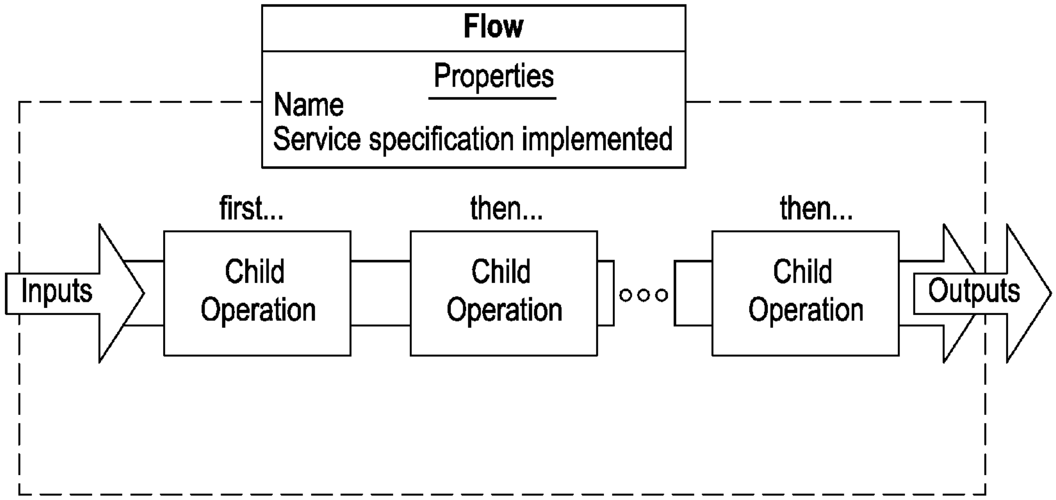
FIG. 40 generally illustrates a flow service.

A flow service is generally illustrated in FIG. 40. When a flow service is invoked it is handed a pipeline that contains the service's input parameters. This pipeline is known as the input pipeline. The flow service creates its own local pipeline by creating a shallow copy of the input pipeline. The operations contained in the flow service then execute against this pipeline. When the service finishes executing, and the service is configured to perform a clean-up of the output parameters, the service removes unwanted output parameters from the pipeline. The clean-up removes all parameters from the pipeline that are not declared in the service definition. Finally, the service completes, returning its output parameters in the pipeline. If an immediate child operation of the flow service fails, the service itself fails.

| | | |
|---|---|---|
| Element Type Name | | <FLOW> |
| Element Attributes | NAME | Unqualified name of the flow service. Mandatory. This is the name that the service will assume within the B2B namespace. |
| | VERSION | Flow language version. Mandatory. Version of the flow language to which the service conforms. Must be "3.0". |
| | CLEAN-UP | Whether to clean-up the pipeline before exiting. Optional. Valid values are "True" and "False". If the value is "True" and the flow service has a service definition, then upon completing the execution of the flow service the service removes all fields from the pipeline except for the fields that the service definition indicates are outputs of the service. Otherwise, the service returns all of the fields found in its pipeline upon completing execution. When the |

-continued

| | | |
|---|---|---|
| | | attribute is not present, the value defaults to "True". |
| | TIMEOUT | Timeout period. Optional. This is the number of milliseconds to wait for the operation to terminate before attempting to abort the operation. The operation will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |
| | Any flow element other than FLOW | Child operation. A flow service must contain one or more flow elements. The flow service performs its child operations as if they were contained in the default sequence operation. |

Flow Operations

A flow operation is an operation that the flow language defines. Every flow operation operates on the pipeline of its containing flow service. The operation may modify the pipeline and it may perform an action based on the values in the pipeline. The following discussion relates to the behavior and the XML syntax of the different flow operations.

Sequence Operation

Figure 41:
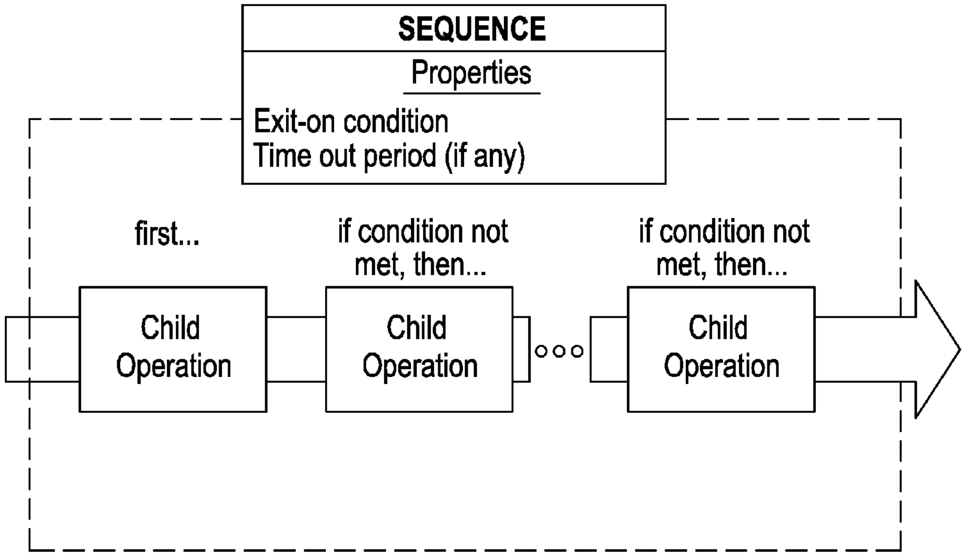
FIG. 41 generally illustrates a sequence operation.

A sequence operation is generally as shown in FIG. 41, and sequentially executes its child operations. The sequence is the fundamental operation of the flow language since many of the other operations behave as if their child operations were contained in a sequence. The sequence operation successively applies each of its child operations to the flow's pipeline. A sequence may be configured to terminate when a child operation fails, when a child operation succeeds, or when all child operations have been executed, regardless of whether any succeeded or failed. The default behavior is to exit prematurely when a child operation fails, and such a sequence is known as the "default sequence operation."

If any child operation fails, the sequence restores the pipeline to the set of fields it had prior to executing the operation, so that only the successful operations produce lasting changes on the pipeline. However, there is one exception to this rule. The pipeline is not restored if the failure of a child operation causes the entire sequence to fail. A sequence that exists on either the success or failure of a child operation succeeds if the last child operation it executes succeeds, and the sequence fails otherwise. A sequence that ignores all child successes and failures always itself succeeds.

| Element Type Name | | <SEQUENCE> |
|---|---|---|
| Element Attributes | NAME | Instance name. Optional. Any flow element may have a name attribute that uniquely identifies the element within the container operation to which it belongs. The branch operation uses this attribute, as may user interface software. |
| | EXIT-ON | Condition under which to exit prematurely. Optional. Valid values are "Failure", "Success", and "Done". A value of "Failure" indicates that child operations are to be executed sequentially until either one fails or all are executed. This is the most common use of SEQUENCE and is the default behavior when the EXIT-ON attribute is absent. "Success" indicates that child operations are to be executed sequentially for as long as they fail. The first successfully executing child operation successfully concludes the sequence. "Done" indicates that all child operations are to be executed, regardless of whether they succeed. |
| | TIMEOUT | Timeout period. Optional. This is the number of milliseconds to wait for the operation to terminate before attempting to abort the operation. The operation will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |
| | Any flow element other than FLOW | Child operation. A sequence must contain one or more flow elements. A sequence sequentially executes each of its child operations, executing them according to their order of occurrence in the XML document. |

Map Operation

The map operation defines a transformation on a pipeline. A map allows one to copy fields, move/rename fields, delete fields, and set field values. It also allows one to merge multiple array fields into a single array or split an array field into multiple arrays. Maps are generally used to prepare the fields of a pipeline so that they contain the required inputs for a subsequent flow operation. Each map consists of a set of map rules, where each map rule describes a particular transformation to apply to the pipeline. If a map rule specifies a transformation that cannot be applied to the pipeline, the map rule is ignored and no error condition is generated; if such a map rule must be executed to yield proper flow behavior, it is assumed that a subsequent flow operation will detect the invalid pipeline and signal an error. Map rules are therefore only applied when they pertain to a given pipeline.

| Element Type Name | | <MAP> |
|---|---|---|
| Element Attributes | NAME | Instance name. Optional. Any flow element may have a name attribute that uniquely identifies the element within the container operation to which it belongs. The branch operation uses this attribute, as may user interface software. |
| | ADORNS | Adornment disposition. Optional. Maps may be designed so that they are tightly coupled with a preceding or following flow operation. A map might be designed specifically to provide inputs for the following operation, or it might be designed specifically to clean up after a preceding operation. This attribute allows a map to suggest to flow builder tools that the map should be displayed as adorning a neighboring flow operation. The valid values of this attribute are "Next", "Previous", and "Standalone". When the attribute is not present, a value of "Standalone" is assumed. The value of this attribute has no affect on the run-time behavior of a flow service. |
| Valid Child Elements | COMMENT | Comment. At most one comment may appear. |
| | COPY | Copy a field from one location to another. Any number of these elements may appear. |
| | MOVE | Move a field from one location to another. Also used to rename a field. Any number of these elements may appear. |
| | DELETE | Delete a field. Any number of these elements may appear. |
| | SET | Set a field to the provided value. May be used to either override a value already in the pipeline or to provide a default value for a field not yet having a value. Any number of these elements may appear. |

A map rule is a simple operation on a field of the pipeline. The field may occur in any Data instance found within the pipeline, including the pipeline itself. Every map rule uses a path expression to name this field. Path expressions are similar to file system paths, where fields containing Data instances are analogous to directories (or folders) and where all other fields are analogous to files. A path expression naming a given field is a string consisting of the concatenation of the names of all fields that contain the given field, ending with the name of the field itself. Moreover, a forward slash ('/') delimits every two names of the expression. A slash may precede the entire expression without changing the meaning of the expression, but the expression "/", consisting of only the forward slash, is not a valid expression; the pipeline itself is not addressable. Path expressions cannot address fields whose names contain a forward slash.

For example, if a pipeline contained an IData instance in a field named 'X', and if this Data instance contained yet another IData instance in a field named 'Y', and if the Data instance in 'Y' contained a field named 'Z', then the path expression identifying the value of field X would be "X" and the path expression identifying the value of field Z would be "X/Y/Z".

The following tables define the different map rules:

| Element Type Name | | <DELETE> |
|---|---|---|
| Element Attributes | FIELD | Field to delete. Mandatory. This is a path expression that identifies a field of the pipeline that is to be deleted. If the named field is not present in the pipeline, the map rule is ignored. |
| Valid Child Elements | | None |

| Element Type Name | | <COPY> |
|---|---|---|
| Element Attributes | FROM | Field to copy from. Mandatory. This is a path expression that identifies a field of the pipeline that is to be copied. If the named field is not present in the pipeline, the map rule is ignored. This field is copied to the field named by the TO attribute. |
| | TO | Field to copy to (assigned field). Mandatory. This is a path expression that identifies the field to which is copied the field named by the FROM attribute. If the field does not exist, it is created. If the field already exists, its value is overwritten with the value given by this map rule. |
| Valid Child Elements | | None |

| Element Type Name | | <MOVE> |
|---|---|---|
| Element Attributes | FROM | Field to move. Mandatory. This is a path expression that identifies a field of the pipeline that is to be moved. If the named field is not present in the pipeline, the map rule is ignored. This field is be copied to the field named by the TO attribute in the manner of the COPY rule and is deleted afterwards. A field is renamed by moving it to a new field within the same IData Instance. |
| | TO | Field to move to (assigned field). Mandatory. is a path expression that identifies the field to which is copied the field named by the FROM attribute. If the field does not exist, it is created. |
| Valid Child Elements | | None |

| Element Type Name | | <SET> |
|---|---|---|
| Element Attributes | FIELD | Field to set (assigned field). Mandatory. This is a path expression that identifies a field of the pipeline whose value is to be set. If the named field is not already present in the pipeline, it will be created. The value assigned to this field is given by the content of the SET element. |
| | ENCODING | Content encoding. Mandatory. This is the encoding in which the content of the SET element is expressed. Valid encodings are "Base64" and "80/20". |
| | OVERWRITE | Overwrite permission. Optional. Valid values are "True" and "False". A value of "True" indicates that it is acceptable for the map rule to set the value of a field that already has a value. The value given by the SET rule will overwrite the value already in the pipeline. This is equivalent to hard-coding the field to the given value. A value of "False" indicates that the field is only to be set if it does not already have a value. Hence, "False" indicates that the value of the SET rule is a default that is to take effect only when no value is already provided. When the attribute is absent, it defaults to a value of "True". |
| | VARIABLES | Variable presence flag. Optional. Valid values are "True" and "False". A value of "True" indicates that all string variables occurring in the assigned value are to be substituted with the strings that they represent. A value of "False" indicates that string variables are not to be substituted. The "False" value is useful when a value may contain a character sequence that might be incorrectly interpreted as a string variable. When the attribute is absent, it defaults to a value of "True". String variables are described below. |
| Valid Child Elements | Varies with encoding | Value to which to set the field. The content of the SET element contains the value to assign to the field, but it is expressed in the encoding given by the ENCODING attribute.<br>Strings of the value that are reachable through IData instances may contain string variables. A string is reachable if it is possible to name it with a path expression. Also, if the value is itself a string, it may contain string variables. A string variable is a substring of the form "%<substitute>%", where <substitute> is a path expression that names a field of the pipeline. A string may contain this substring nestled among other characters, but it is valid for a string to be identical to a string variable. A string may also contain multiple string variables, each (conforming to this substring. The two-character sequence "%%" represents a single '%' character that does not signal the start of a string variable.<br>When the SET rule is performed, each string variable is examined for possible substitution from the pipeline. If <substitute> names a pipeline field whose value is a string, the substring is replaced |

-continued

| | |
|---|---|
| | with the value of this field. Otherwise the substring is not replaced and is interpreted as a sequence of characters rather than as a string variable. String variable substitution occurs even when the string is contained within an array, such as when the string is a member of a string array or is contained within an array of IData instances. |

The map rules that are valid together in a map are subject to constraints. The constraints prevent maps from defining contradictory or ambiguous behavior that might otherwise arise given the order-independent nature of map rules within a map. The constraints are intended to define a space of map rules having intuitive behavior so that one may only write map rules having well-defined meanings. For the most part, a flow designer should not have to worry about constraints when creating map operations. Most violations of these constraints can be detected at flow design time, so the webMethods Developer client will prevent the designer from creating invalid map rules.

The constraints are expressed in terms of the field to which a map rule assigns a value. The field is known as the assigned field. The COPY, MOVE, and SET rules have assigned fields, but the DELETE rule does not. In the path expression that identifies the assigned field, the assigned field is the field whose name occurs last in the expression. The constraints on map rules follow:

1. No two map rules may have the same assigned field.
2. No assigned field may contain another assigned field.
3. No deleted or moved field may contain an assigned field.
4. The value and the assigned field must have the same primitive type, unless the assigned field is of type Object.
5. Path dimensions common to the value and the assigned field must have the same sizes.

The terms "primitive type" and "path dimension" require definition. The primitive type of a value is the value's data type when it is stripped of all dimensionality. For example, the primitive type of a string array or string table is a string. The primitive type of a field is the primitive type of the value that may be assigned to the field, according to either this specification or the service definition that defines the field. Hence, assuming that all other constraints are met, one may assign an array of strings to a field taking a string and one may assign a string to a field taking an array of strings. One may also assign a string to a special primitive type known as "Object". Any primitive type may be assigned to the Object type.

The path dimension of a field is expressed in terms of the field's primitive type. The path dimension is the number of arrays to which the primitive type belongs in the path through the pipeline to the field. A field's value has the same path dimension as the field itself. A value does not initially belong to a field if it is provided via the SET rule. In this case, the path dimension of the value is the same as the number of dimensions that the value has. The path dimension of a single string is 0, that of a string array is 1, and that of a string table is 2. The following examples help to further clarify path dimensions:

Consider a pipeline containing an array of IData instances in a field named 'X', where each Data instance of the array contains a string in a field named 'Y'. The path dimension of the string 'Y' is 1, since the string belongs to an array of Data instances, and the path dimension of the Data instance 'X' is also 1, since it is an array.

Consider a pipeline containing an array of Data instances in a field named 'X', where each IData instance of the array contains an array of Data instances in a field name 'Y', and where each IData instance of 'Y' contains a string field named 2'. The path dimension of 'X' is 1, that of 'Y' is 2, and that of 'Z' is also 2.

Consider a pipeline containing an array of Data instances in a field named 'X', where each Data instance of the array contains an array of strings in a field named 'Y'. The path dimension of 'Y' is 2.

Given that only primitive types need match to perform an assignment, one may copy or move each string in a string array to a field in an array of Data instances. That is, several flat arrays of values may be merged together into a single array of Data instances, where each field in an IData instance derives from a different array. Likewise, one may split an array of IData instances into a set of arrays, one corresponding to each field of the IData instance. In these cases the path dimensions of the value to be assigned and the assigned field are the same, but the path dimensions need not be the same.

When the path dimensions of the value and the assigned field disagree, the behavior that occurs depends on which path dimension is higher. The different scenarios and their behavior are described as follows:

| Scenario | Behavior |
|---|---|
| The assigned field has the same path dimension as the value being assigned. | The members of the value being assigned are copied into the assigned field so that the array indexes that identify the member remain unchanged for corresponding dimensions. For example, if each string in a string array is copied into a field in an array of Data instances, the index of the string in the array is the index of the IData instance whose field contains the same string. Indexes will correspond for higher dimensions as well. |
| The assigned field has a higher path dimension than the value being assigned, and the assigned field does not already have a value. | The assigned field is created so that the appropriate dimension contains exactly one instance of the value. For example, if a string is assigned to a field of type string array, the value of the field becomes a string array whose only member is the provided string. If the assigned field already has some of the outer dimensions created even though the assigned field itself does not exist, the outer dimensions must still agree in size with the outer dimensions of the value, but the map rule will create only the inner dimensions. |
| The assigned field has the higher path dimension than the value being assigned, and the assigned field already has a value. | The entire assigned field is overwritten with multiple copies of the provided value. For example, if a string is assigned to a field that already contains a string array, each member of the string array is overwritten with the provided string array, so that the string array ends up containing only copies of the provided string. |
| The assigned field has a lower path dimension than the value being assigned. | The value may be thought of as a collection of structures whose dimensions each equal the path dimension of the assigned field. The assigned field is assigned from the first member of this collection. For example, if a string array is assigned to a string field, the field is set to the value of the first string in the string array. |

The behaviors described in this table are well-defined provided that when members of a single- or multi-dimensional value are copied into a field that already contains a value, the size of any dimension in the copied value must have the same size as the corresponding dimension in the field's existing value. For example, if one has an array of 30 members and the other has an array of 29 members, the 30th member of the first array cannot be copied, so the operation will fail. Likewise, if the copy occurs in the reverse direction, the 30th member cannot be overwritten, so the value will be left in a partially defined state. The copy in the reverse direction will therefore also fail. The last of the above constraints enforces this rule.

All map rules in a given map are executed against the original pipeline, so the order in which the map rules appear within the element is insignificant. For example, in the following map the "Price" field is copied to the "Amount" field even though the delete rule occurs before the copy rule:

```
<MAP>
<DELETE FIELD="Price"/>
<COPY FROM="Price" TO="Amount"/>
</MAP>
```

Likewise, in the following map the DELETE rule is redundant with the MOVE rule, since the MOVE rule already changes the pipeline so that the field "Price" is not present:

```
<MAP>
<DELETE FIELD="Price"/>
<MOVE FROM="Price" TO="Amount"/>
</MAP>
```

Also, the COPY rule in the following map will have no effect if the field Product/Price is not already in the pipeline before the COPY, since no map rule of a given map may act on the results of another map rule found in the same map:

```
<MAP>
  <SET FIELD="Product" ENCODING="80/20">
    <RECORD>
      <FIELD NAME="Model">321-AB</FIELD>
      <FIELD NAME="Price">123.45</FIELD>
    </RECORD>
  </SET>
  <COPY FROM="Product/Price" TO="Amount"/>
</MAP>
```

The order-independence property of map rules allows one to exchange the values of two fields using a simple map such as the following:

```
<MAP>
<COPY FROM="Amount" TO="Price"/>
<COPY FROM="Price" TO="Amount"/>
</MAP>
```

It is also possible that two or more map rules each result in the removal of the same field. These map rules are not contradictory, as the map operation will execute each map rule prior to removing the field. Hence, the following map is valid:

```
<MAP>
<DELETE FIELD="Amount"/>
<MOVE FROM="Amount" TO="Price"/>
<MOVE FROM="Amount" TO="Total"/>
</MAP>
```

All three map rules in this map result in the removal of the "Amount" field. A MOVE rule is equivalent to a COPY and a DELETE, and no field is deleted more than once, so the above map results in the "Amount" field being copied to both the "Price" and the "Total" field before being deleted. The DELETE rule is redundant in the above map.

The COPY, MOVE, and SET map rules are all capable of assigning a value to a field, and in the process of assigning the value the map rule may create one or more new fields. The field whose value is to be assigned is given by a path expression. As previously described, a path expression consists of a list of field names that are delimited by slashes. To locate the field given by this path expression, a map walks down the pipeline accessing each field named in the path expression. If at any time a field named in the expression is not found in the pipeline, the field is created and added to the pipeline. If the new field is not the last field in the expression, a new Data instance is created and assigned to be the value of the field. If the new field is the last field in the expression (the assigned field), then the value given by the map rule is assigned to the field.

For example, suppose a pipeline contains exactly one field, a field 'X' whose value is an Data instance, and suppose this Data instance contains some set of fields, none of which is named 'Y'. The path expression "Z" names no existing field, so were a COPY, a MOVE, or a SET rule to assign a value to "Z", the 'Z' field would be created in the pipeline and assigned the given value. Likewise, the path expression "X/Z" names no existing field, so assigning a value to "X/Z" results in a field named 'Z' being created in the existing 'X' IData instance and being assigned the value given by the map rule. Also, the path expression "Q/R" names no existing field, so an IData instance named 'Q' would be created in the pipeline, and within it a field named 'R' would be assigned the value that the map rule specifies. The path expression "X/Q/R" would have a similar effect, since an Data instance named 'Q' would be created in the existing 'X' field. Finally, consider the expressions "Q/R/S/T" and "X/Q/R/S/T". Both of these expressions result in the creation of multiple nested IData instance fields.

The creation process is intelligent about when to create arrays. The necessary intelligence derives from the service definitions describing the services that the flow invokes. If a single string is assigned to a string array, the map creates an array of strings that contains only the single string. Suppose the pipeline contains only one field, where the field has name 'S' and the field contains a string array. If a map rule copies 'S' to the non-existent field given by the path expression "X/Y", the map uses information derived from the service definitions to determine which of 'X' and 'Y' is the array. If 'X' is the array, the map creates an array of Data instances in 'X', where each IData instance contains a string field named 'Y'. If 'Y' is the array, the map creates a single Data instance in 'X' and copies 'S' to 'Y'.

Branch Operation

Figure 42:
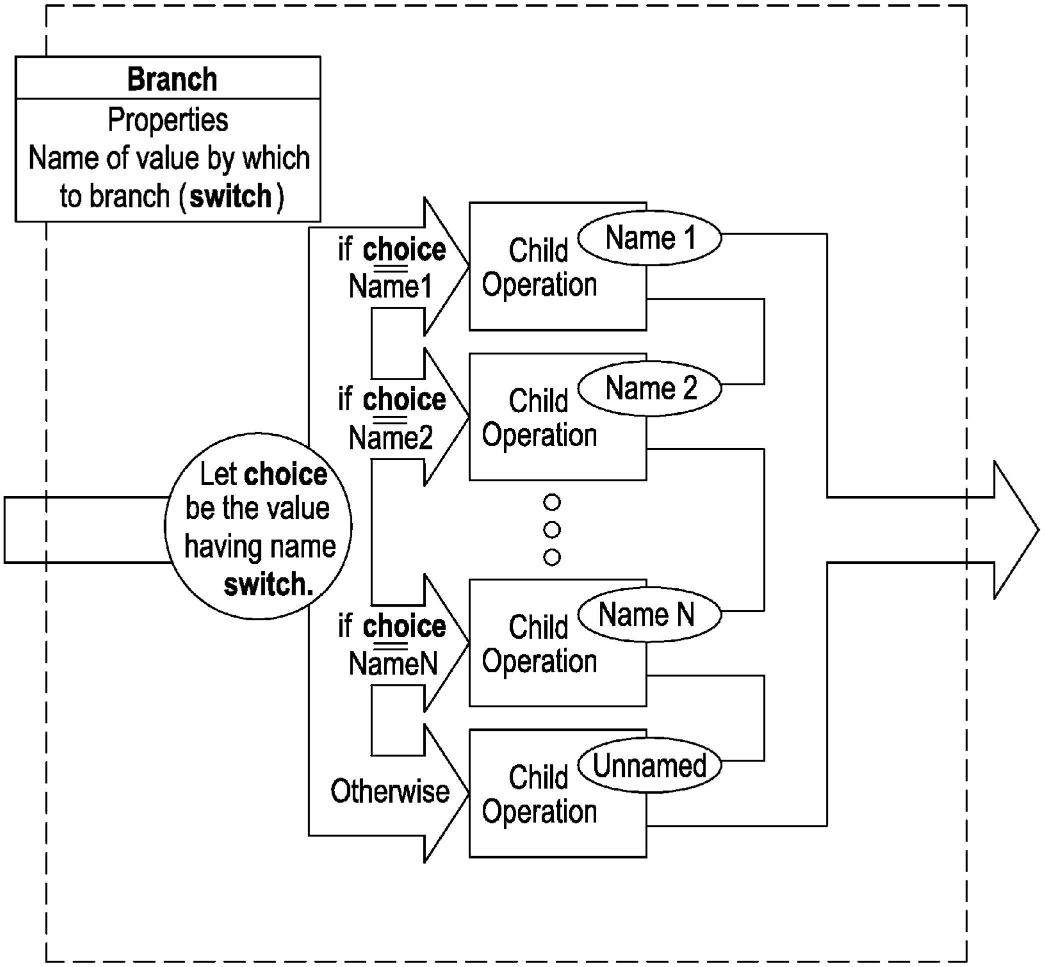
FIG. 42 generally illustrates a branch operation.

The branch operation is generally illustrated in FIG. 42. It selects one of its child operations to execute and executes it. It is not a sequence. It is effectively an operation that branches to one of its child operations. Each branch operation has a value known as the switch. The switch determines how the child operation is selected. The switch is the name of a field in the pipeline, and the value of this field is a name known as the desired instance name.

Each child of branch has an associated instance name. The branch operation executes the child operation whose instance name is the desired instance name. If no child has the name but the branch contains an unnamed child operation, then the branch executes the unnamed child operation. If no child has the name and the branch does not contain an unnamed child, the branch operation fails with no change to the pipeline.

If any child operation fails, the pipeline is left in its partially completed state and the branch operation itself fails. The branch operation also fails if the pipeline does not contain the switch field.

| Element Type Name | <BRANCH> | |
|---|---|---|
| Element Attributes | NAME | Instance name. Optional. Any flow element may have a name attribute that uniquely identifies the element within the container operation to which it belongs. The branch operation uses this attribute, as may user interface software. |
| | SWITCH | Path expression of the field that selects the child operation to execute. Mandatory. The value of this attribute is a path expression that identifies a field found in the pipeline. The value of this pipeline field contains the desired instance name. The branch operation executes the child whose instance name is identical to the desired instance name. |
| | TIMEOUT | Timeout period. Optional. This is the number of milliseconds to wait for the operation to terminate before attempting to abort the operation The operation will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |
| | Any flow element other than FLOW | Child operation. A branch must contain one or more child elements. No two elements may have the same NAME. An element that has no NAME or that has a NAME whose value is "*" is called the default element. A branch may not contain more than one default element, but it is valid for a branch to contain no default element. SWITCH identifies a pipeline field. The operation identifies the child element whose NAME has a value equal to the value of this field and then executes the operation associated with this element. If no element has a NAME with this value and there is no default element, then no action is taken and no error occurs. If no element has a NAME with this value and there is a default element, then the branch operation executes the operation associated with the default element. |

Retry Operation

Figure 43:
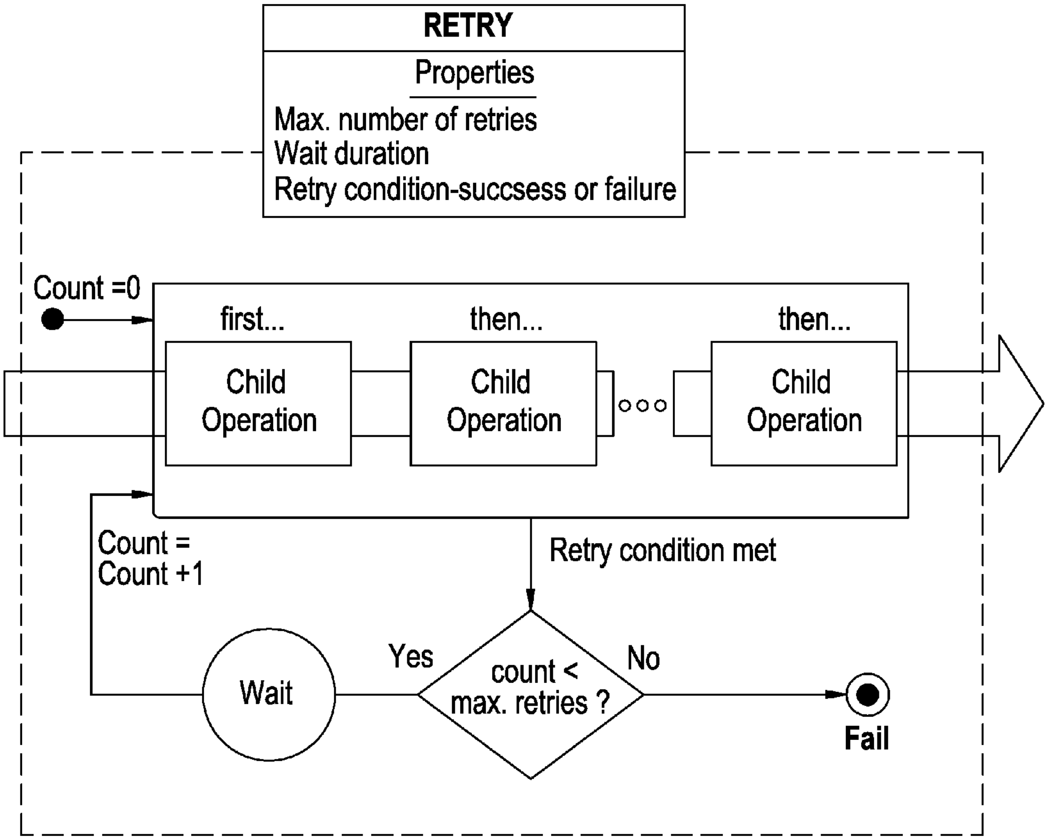
FIG. 43 illustrates a retry operation.

The retry operation is a means for repeatedly performing a sequence of operations until the sequence succeeds, and is generally illustrated in FIG. 43. One may also use the retry operation to repeatedly perform the sequence until it fails. The children of the retry operation comprise the sequence, and with each iteration the operation executes the sequence of children as if they belonged to the default sequence operation.

The desired outcome of the sequence is known as the retry condition. The retry condition is either success or failure. If any operation in the sequence fails, the pipeline is left in its partially completed condition and the sequence fails. The sequence succeeds only when all of the children of the sequence succeed. The retry operation will repeatedly execute the sequence for as long as the sequence satisfies the retry condition, pausing a given number of milliseconds between attempts. Prior to attempting each execution of the sequence, the operation restores the pipeline to the state it had before the first attempt.

The retry operation also has an associated count that signifies the maximum number of attempts the operation should perform. If the sequence satisfies the retry condition a number of times equal to this count, the retry operation itself fails, leaving the pipeline in its partially completed state.

| Element Type Name | <RETRY> | |
|---|---|---|
| Element Attributes | NAME | Instance name. Optional. Any flow element may have a name attribute that uniquely identifies the element within the container operation to which it belongs. The branch operation uses this attribute, as may user interface software. |
| | COUNT | Maximum number of times to execute the sequence. Mandatory. This value must be greater than or equal to one. If the value is one only one attempt will be made to execute the sequence. Hence, the retry operation is most useful with COUNT values greater than or equal to 2. |
| | BACK-OFF | Number of milliseconds to wait between attempts to execute the sequence. Optional. A value of zero indicates that the sequence is to be retried repeatedly without delay. Defaults to zero. |
| | LOOP-ON | Retry condition. Optional. This is the condition under which to retry executing the sequence. The valid values are "Success" and "Failure". A sequence that succeeds satisfies the "Success" condition, and a sequence that fails satisfies the "Failure" condition. Defaults to "Failure". |
| | TIMEOUT | Timeout period. Optional. This is the number of milliseconds to wait for the operation to terminate before attempting to abort the operation. The operation will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |
| | Any flow element other than FLOW | Child operation. A retry operation must contain one or more flow elements. The retry operation performs its child operations as if they were contained in the default sequence operation. However, if the sequence satisfies the retry condition (as defined for the LOOP-ON attribute), the retry operation pauses for a number of milliseconds equal to the value of the BACK-OFF attribute and then attempts to execute the entire sequence again. The operation attempts to execute the sequence at most a number of times equal to the value of the COUNT attribute. |

Loop Operation

Figure 44:
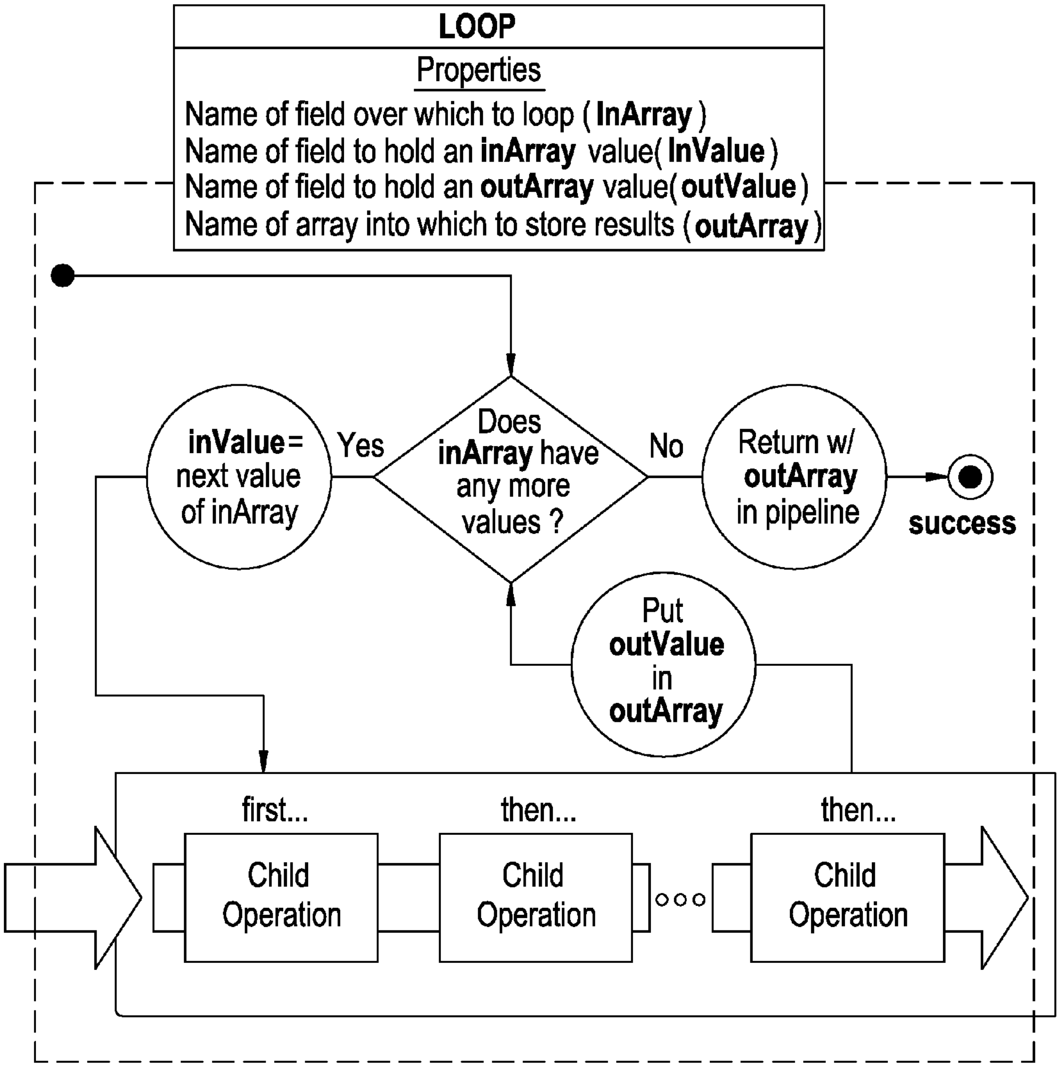
FIG. 44 illustrates a loop operation.

The loop operation is depicted in FIG. 44, and contains a set of child operations that it executes as if they were contained in the default sequence operation. The loop operation executes its sequence of children once for each value that occurs in a particular field of the pipeline, and it is capable of aggregating the separate results of each invocation into a single output array. The value of the field over which the loop iterates is known as the input array, and the value into which the loop collects results is known as the output array.

Attributes of the loop operation name the input array and the output array. The output array attribute is optional and may be excluded to have the operation loop over the input array without aggregating results into an output array. The operation collapses one dimension of the input array so that for each execution of the loop sequence, the value of the field that once contained the input array actually contains one member of the input array. This member is the member associated with the particular iteration of the loop. The sequence operates on this field. If the loop is to collect values into an output array, each iteration of the sequence concludes by putting a member of the output array in the field named by the output array attribute. Not every iteration need generate an output value. To indicate that an iteration has no value for the output array, the iteration simply does not assign a value to the output array field.

Upon completing all iterations of the loop, the pipeline contains the following fields:

All fields found in the pipeline immediately prior to executing the loop.

The value of the input array field is restored to its original non-collapsed value.

An output array field whose value is an array of all the member values that the iterations produced.

In particular, note that the value of the input array field in the last iteration is replaced with the original input array. Note also that the value of the output array field in the last iteration is replaced with the expanded array of all output values.

Consider the example LOOP operation shown below named PurchasePCParts. The loop inputs an array of part descriptions named "Part List" and outputs an array of confirmations named "Confirms". The part descriptions are represented as an array of Data instances, where each Data instance contains a "ProductID" and a "Quantity" field. The confirmations are represented as an array of Data instances, where each Data instance contains a "Vendor", an "OrderNumber" and a "ShipDate" field. On a given iteration of the loop sequence, the value of the "Part List" field actually assumes the value of one of the members of the part descriptions array. Rather than being an array of IData instances, as it is outside the loop, inside the loop "Part List" is a single Data instance. This object contains the "ProductID" and the "Quantity" field of one member of the original array. The sequence creates an Data instance and stores it in the "Confirms" field, setting its "Vendor", "OrderNumber", and "ShipDate" fields as appropriate for the given part. Each sequence produces a different "Confirms" IData instance. As the loop executes, it collects all these output IData instances. When the loop completes, it sets the "Confirms" field to an array containing all of the IData instances produced during the loop and restores "Part List" to its original array value.

The loop operation will fail if the pipeline does not contain the input array at the time the loop begins execution. The loop operation also fails when a child operation of the loop fails during any iteration. Regardless of whether the loop operation succeeds or fails, the loop restores the dimensionality of the input array before terminating. If it was generating an output array, prior to terminating it also expands the dimensionality of the output array and includes in the output array all output values produced by successful iterations of the loop.

| Element Type Name | | <LOOP> |
|---|---|---|
| Element Attributes | NAME | Instance name. Any flow element may have a name attribute that uniquely identifies the element within the container operation to which it belongs. The branch operation uses this attribute, as may user interface software. |
| | IN-ARRAY | Input array over which to iterate. Mandatory. This is the name of a field in the pipeline whose value is either an array. The loop operation executes its contents once for each member value in the array. Within any iteration of the loop sequence, the member value is available through the field named by this attribute; the LOOP operation collapses one dimension from the field on entry into the loop and restores the dimensions when the operation completes. |
| | OUT-ARRAY | Output array into which to place output array values. Optional. When the loop terminates, the field having this name will contain all of the output values that the loop generated. An iteration of the loop generates a value that is to be collected into this array by assigning the value to the field having the name given by OUT-ARRAY. Upon exiting the operation, the loop expands the dimensionality of this field so that it becomes an array of all values ever created by the loop iterations. If the attribute is not present, the loop will not collect output values into an output array. |
| | TIMEOUT | Timeout period. Optional. This is the number of milliseconds to wait for the operation to terminate before attempting to abort the operation. The operation will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |
| | Any flow element other than FLOW | Child operation. A loop must contain one or more flow elements. The loop performs its child operations as if they were contained in a <u>default sequence operation</u>. The sequence is executed once for each value in the input array. |

Invoke Operation

Figure 45:
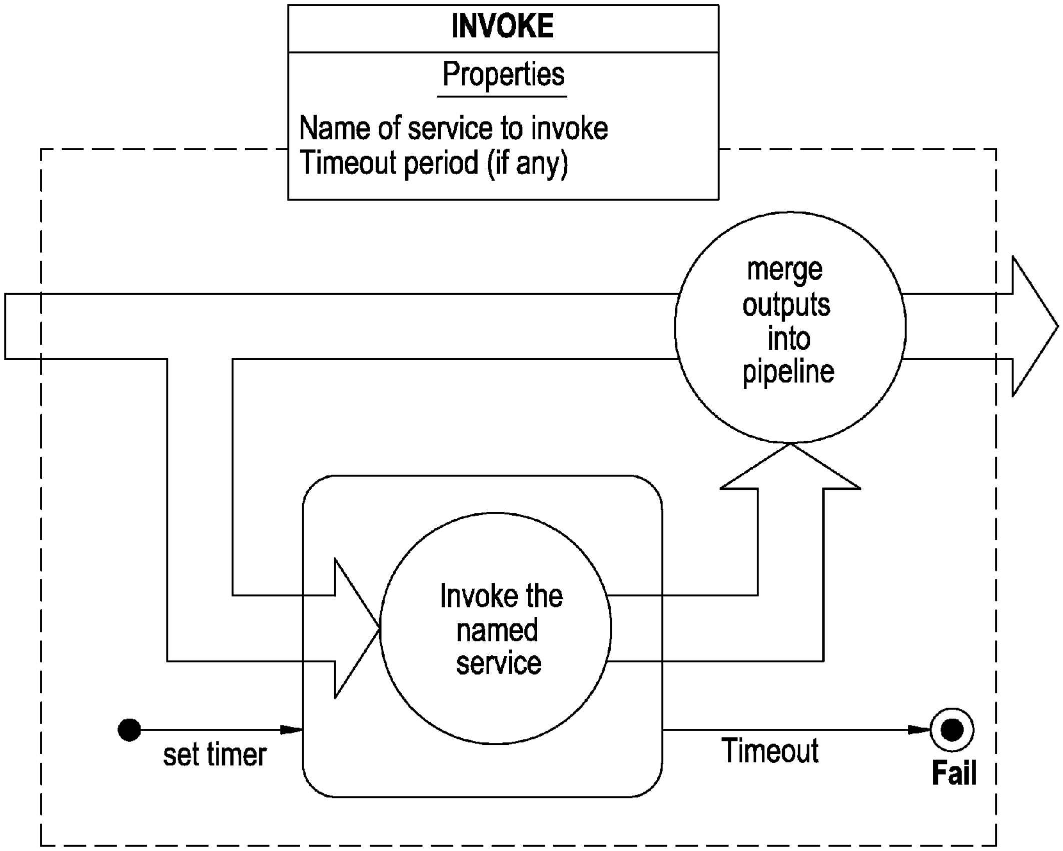
FIG. 45 illustrates an invoke operation.

The invoke operation invokes another service, as shown in FIG. 45. Let's refer to this other service as the called service. The operation optionally times the duration of the invocation. To provide the called service with input parameters the flow service passes in its entire pipeline and trusts the called service to maintain the integrity of the pipeline.

When the called service completes it returns an output pipeline. If this output pipeline is identical to the flow service's pipeline, the flow service has nothing to do. However, if the output pipeline is not the flow service's pipeline, the invoke operation copies the fields from the output pipeline to the service's pipeline, overwriting any fields that are identically named.

| Element Type Name | | <INVOKE> |
|---|---|---|
| Element Attributes | NAME | Instance name. Optional. Any flow element may have a name attribute that uniquely identifies the element within the container operation to which it belongs. The branch operation uses this attribute, as may user interface software. |
| | SERVICE | Fully-qualified name of the service to invoke. Mandatory. This may be any service in the B2B namespace. |
| | TIMEOUT | Timeout period. Optional. This is the number of milliseconds to wait for the invoked service to terminate before attempting to abort the service. The service will only abort on timeout if it heeds Java thread interruptions. A timeout period of zero disables the timeout mechanism. If the attribute is absent, the timeout period defaults to zero. |
| Valid Child Elements | COMMENT | Comment. At most one comment may appear. |

Example Flow Service

The following Example Flow Service represents a service named PurchasePCParts and follows the definition with an implementation of the service expressed in the flow language. The service is a simplified example of how one may apply the flow language.

| Service | PurchasePCParts | | | |
|---|---|---|---|---|
| Description | The PurchasePCParts service allows a client to purchase multiple computer parts from multiple suppliers. The service buys each part from a supplier and prioritizes the suppliers. If a supplier does not have a particular part, the service attempts to get the part from the next supplier in priority order. In this way, the service orders each part from whichever vendor has the part. The service returns confirmation information for each part ordered. | | | |
| Inputs | Purchaser | String | Req'd | Name of the organization that is doing the purchasing. This example assumes that all suppliers key off this name to identify the purchaser's account. |
| | PartList | IData [ ] | Req'd | List of all the parts that the purchaser wishes to purchase. Each part description is defined as follows:<br>Model — String — Req'd — Model number of the part.<br>Quantity — String — Req'd — Quantity to purchase. |
| Outputs | Confirms | IData [ ] | | List of confirmations for each part in PartList. Each confirmation is defined as follows:<br>Vendor — String — Name of the vendor from which the part was purchased. If no vendor carries this part, the value of this field is "*NONE*".<br>OrderNumber — String — Order number that the vendor assigned for the order.<br>ShipDate — String — Date on which the vendor will ship the part. |

```
<FLOW NAME="PurchasePCParts">
  <COMMENT>Example assumes suppliers all use same PIDs. First
    we'll get a list of all the PIDs from some available catalog. Then
    we'll add the PIDs to the input PartList. Last, we iterate over
    the parts in PartList to order each part and keep a record of
    the order confirmations.</COMMENT>
  <MAP>
    <COMMENT>We'll be calling the service GetPIDsFromModels,
      which requires the name of the catalog for which the model names
      are valid along with an array of model names to look up. Here
      we extract the model names from the PartList array and create
      a new string array ModelList to hold them.</COMMENT>
    <SET FIELD="CatalogName" ENCODING="80/20">
      <STRING>Computer Hardware</STRING>
    </SET>
    <MOVE FROM="PartList/Model" TO="ModelList"/>
  </MAP>
  <INVOKE SERVICE="Catalog:GetPIDsFromModels"/>
  <MAP>
    <COMMENT>GetPIDsFromModels returned a string array PIDList
      of product IDs, one ID per model number. Here we pull the PIDs
      out of the string array and put them in the PartList array
      to complete our product descriptions. Also, assume we have
      to rename Purchaser to the name Customer that the supplier
      services required.</COMMENT>
    <MOVE FROM="PIDList" TO="PartList/ProductID"/>
    <MOVE FROM="Purchaser" TO="Customer"/>
  </MAP>
  <LOOP IN-ARRAY="PartList" OUT-ARRAY="Confirms">
    <COMMENT>Loop over the parts in PartList. For each iteration
      of the loop, the PartList field is converted to a member of
      the original PartList. A given iteration therefore operates
      on only one member of the list. At the end of an iteration,
      the Confirms field has a member to add to the result list.
      When the loop exists, it will put an array called Confirms
      in the pipeline to contain all the individual Confirms.
      </COMMENT>
    <MAP>
      <COMMENT>The OrderPart service takes a PID and a Qty field,
        so we need to get them from the current part.</COMMENT>
      <COPY FROM="PartList/ProductID" TO="PID"/>
      <COPY FROM="PartList/Quantity" TO="Qty"/>
    </MAP>
    <SEQUENCE EXIT-ON="SUCCESS">
      <COMMENT>This operation attempts to execute each child
        operation in turn. When one succeeds, the operation
        terminates successfully. We're trying each supplier in
        turn until we find one that has the part. If none has
        the part, a MAP sets VendorName to indicate this. Since
        this MAP will always succeed when executed, the sequence
        will never fail.</COMMENT>
      <INVOKE SERVICE="SupplierA:OrderPart"/>
      <INVOKE SERVICE="SupplierB:OrderPart"/>
      <INVOKE SERVICE="SupplierC:OrderPart"/>
      <INVOKE SERVICE="SupplierD:OrderPart"/>
      <MAP>
        <SET FIELD="VendorName" ENCODING="80/20">
          <STRING>*NONE*</STRING>
        </SET>
      </MAP>
    </SEQUENCE>
    <MAP>
      <COMMENT>We now have confirmation information for the
        current part. Store it away in the field that the LOOP
        operation will collect into the output array.</COMMENT>
      <MOVE FROM="VendorName" TO="Confirms/Vendor"/>
      <MOVE FROM="OrderNumber" TO="Confirms/
      OrderNumber"/>
      <MOVE FROM="ShipmentDate" TO="Confirms/ShipDate"/>
    </MAP>
  </LOOP>
</FLOW>
```

Flow Language Enhancements

The above description of the flow language is missing two features that the inventors have found useful. The first is the invoke-as-user feature. This feature attaches a new property to the INVOKE operation, a property called as AS-USER. AS-USER takes the name of a user or group that is subject to access control on an integration server, which we assume to host a flow VM. The webMethods B2B Integration Server implements Access Control Lists (ACLs) on integration services to control the rights users and groups have to execute services, but other security mechanisms may be deployed for controlling the access that users and groups have to services. The inventors have found that occasionally one needs to write a service that invokes another service, where the invoked service enforces access control constraints at the time of invocation and where a user or group has rights to access the first service but not the invoked service. Under this scenario, access to the invoked service is denied, even if the first service is trusted to only perform actions permitted to the user or group. The AS-USER property allows for the implementation of trusted flow services. The value that this property has in a particular INVOKE operation specifies the name of a user or group whose access rights are to be used for purposes of performing the INVOKE operation.

For example, consider a file-access service that reads files from a file system. This kind of service is typically constrained to allow administrator access only. Suppose another service invokes the file-access service for purposes of giving the general public access to a particular directory. Let's refer to this other service as the public-directory service. An ACL on the public-directory service might allow anyone to invoke the service. However, because the public-directory service in turn invokes the file-access service, the invocation of the file-access service will be denied except when the administrator is the one who invoked the public-directory service. The AS-USER property allows the public-directory service to always invoke the file-access service using the rights of the administrator. This is done by setting the AS-USER property of the INVOKE operation that invokes the file-access service to a value equal to the user name administrator. The public-directory service becomes a trusted service. All services on an integration server must be trusted to some degree, since it is possible to write a service to do anything the server has rights to do.

The second feature allows an INPUT-MAP and an OUTPUT-MAP to be associated with any INVOKE operation. INPUT-MAP and OUTPUT-MAP operations are functionally and syntactically identical to MAP operations, except that are contained in INVOKE operations. An INPUT-MAP is a MAP that is applied to the pipeline immediately prior to invoking the service that the INVOKE operation identifies, and an OUTPUT-MAP is a MAP that is applied to the pipeline immediately after the service completes execution. An INVOKE operation may have at most one INPUT-MAP and at most one OUTPUT-MAP. These two new operations are purely convenience operations. They are convenient because they allow one to associate MAP behavior with an INVOKE operation. Whenever one must move or delete an INVOKE operation, it is usually necessary to move or delete the surrounding MAP operations. By containing MAP behavior directly within an associated INVOKE operation, moving or deleting an INVOKE operation automatically and conveniently moves or deletes the associated MAP behavior. The MAP operation as described above is still a useful feature that the flow language continues to support.

Finally, the MOVE map rule is unnecessary, as it may be emulated by applying a COPY map rule followed by a DELETE map rule.

Flow Virtual Machine

An integration service written in the flow language is called a flow service. Flow services are a preferred embodiment of integration services, since the webMethods B2B Integration Server controls the flow language virtual machine. The flow language is already discussed in detail above. Flow language virtual machine (flow VM) is a generic term used to refer to the software that executes a flow service. Flow services may occur as a bytecode sequence, in which case the flow VM is the software that executes the bytecode sequence. A flow service may also be implemented as an executable object, which together with a flow service's context of operation may be considered the flow VM. Regardless the approach to implementing the flow VM, the fact that flow services are executed via a virtual machine allows certain benefits to be realized.

One benefit is that the flow VM can be implemented to provide tracing and debugging facilities that assist with the development and trouble-shooting of flow services. For example, upon execution of a flow service, the flow VM may wait for an external prompt to before performing each operation occurring in the flow service. In this way, the a software developer may step-wise advance through the flow service. Additional facilities of the flow VM may allow the software developer to inspect and alter the contents of the flow pipeline or of service request and reply messages that are generated during the execution of the flow service. In a preferred embodiment of the flow language, the flow pipeline is expressed in the encoding of an internal protocol that the integration services implement.

Another benefit that the flow VM can provide is a mechanism that allows the state of an executing flow service to be stored. An executing flow service can be suspended prior to completion of execution, and the state of the flow service at the time of the suspension can be placed in storage. Later, the state of the suspended flow service can be retrieved and the flow VM can resume the flow service from the point at which it was suspended. This allows flow services to be suspended and resumed without consuming operating system thread resources. An alternative whereby the thread executing the flow service is suspended does not perform well when many concurrent flow services must be executed and may suspend for long periods of time. Either logic within or external to the flow service may make the decision to suspend the service. Once suspended, an external event identifies the service and resumes it. This mechanism generally requires associating an identifier with each suspended execution of service so that that particular execution of the service may be identified.

The ability to suspend, store, retrieve, and resume flow service execution is also beneficial for clustered implementations of an integration server. Under a clustered implementation, the stored state of any given flow service execution would be available to multiple servers of the cluster. A flow service may begin execution on one server in the cluster, suspend on that server, and resume execution on another server when logic determines that it is time for execution to resume. This benefits clustering because the server on which the flow service began execution may have become busy while the flow service was suspended, and allowing the server to resume execution on another server helps to distribute the service load across the servers.

Flow services provide many additional benefits in the context of an integration server. A service written in the flow language provides analytical tools with visibility into the internal behavior of the service. The service definition associated with a flow service identifies the input and output arguments of the flow service, even if the arguments happened to be expressed as name/value pairs of a self-describing encoding. Within the flow service flow maps, described later, describe how data input to the flow service is directed into services that the flow service invokes. The service definitions of these invoked flow services describe the output arguments that the invoked flow service may produce upon completion. Flow maps of the flow service also identify how such output arguments are wired to subsequent invocations. Ultimately, the flow maps of the flow service and the service definitions of the invoked services define the output arguments of the flow service. In this way, analytical tools may identify the sources and sinks of data and paths through which data travels within a service. Since the invoked services may themselves be flow services, analytical tools may provide this visibility through the hierarchy of invocations that comprise each of the flow services. However, this visibility is limited by the degree to which a given deployment of an integration server utilizes flow services. For example, services expressed in Java do not provide this visibility.

One may create a variety of analytical tools that take advantage of this visibility and benefit a deployed integration server. A tool may generate a model of the deployment, providing an abstract representation of the flow of data through any given service and through the server overall by means of the collection of services it provides. An appropriate internal representation of flow services may even itself serve as such a model. Graphical tools may depict this model or various aspects or subsets of the model, thus facilitating the management of the integration server. Both users and specialized tools may examine this model to perform impact analysis. Impact analysis includes identifying the consequences of making internal changes to a deployment and of having changes occur externally to the deployment. External changes include the loss or addition of data within transmissions and the loss or addition of end-points which with the integration server may communicate. For example, if a transmission or its protocol fails to provide a specific data-item, all downstream dependencies on that data-item can be identified and consequences assessed. As another example, a data-item may arrive in an incorrect format, and all downstream recipients of the data who do not validate correctness can be identified. As a final example, if a service is to be removed from the configuration, all dependencies on that service can be identified and quickly adjusted.

CONCLUSION

It will be understood that various changes and modifications can be made to the specific implementations of the invention described above without departing from the spirit and scope of the invention, e.g., as may be within the skill and knowledge of those in the art, after understanding the present disclosure. It will be further understood that the invention extends fully to the subject matter of copending applications incorporated by reference herein, and applicants reserve the right to claim any and all such subject matter.

What is claimed is:

1. A method of providing access to one of a plurality of services, comprising the steps of:

receiving first and second transmissions at a first server on respective first and second different channels, said first and second transmissions each including a transmission content and at least said first transmission uses a message encoding expressed in a markup language; and translating said first transmission into a third transmission to a first service selected from said plurality of services in accordance with the transmission content of said first transmission, and translating said second transmission into a fourth transmission to said first service selected from said plurality of services in accordance with the transmission content of said second transmission;

wherein said first service is invoked via a shared internal protocol which uses a self-describing encoding, and said third transmission uses said internal protocol.

2. A method according to claim 1, wherein said first transmission arrives from a first client, and wherein said first service provides a service reply transmission in response to said third transmission, said method further comprising the step of translating said service reply transmission into a client reply transmission to said client.

3. A method according to claim 2, wherein each of said plural services can be invoked via a shared internal protocol, and said service reply transmission uses said internal protocol.

4. A method according to claim 1, wherein said markup language is XML.

5. A method according to claim 1, wherein said plurality of services includes a second service responsive to one of said third and fourth transmissions for sending a further transmission to a third service via said internal protocol.

6. A method according to claim 5, wherein said third service is the same service as at least one of said first and second services.

7. A method according to claim 5, wherein said third service sends a service reply transmission having a message portion via said internal protocol.

8. A method according to claim 1, wherein said message encoding is selected from a group of message encodings consisting of specific XML-RPC, generic XML-RPC, HTTP, CGI, HTML, binary object serializations, OMG IIOP CDR, DCE, EDI, and the stack and register representations of parameters passed during procedure calls within programming languages.

9. An integration server apparatus for providing access to one of a plurality of services, said integration server apparatus comprising:

a signal receiver at said integration server apparatus for receiving first and second transmissions on respective first and second different channels, said first and second transmissions each including a transmission content and at least said first transmission using a message encoding expressed in a markup language; and a signal translator, including a signal processor and memory, translating said first transmission into a third transmission to a first service selected from said plurality of services in accordance with the transmission content of said first transmission, and translating said second transmission into a fourth transmission to said first service selected from said plurality of services in accordance with the transmission content of said second transmission;

wherein said first service is invoked via a shared internal protocol which uses a self-describing encoding, and said third transmission uses said internal protocol.

10. An integration server apparatus according to claim 9, wherein said first transmission arrives from a first client, and wherein said first service provides a service reply transmission in response to said third transmission, said integration server further comprising means for translating said service reply transmission into a client reply transmission to said client.

11. An integration server apparatus according to claim 9, wherein said markup language is XML.

12. An integration server apparatus according to claim 9, wherein said message encoding is selected from a group of message encodings consisting of specific XML-RPC, generic XML-RPC, HTTP, CGI, HTML, binary object serializations, OMG IIOP CDR, DCE, EDI, and the stack and register representations of parameters passed during procedure calls within programming languages.

13. A computer program product comprising a non-transitory computer-readable storage medium carrying thereon a computer program for execution by an integration server, said computer program including instructions therein which, when executed by said integration server, permit said integration server to receive first and second transmissions on respective first and second different channels, said first and second transmissions each including a transmission content and at least said first transmission using a message encoding expressed in a markup language, said program further including instructions which, when executed by said integration server, cause said integration server to translate said first transmission into a third transmission to a first service selected from said plurality of services in accordance with the transmission content of said first transmission, and to translate said second transmission into a fourth transmission to said first service selected from said plurality of services in accordance with the transmission content of said second transmission;

wherein said first service is invoked via a shared internal protocol which uses a self-describing encoding, and said third transmission uses said internal protocol.

14. A computer program product according to claim 13, wherein said message encoding is selected from a group of message encodings consisting of specific XML-RPC, generic XML-RPC, HTTP, CGI, HTML, binary object serializations, OMG IIOP CDR, DCE, EDI, and the stack and register representations of parameters passed during procedure calls within programming languages.

* * * * *